(12) United States Patent
Saito et al.

(10) Patent No.: US 6,980,672 B2
(45) Date of Patent: *Dec. 27, 2005

(54) LOCK AND SWITCH USING PRESSURE-TYPE FINGERPRINT SENSOR

(75) Inventors: Yoshihiro Saito, Kawasaki (JP); Teruhiko Tamori, Iruma (JP); Yoshinari Fujimoto, Tokyo (JP)

(73) Assignee: Enix Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/367,630

(22) PCT Filed: Dec. 26, 1997

(86) PCT No.: PCT/JP97/04895

§ 371 (c)(1),
(2), (4) Date: Aug. 19, 1999

(87) PCT Pub. No.: WO99/34080

PCT Pub. Date: Jul. 8, 1999

(65) Prior Publication Data

US 2002/0034321 A1 Mar. 21, 2002

(51) Int. Cl.[7] .............................................. G06K 9/00
(52) U.S. Cl. ..................................... 382/124; 340/5.53
(58) Field of Search ........................ 340/5.1, 5.2, 5.31, 340/5.53, 5.64, 5.71–5.73, 5.8, 5.81, 5.82, 5.83, 825.3, 825.31, 825.34; 73/862.041, 862.046; 382/115, 124, 125; 235/380, 382, 492; 704/246, 273; 902/3, 4, 25; 70/277; 283/68; 356/71; 705/1, 26, 42; 713/184

(56) References Cited

U.S. PATENT DOCUMENTS

| | | | | |
|---|---|---|---|---|
| 3,201,961 A | * | 8/1965 | Williams et al. | 70/277 |
| 5,055,658 A | * | 10/1991 | Cockburn | 235/382 |
| 5,280,527 A | * | 1/1994 | Gullman et al. | 713/184 |
| 5,337,043 A | * | 8/1994 | Gokcebay | 340/825.31 |
| 5,503,029 A | * | 4/1996 | Tamori | 73/862.046 |
| 5,668,929 A | * | 9/1997 | Foster, Jr. | 704/273 |
| 5,745,046 A | * | 4/1998 | Itsumi et al. | 340/5.83 |
| 5,841,888 A | * | 11/1998 | Setlak et al. | 382/124 |
| 5,963,657 A | * | 10/1999 | Bowker et al. | 382/127 |
| 6,011,858 A | * | 1/2000 | Stock et al. | 382/115 |
| 6,100,811 A | * | 8/2000 | Hsu et al. | 340/825.31 |
| 6,182,221 B1 | * | 1/2001 | Hsu et al. | 713/186 |

FOREIGN PATENT DOCUMENTS

| | | |
|---|---|---|
| JP | 62-101777 | 5/1987 |
| JP | 63-204374 | 8/1988 |
| JP | 1-254824 | 10/1989 |
| JP | 5-61966 | 3/1993 |
| JP | 5-233896 | * 9/1993 |
| JP | 5-263558 | 10/1993 |
| JP | 7-14048 | 3/1995 |
| JP | 7-174649 | 7/1995 |
| JP | 8-68704 | 3/1996 |

* cited by examiner

*Primary Examiner*—Samir Ahmed
(74) *Attorney, Agent, or Firm*—Thompson Coburn, LLP

(57) ABSTRACT

A lock has a pressure-based fingerprint sensor, the sensor detects the fingerprint pattern of the finger that presses the sensor, a matching circuit prepares a fingerprint code based on the detected fingerprint pattern, this code is compared with registered fingerprint codes stored in a memory device to determine whether there is a match, and if there is a match, a control unit unlocks the locking mechanism of a concerned object.

63 Claims, 44 Drawing Sheets

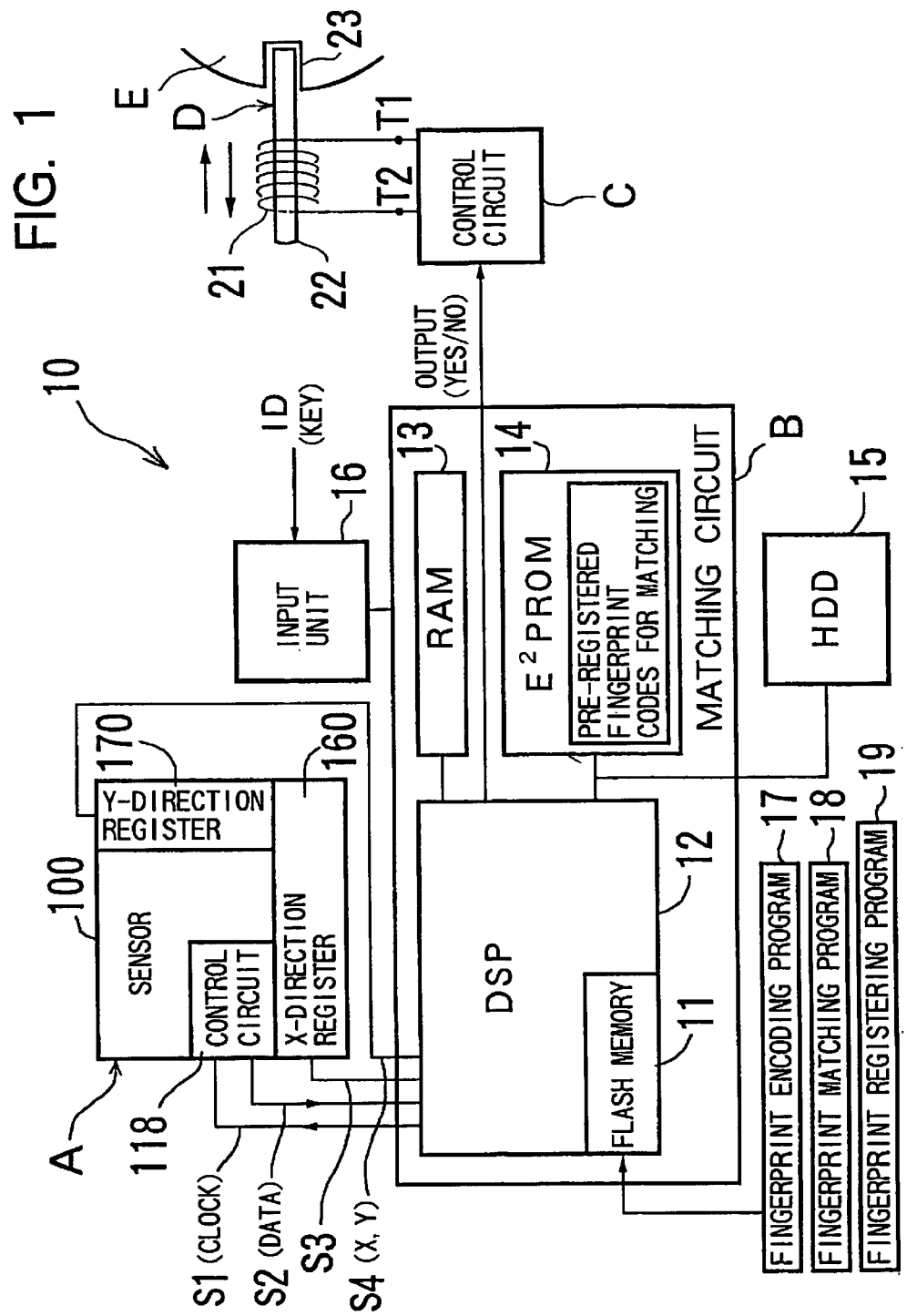

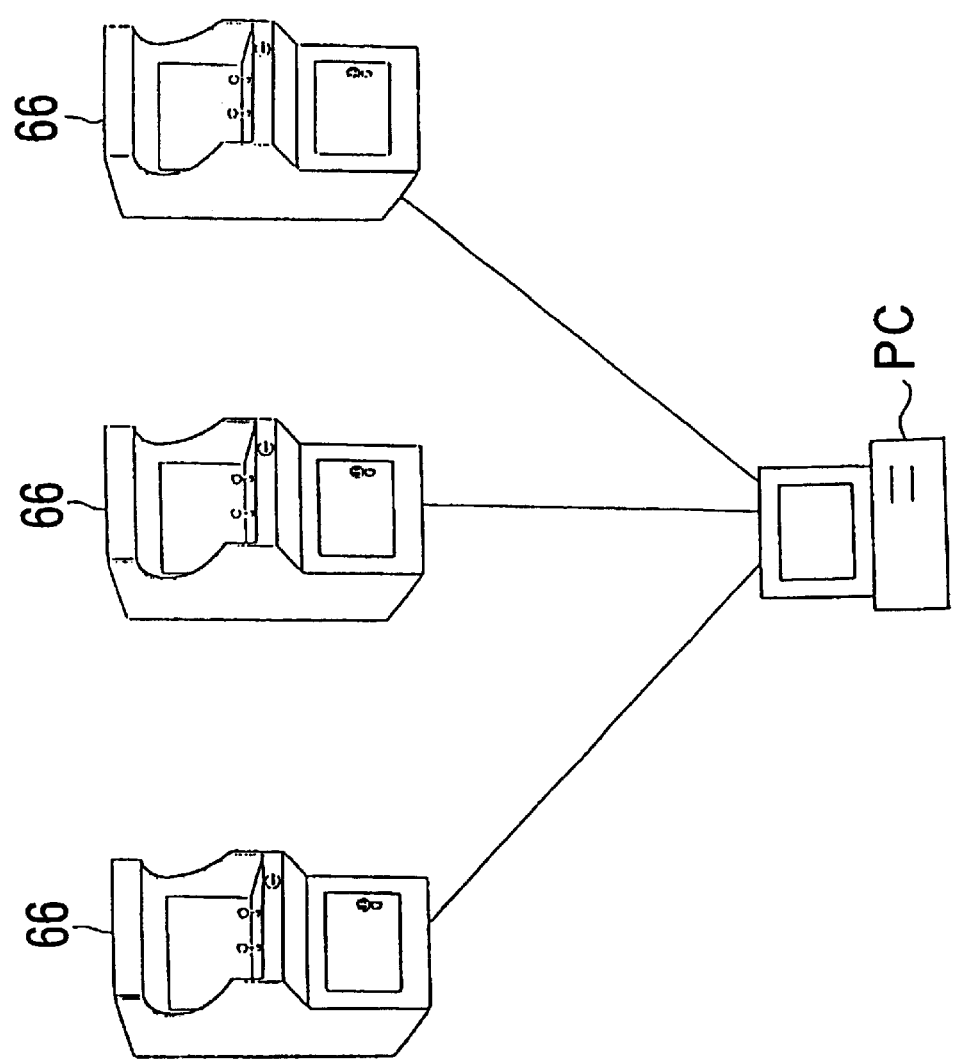

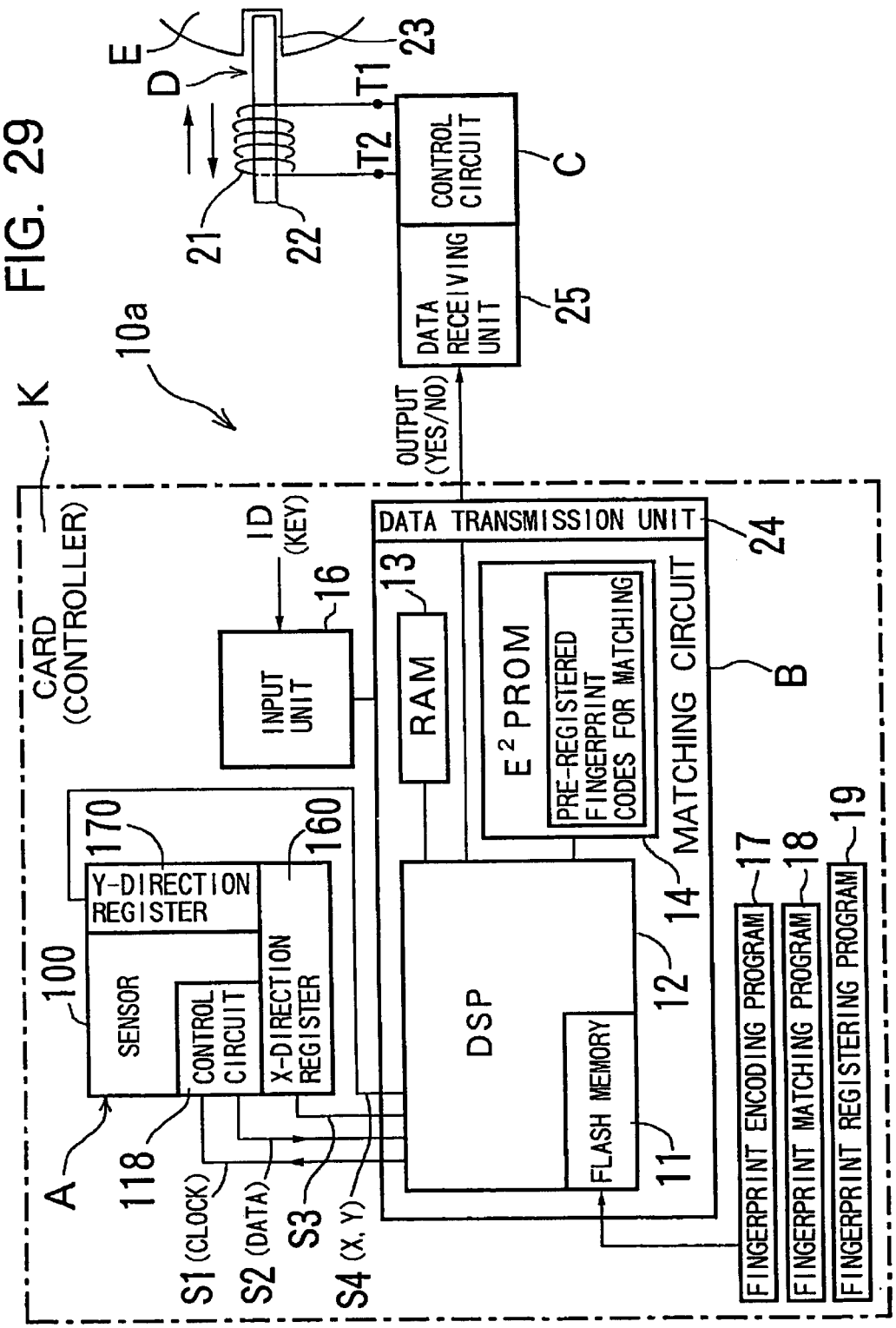

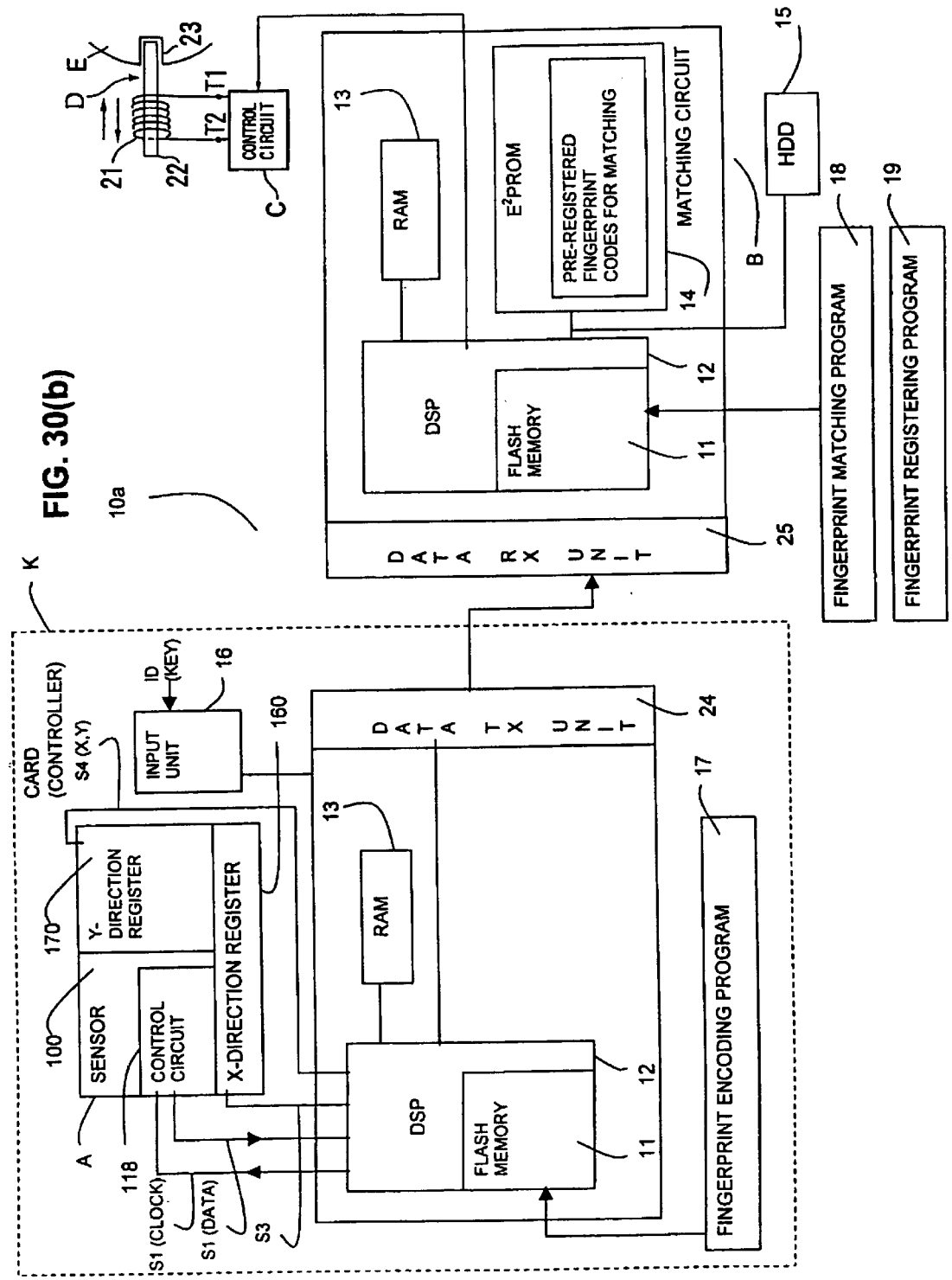

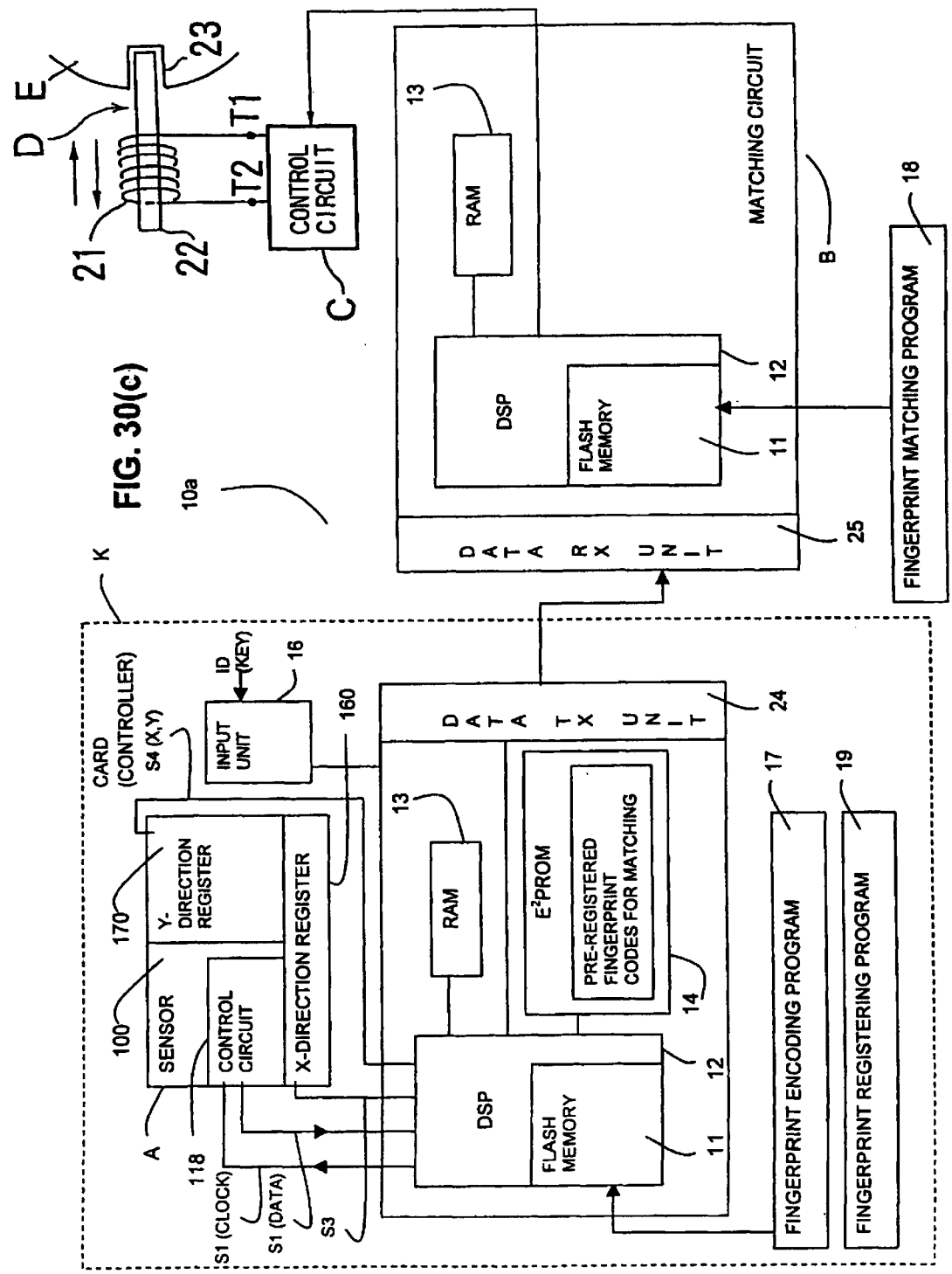

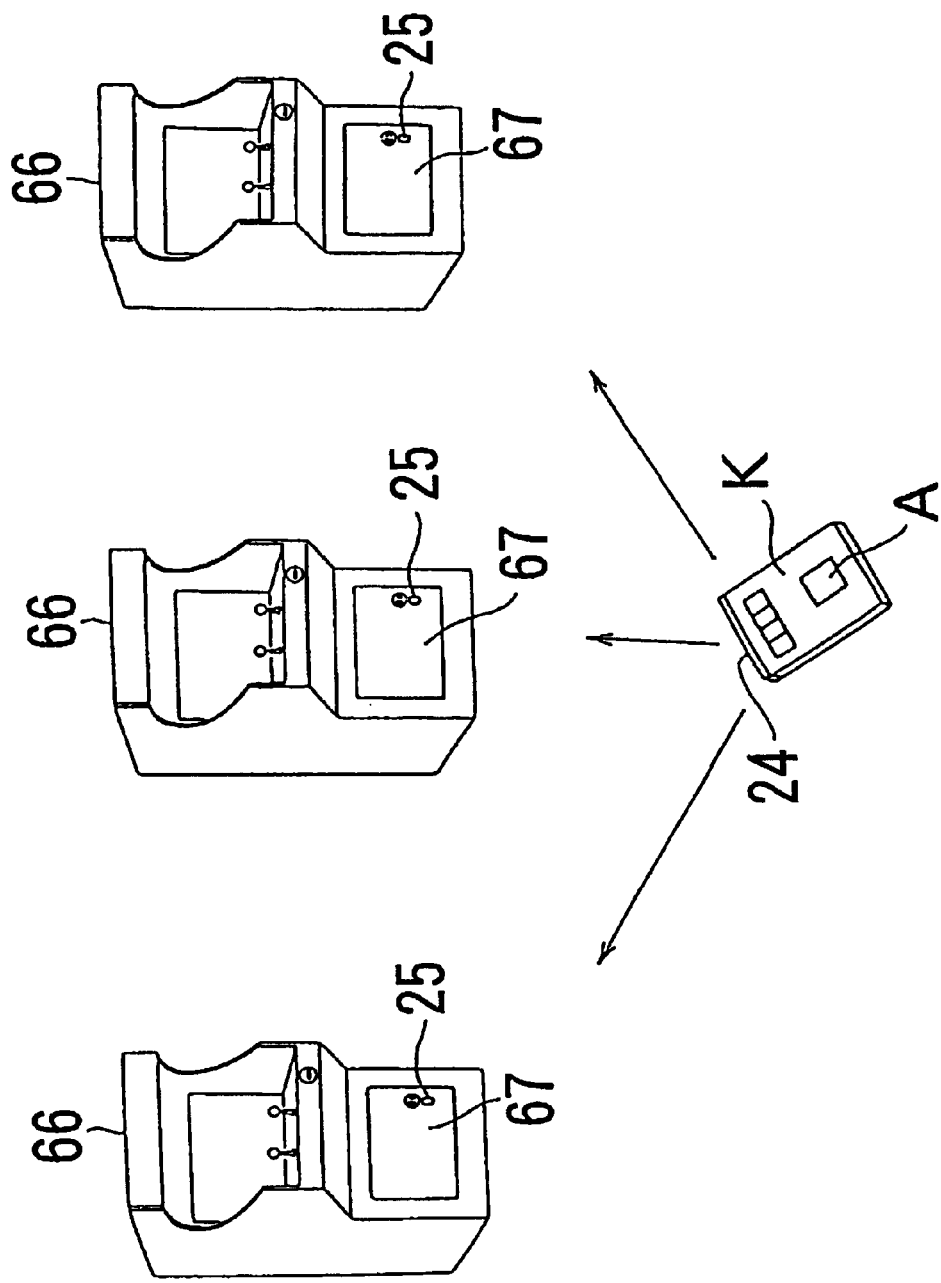

FIG. 34A
FIG. 34B
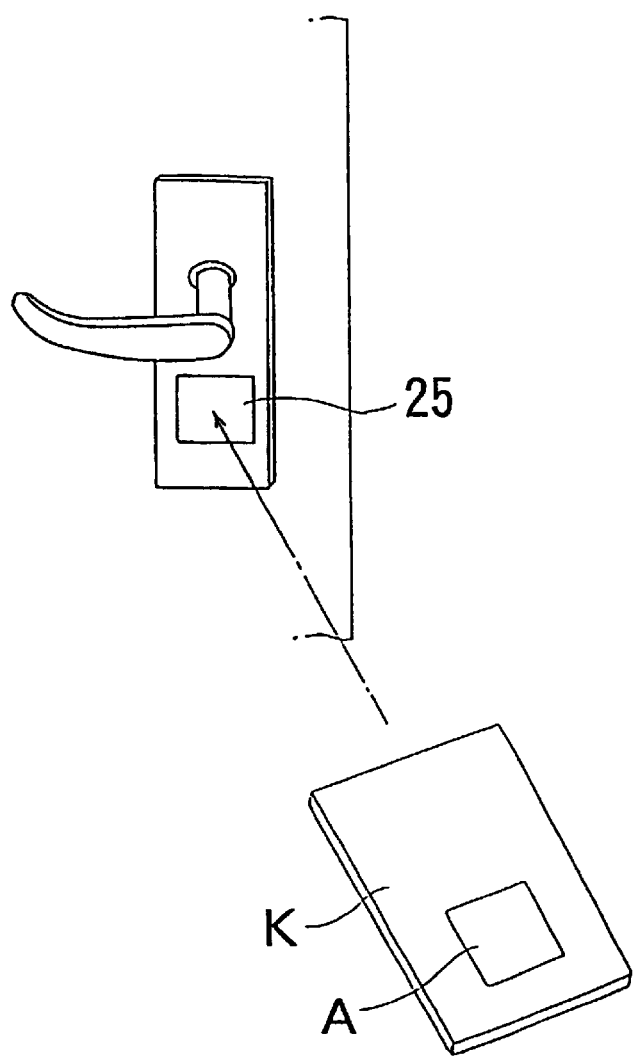
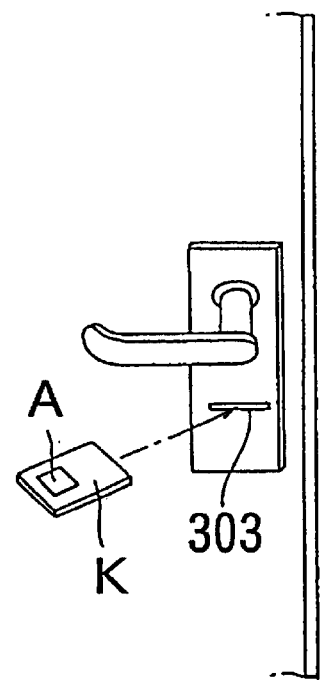

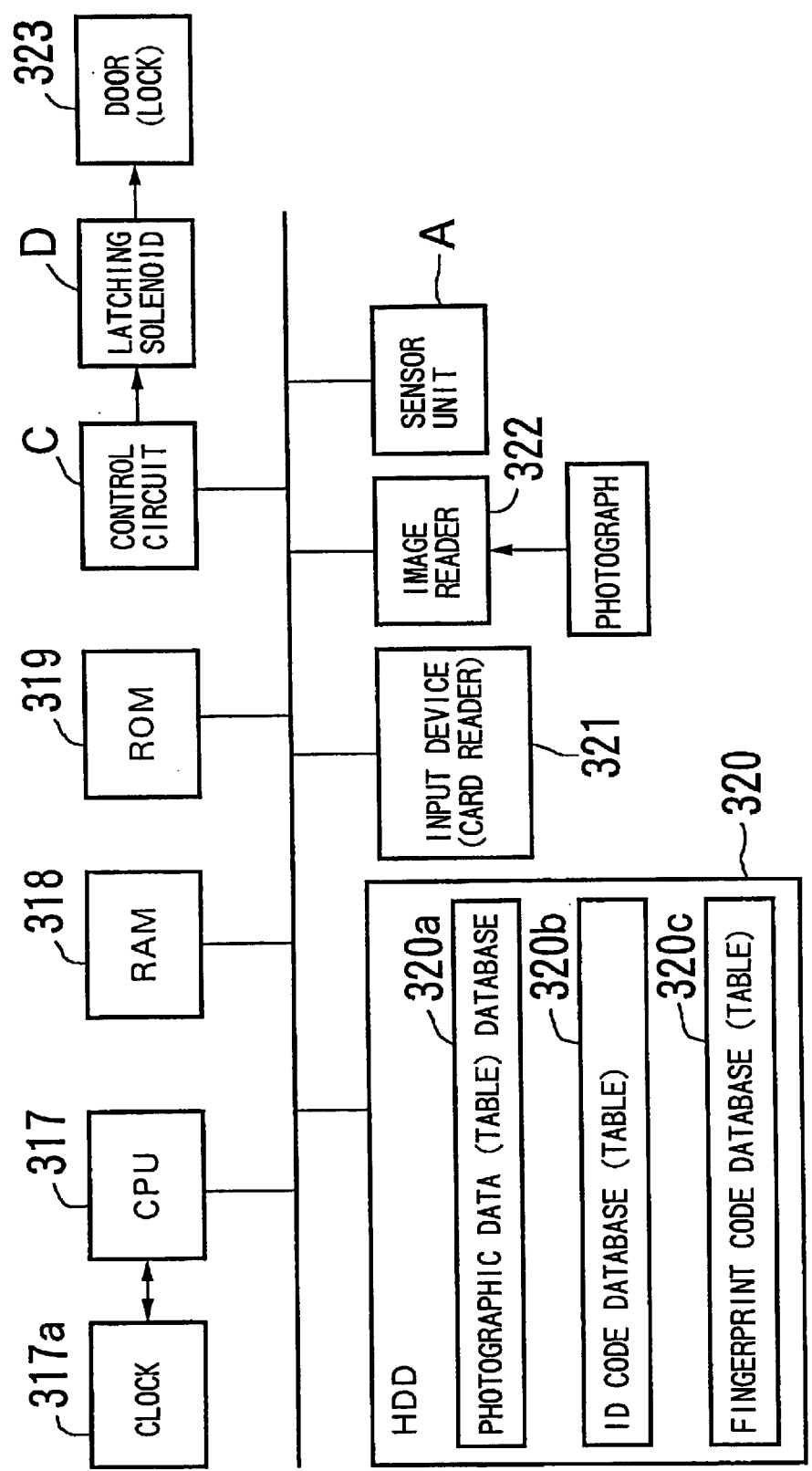

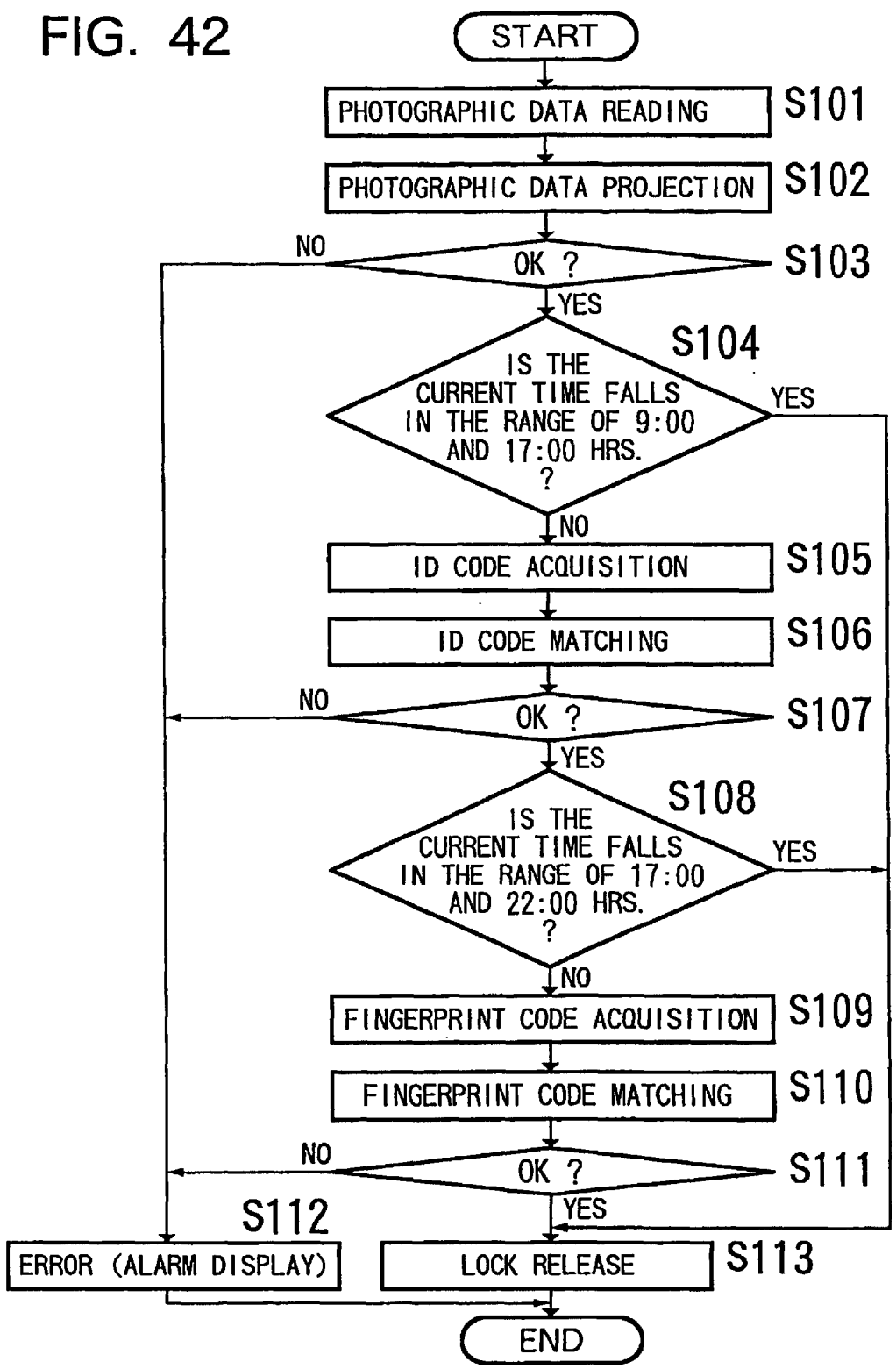

LOCK AND SWITCH USING PRESSURE-TYPE FINGERPRINT SENSOR

FIELD OF THE INVENTION

The present invention deals with locks and switches in which pressure-based fingerprint sensor is used.

BACKGROUND OF THE INVENTION

Fingerprint matching systems that detect fingerprints and compare them with fingerprint data in a stored database have been available in the prior art for some time now. Such fingerprint identification systems are being increasingly used in various devices for identifying users. For example, door locks can be operated through the matching of fingerprints instead of ID numbers. This prevents breach of security through misuse of ID numbers by unauthorized persons. Locks that use fingerprint matching systems are currently in use.

Conventional fingerprint matching systems found in the prior art, however, have some shortcomings. In conventional systems, identification is performed by first sensing the fingerprint data and comparing it with fingerprint data in a database. So, such systems require a sensor (hereinafter referred to as "fingerprint sensor") that detects fingerprint data which can then be used for matching. In conventional systems, fingerprint sensors are used which detect the fingerprint data utilizing the principles of light or electrostatic capacitance.

However, the optical fingerprint sensors sometimes cannot accurately detect fingerprint data in strong ambient light, such as when used outdoors during the day. Also, capacitance-based sensors at times have to cope with noise because of electromagnetic waves present in the environment where they are used. Moreover, both types of prior art fingerprint sensors are prone to error in the presence of moisture. Therefore, when such sensors are used outdoors on a wet day or in locations with high humidity, accurate fingerprint data sometimes cannot be obtained. Still another limitation is that sweat, grease, etc. on the finger often affects the detection accuracy of fingerprint data.

Thus, fingerprint sensors based on light or capacitance have inherent limitations, depending on the environment in which they are used, i.e., the season, geographical location, the weather, etc. This type of lowered detection accuracy of fingerprint data directly leads to the non-functioning of locks that use such fingerprint sensors, considerably limiting the possible applications for such locks. Another problem with optical fingerprint sensors is that a fairly large-sized device is required for accurate detection of fingerprint data. So, optical fingerprint sensors cannot be conveniently used for as part of a lock for objects that are relatively small.

The present applicant had earlier applied for and was granted a Japanese Patent (Patent application NO HEI 5-277619/1993 and U.S. Pat. No. 2,557,795) for a pressure-based fingerprint sensor (surface pressure input panel) which did not depend on optical or capacitance input.

The present invention was made in view of the above-described prior art. Its objective is to overcome the shortcomings of conventional fingerprint sensors and to provide locks and switches that use pressure-based fingerprint sensors which are more reliable than conventional sensors.

DESCRIPTION OF THE INVENTION

The present invention includes the components described below for solving the problems of the prior art. In short, it comprises a lock equipped with a pressure-based fingerprint sensor, the lock having a locking mechanism that can lock or unlock the object that is to be secured, a pressure-based fingerprint sensor that detects the fingerprint pattern, a memory device that maintains registered (enrolled) fingerprint data, a matching unit that determines whether the fingerprint data created from the pattern detected by the pressure-based fingerprint sensor matches with fingerprint data registered in the memory device, and a control unit that operates the locking mechanism in response to the determination made by the matching unit.

More simply, when the pressure-based fingerprint sensor is pressed by a finger, a fingerprint data set is created on the basis of the sensed fingerprint pattern. Whether this data set matches the registered fingerprint data is then determined. If there is a match, the control unit operates the locking mechanism.

The locking mechanism is preferably, for instance, a latching solenoid. A semiconductor memory, a magnetic disk, an opto-magnetic disk, a hard disk, etc. may be used for the memory, but an EEPROM is preferable. The matching unit may be a digital processor, and the control unit can consist of a digital processor and an electronic circuit. The object to be secured can be the object itself whose movement is to be controlled (such as a door), or a lock which is attached to such an object, and the lock can have any type of mechanical configuration.

In the present invention, the control unit can be set up so that it would unlock the locking mechanism and permit movement of the object when the matching unit determines that the sensed fingerprint data match with the registered fingerprint data.

The control unit can also be set up so that the locking mechanism will prevent the movement of the object when the matching unit determines that the sensed fingerprint data do not match with the registered fingerprint data.

Also, in the present invention, the matching unit can be embedded in a single pc board, pc card, integrated circuit, VLSI, or the like (logic element). In that case, both the fingerprint pattern detected by the pressure-based fingerprint sensor and the registered fingerprint data maintained in the memory are both inputted into the logic element and the result of the determination by matching unit is outputted from the logic element and received by the control unit.

This logic element can also house the memory device and the fingerprint sensor. The logic element is preferably a pc board.

When the logic element and other elements of the invention are distributed instead of integrated, any conventional method can be used for transmission of data (communication) between the matching unit and control unit. For example, the matching unit and the control unit can communicate electrically, or through wireless, infrared, magnetic coupling, or static electricity-based systems.

The present invention is broad enough to include switching systems equipped with a pressure-based fingerprint sensor consisting of a switch that electrically connects electrical and electronic devices, a pressure-based fingerprint sensor that detects the fingerprint pattern, a memory device that maintains registered fingerprint data, a matching unit that determines whether the fingerprint data set created from the pattern detected by the pressure-based fingerprint sensor matches the fingerprint data registered in the memory device, and a control unit that operates the switch when the matching unit decides that the fingerprint data match.

The present invention is also broad enough to include switching systems equipped with pressure-based fingerprint sensors which consist of a switch that electrically disconnects electrical or electronic devices, a pressure-based fingerprint sensor that detects the fingerprint pattern, a memory device that maintains registered fingerprint data, a matching unit that determines whether the fingerprint data set created from the pattern detected by the pressure-based fingerprint sensor matches fingerprint data registered in the memory device, and a control unit that operates the switch to turn off the power when the matching unit decides that the fingerprint data match.

In this embodiment of the invention, some of the elements can be contained in a single logic element. Any known method may be used for data transmission between the matching unit and the control unit.

The present invention also comprises a controller that outputs signals for operating a locking mechanism to the control device of the locking mechanism, where the controller is equipped with a pressure-based fingerprint sensor that detects the fingerprint pattern, a memory device that maintains registered fingerprint data, a matching unit that determines whether the fingerprint data set created from the fingerprint pattern detected by the pressure-based fingerprint sensor matches with fingerprint data registered in the memory device, and a transmission unit that transmits the result of the matching to the control device as a signal for operating the locking mechanism.

The present invention also comprises a controller that outputs signals for operating a control device that switches power to an electrical or electronic device, where the controller is equipped with a pressure-based fingerprint sensor that detects the fingerprint pattern, a memory device that maintains registered fingerprint data, a matching unit that determines whether the fingerprint data set created from the pattern detected by pressure-based the fingerprint sensor matches with fingerprint data registered in the memory device, and a transmission unit that transmits an operating signal to the control device to actuate the power supply switch, when the matching unit determines that the fingerprint data match.

The present invention also comprises a controller that outputs signals for operating a control device that disconnects power to an electrical or electronic device, where the controller is equipped with a pressure-based fingerprint sensor that detects the fingerprint pattern, a memory device that maintains registered fingerprint data, a matching unit that determines whether the fingerprint data set created from the pattern detected by the pressure-based fingerprint sensor matches with fingerprint data registered in the memory device, and a transmission unit that transmits an operating signal to the control device to operate the switch disconnect power when the matching unit decides that the fingerprint data match.

BRIEF DESCRIPTION OF THE DRAWINGS

FIG. 1 depicts a schematic diagram of a lock in which a pressure-based fingerprint sensor is used, in Application Mode 1 of the present invention.

FIG. 12 depicts another diagram that explains Example 6 of an application of the present invention.

FIG. 29 depicts a schematic diagram of a lock in which the pressure-based fingerprint sensor is used in Application Mode 2 of the present invention.

FIGS. 30(a)–(c) depict diagrams showing various alternative structures for the lock depicted in FIG. 29.

FIG. 31 depicts an example for applying the present invention to a specific set of devices.

FIG. 34 depicts a diagram that explains Example 18 of an application of the present invention.

FIG. 41 depicts a diagram that explains Example 25 of an application of the present invention.

FIG. 42 shows a flow chart for the software in the system depicted in FIG. 41.

BEST MODES FOR PRACTICING THE INVENTION

Figure 2A:
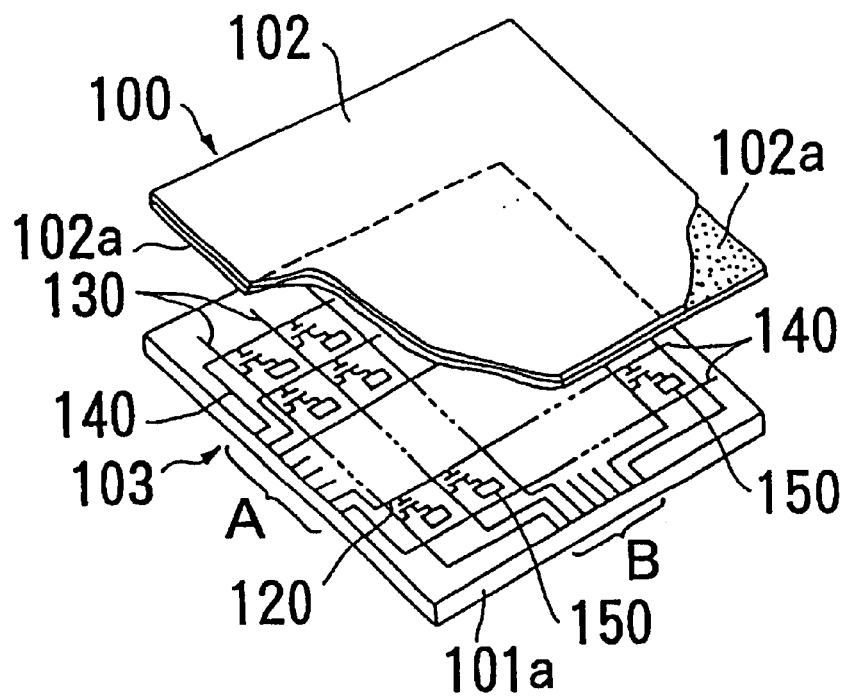
FIG. 2 depicts a schematic diagram of the sensor used in the system shown in FIG. 1.

We shall now explain the best modes of applying the invention while referring to the drawings.

[Application Mode 1]

FIG. 1 shows a diagram of a lock equipped with a pressure-based fingerprint sensor 10 (hereinafter this lock is referred to simply as "sensor lock") in Application Mode 1 of the new invention. In this Figure, the sensor lock 10 consists of a sensor unit A, a matching circuit B connected to A, a control circuit C (this corresponds to the control unit) connected to B, and a latching solenoid D (the locking mechanism) connected to C.

The sensor unit A detects the fingerprint pattern of a finger that is pressed against the sensor. The matching circuit B matches the fingerprint pattern detected by A with the pre-registered fingerprint data and sends the result to the control circuit C. The control circuit C outputs a control signal, according to the result of matching done by B, to the latching solenoid D which acts according to the signal received, to carry out the unlocking/locking operation of the concerned object E. We shall now explain the configuration of each part in greater detail.

<<Sensor Unit>>

As shown in FIG. 1, the sensor unit A is an IC where a pressure-based fingerprint sensor (hereinafter referred to simply as "sensor") 100, a control circuit 118, an x-direction resistor 160, and a y-direction resistor 170 are integrated into one chip. A surface pressure input panel, such as the one that has been described in Japanese Patent Unexamined Publication NO Hei 8-68704 (69704/1996) U.S. Pat. No. 2,557, 795, and a fingerprint print pattern detection circuit (a control circuit) are used in the sensor unit A.

FIG. 2(a) depicts a structural diagram of the sensor 100 (surface pressure input panel). Here, the sensor 100 has a flexible pressure sheet 102 which has a conductive film 102a at its bottom surface. Sensor 100 also comprises a circuit board 103 in which the scanning electrodes 130 and 140 are arranged in a matrix pattern on the insulator base plate 110. A thin film transistor (TFT) 120 and a conductive contact plate 150 are provided at each crossing point of the scanning electrode wires 130 and 140. The conductive film 102a of the pressure sheet 102 is so laminated that it comes in contact with the conductive contact plates 150 of the circuit board 103. The gate and drain of the TFTs 120 are connected to the ends of the scanning electrode wires 130 and 140 arranged in a matrix pattern, and the source is connected to the conductive contact plate 150.

Figure 2B:
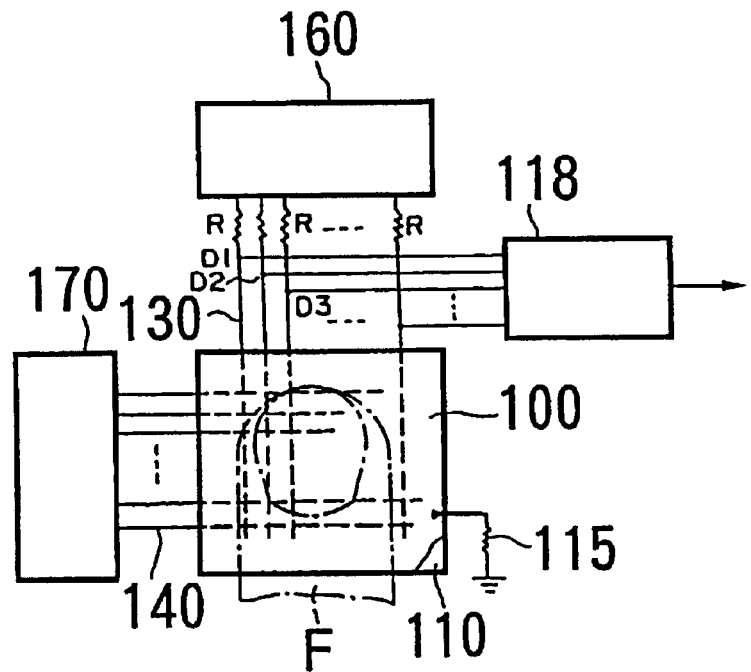

FIG. 2(b) depicts a diagram explaining the functioning of the sensor unit A. When the sensor 100 is pressed by a finger and the scanning signals are sent out from x-direction resistor 160 and the y-direction resistor 170, the signal from each detection element, the main part of which is the TFT 120, is fed to the control circuit (detector) 118 as a time series and outputted to the matching circuit B. Here, the signal from each detection element differs depending on the pressure applied by the finger on the sensor 100, i.e., depending on whether it was pressed by a ridge or whether there was no ridge (valley) at that location in the finger. Therefore, by expanding the signal from the detection elements on to an x-y plane according to their location we can obtain the fingerprint pattern (image data) of the finger used to press the sensor.

In this example, a number of TFTs 120 were preferably used in the sensor. But thin film diodes may instead be used.

<<Matching Circuit>>

The matching circuit B shown in FIG. 1 is equipped with a DSP (digital signal processor) 12 which is the matching unit and has a flash memory 11, a RAM (random access memory) 13 connected to the DSP 12, and an EEPROM (electrically erasable programmable ROM) 14 which is the memory device. The HDD (hard disk) 15, which is also a memory device, and the input unit 16 are connected to the matching circuit B.

The flash memory 11 preferably maintains the various control programs that will be executed by the DSP 12. For example, the flash memory 11 preferably maintains the programs, like the fingerprint code encoding program 17, the fingerprint matching program 18, the fingerprint registering program 19, etc., which are externally loaded. However, the control programs maintained in the flash memory can be pre-installed, such as in the form of built-in firmware.

The DSP 12 receives the fingerprint pattern from the sensor unit A, through the execution of the control programs 17–19 maintained in the flash memory 11. The DSP 12 is connected to the sensor unit A through signal wires S1 to S4.

The signal wire S1 is used by the DSP 12 to send the driving clock signals from the clock generation circuit (not shown) to the control circuit 118 of the sensor unit A. DSP 12 receives the fingerprint pattern from the control circuit 118 over signal wire S2. DSP 12 sends the scanning commands to the x-direction resistor 160 and the y-direction resistor 170 over signal wires S3 and S4.

When the DSP 12 outputs the scanning command through the signal wires S3 and S4 as in the above setup, scanning signals are outputted from the x-direction resistor 160 and the y-direction resistor 170 and the control circuit 118 which receives the fingerprint pattern. The DSP 12 then receives, in step with the driving clock, the fingerprint pattern from the control circuit 118 through the signal wire S2. Upon receiving the fingerprint pattern from the sensor unit A, the DSP 12 carries out the process of fingerprint encoding, matching, registering, etc. These processes will be discussed again, infra.

The RAM 13 is used mainly as the work area of the DSP 12.

The EEPROM 14 maintains the registered fingerprint codes (registered fingerprint data) used for matching by the DSP 12. In this application mode, the EEPROM 14 can maintain about 5 to 10 registered fingerprint codes.

The HDD 15 stores the registered fingerprint codes that are in excess of the capacity of the EEPROM 14 to store.

Thus, the HDD 15 is used only when the registered fingerprint database is large.

The input unit 16 is used to input the ID code (encoding key) which is used, for instance, when the DSP 12 encodes the fingerprint data. This input unit 16 can be detachably installed on the matching circuit B or it can be integrated with B.

Figure 3:
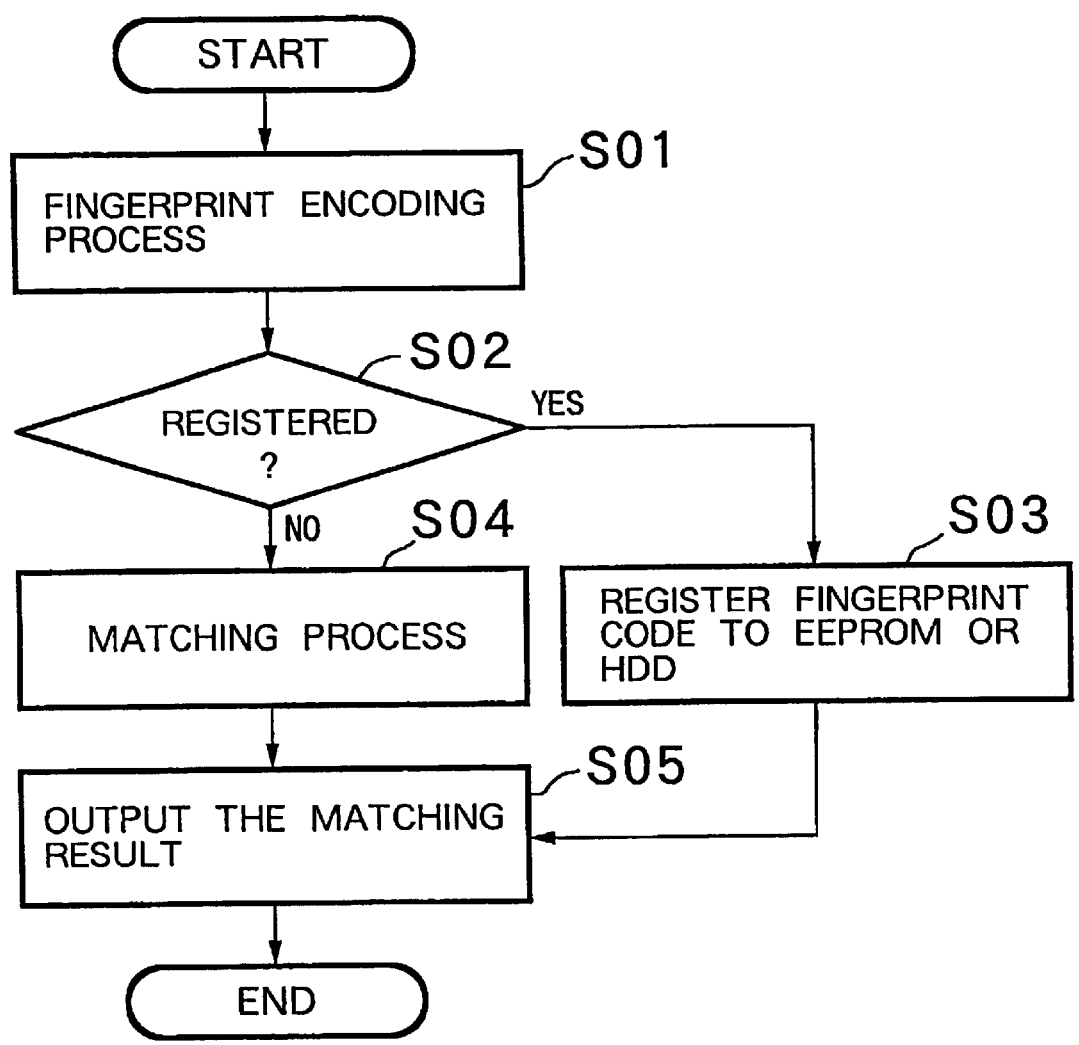
FIG. 3 depicts a flow chart of the processing in the matching circuit shown in FIG. 1.

FIG. 3 is a flow chart of a typical software for the DSP 12. The program shown in FIG. 3 starts processing when the DSP 12 receives the fingerprint pattern from the sensor unit A.

Firstly, the DSP 12 executes the fingerprint encoding step S01 using the fingerprint pattern received from the sensor unit A. In other words, the DSP 12 extracts a number of characteristic points called minutiae from the fingerprint pattern. Then, by encoding the relative positions of each minutia it creates a fingerprint code, of about 256 bytes for instance.

In the next step, the DSP 12 determines whether the fingerprint code generated in Step S01 is to be recorded as a registered fingerprint code or not (Step S02). If it determines that is to be registered (S02; "Yes"), the processing proceeds to S03. If it decides otherwise (S02; "No"), the processing proceeds to Step S04.

When the DSP 12 advances to Step S03, the fingerprint code created in Step S01 is stored in an appropriate area of the EEPROM 14 or the HDD 15 (Step S03) and the processing is completed.

On the other hand, if the DSP 12 advances to S04, the matching of the fingerprint is carried out. In other words, DSP 12 reads out the registered fingerprint codes either from the EEPROM or the HDD and compares them with the fingerprint code obtained in Step S01 (we shall call this the "offered fingerprint code") and determines whether there is a match. If a number of registered fingerprint codes are maintained in the EEPROM and the HDD, each registered fingerprint code is compared with the offered fingerprint code for a possible match.

The DSP 12 outputs the result of Step S04 (the result of the matching) to the control circuit C (Step S05). In this step, the DSP 12 outputs a "Yes" signal if there is a match between the offered fingerprint code and one of the registered fingerprint codes, and a "No" signal if there is no match.

Alternatively, after the DSP 12 asks for the input of an ID code (encoding key) from the input unit 16 in Step S01, and the fingerprint code is encoded using this ID code, the encoded fingerprint may be registered in the EEPROM 14 or the HDD 15 in Step S03. In this case, the DSP 12 demands the input of the ID code in Step S04 and then uses the ID code to decode the fingerprint codes stored in the EEPROM and the HDD for matching.

Alternatively, the system can be set up so that after the DSP 12 demands the input of the ID code (encoding key) through the input unit 16 in Step S04, the inputted ID code and the registered ID codes are compared and a "Yes" signal is output in Step S05 only if there is a match between the fingerprint code and the ID code. In this case, the pre-registered ID code is stored in the EEPROM 14 for instance.

<<Control Circuit and the Latching Solenoid>>

The control circuit C shown in FIG. 1 latches in response to the output signals ("Yes" or "No") from the matching circuit B. It allows current flow between the terminal T1 and T2 according to the signal. In other words, when it receives a "Yes" signal, the control circuit C passes current from the terminal T1 to the terminal T2 as a control signal. On the other hand, when the control circuit C receives a "No" signal, it passes current from terminal T2 to terminal T1, as a control signal.

The latching solenoid D has coil 21, the ends of which are connected to the terminals T1 and T2, and a pin 22 that can move inside the coil 21. The concerned object E, which has to be locked or unlocked, has a latching hole 23 that is aligned with an end of the pin 22. Here, the part that will be latched by the pin 22 can have any shape as long as it can lock or unlock the movement of concerned object E.

The pin 22 moves away from the concerned object E when the current flows from the terminal T1 to terminal T2, completely disengaging the end of the pin 22 and the hole 23 (Position 1). On the other hand, when the current flows from terminal T2 to terminal T1, the pin moves towards the object E, assuming the Position 2 where one end of the pin 22 engages the hole 23.

Therefore, when the pin 22 is in Position 2, the movement of the object E is restricted or locked. When pin 22 is in Position 1, on the other hand, the restriction is removed and the concerned object E is unlocked.

The pin 22 assumes only one of the positions, i.e., 1 or 2, and retains that position depending on the control signal from the control circuit C. Pin 22 maintains Position 1 during the time when the control circuit C receives a "Yes" signal until the time it receives a "No" signal. Pin 22 remains in Position 2 from the time the control circuit receives a "No" signal up to the time it receives a "Yes" signal.

So, when a user (who may be one of a selected group of persons) of the above-described sensor lock 10 presses a finger (the index finger for instance) which corresponds to one of the registered fingerprint codes, against the sensor 100, the matching circuit B outputs a "Yes" signal and the pin 22 assumes Position 1 unlocking concerned object E. On the other hand, if the user presses a finger (the middle finger for instance) that does not correspond to any one of the registered fingerprint codes, a "No" signal is output by the matching circuit B and the pin 22 assumes Position 2, locking object E.

Here, the concerned object E that is to be locked or unlocked can be an object (like a door) itself the movement of which is to be locked, or a conventional lock (like a lock attached to a door, etc.) which is attached to the object the movement of which is to be locked or unlocked.

In this application, the control circuit C is set up so that the pin 22 of the latching solenoid D shifts its position depending on a "Yes" or "No" signal received by the control circuit C. However, it can be set up so that the pin 22 moves between Position 1 and Position 2 only when the control circuit receives a "Yes" signal. In this case, every time the sensor 100 is pressed with a matching finger, locking or unlocking of the concerned object E is carried out.

In this application mode, we have so far discussed only the case in which only one matching circuit B is used. However, more than one matching circuit B may be provided if a large number of registered fingerprint codes have to be handled. In that case, the system is set up so that the offered fingerprint pattern is fed for verification to each of the matching circuits B and if a "Yes" signal is output from any one of the circuits B, then a "Yes" signal is sent to the control circuit C. If there is no "Yes" signal sent from any of the matching circuits B, a "No" signal is sent to the control circuit C. In this manner, the processing can be speeded up and the response time, from the point when the sensor 100 is pressed to the time of locking or unlocking of the concerned object E, can be reduced.

The sensor lock 10 can be provided with power generating component, such as solar cells. It can also have some power storing element (like batteries) that can be used to accumulate the power produced by the power generating component.

The sensor lock 10 of Application Mode 1 is not susceptible to the effects of moisture (humidity in the atmosphere, rain, sweat, etc.), dryness, greasiness of the finger, etc. compared to the optical or capacitance-based sensors, because it uses a pressure-based sensor. Therefore, the sensor lock 10 can be used irrespective of the season, geographical location, weather, and other environmental factors. Moreover, the sensor lock 10 is far less sensitive to the effect of outdoor light, radio waves, other electromagnetic waves, etc. compared to conventional fingerprint sensors, and therefore, it has a wider applicability. An additional advantage of the sensor lock 10 is that it is very light, small, short, and thin and consumes very little power compared to conventional fingerprint sensors. Therefore, the system can be miniaturized and the sensor lock 10 can be fitted with only minor modification to the concerned object E.

The sensor lock 10 shown in FIG. 1 can be provided with a warning mechanism like a buzzer, LED or other display device, light, etc. for indicating when the fingerprint code does not match, the power level is low, there is an overflow of memory capacity, the sensor lock is malfunctioning, etc., or when the sensor 100 is not properly pressed. This would ensure proper use and maintenance of the sensor lock 10.

The sensor lock 10 shown in FIG. 1 preferably has a structure that enables recording of the fingerprint of any finger that presses sensor 100. This permits the tracing of the use of the sensor lock (by whom and how often) on the basis of the recorded fingerprint codes, and the persons with registered fingerprints (whose fingerprint data are recorded for permitted use of the sensor lock 10) can be managed. Also, non-enrolled persons who try to unlock the concerned object E by using the sensor lock 10 can be identified and unauthorized use can be discouraged.

The matching circuit B can be configured to reject an offered fingerprint code that matches perfectly, and with no minor imperfections, with a registered fingerprint code (by outputting a "No" signal), and to display a warning signal of the type mentioned earlier. The fingerprint code generated differs slightly each time the sensor is pressed, even if it is pressed by the same finger. So, if the offered fingerprint code matches perfectly with a registered one it is likely that the offered code was created in an unauthorized manner using the registered code. This feature can thus prevent the unlocking of the object by unauthorized copying of a fingerprint code.

The above-described sensor lock 10 can also have an auto-check feature. This a feature that confirms whether a person who has a registered fingerprint is actually operating the object E, by requiring a re-input of the fingerprint after a certain time interval, even if the object E (including those using a conventional lock) was once unlocked after the first matching.

The sensor lock 10 can be set up to have different categories of access, such as by grouping the registered users according the type of operation or according to the type of functions, so that persons belonging only to certain groups can operate the sensor lock 10 of the concerned object E (including the systems that use a conventional lock).

EXAMPLE 1

Figure 4A:
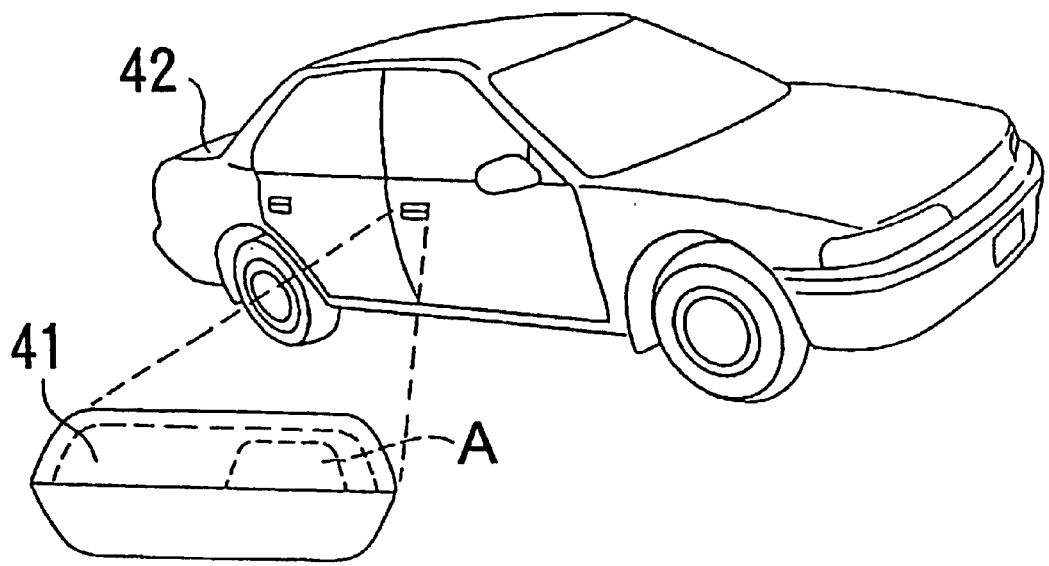
FIG. 4 depicts a diagram that explains Example 1 of an application of the present invention.
Figure 4B:
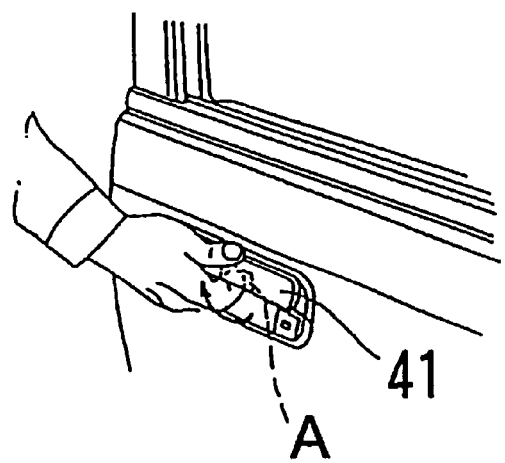

We shall now explain an example of the use of the sensor lock 10 described above. FIG. 4 shows an example of applying the sensor lock 10. FIG. 4(a) shows an example where a sensor lock 10 of the type shown in FIG. 1 is used for the doors and trunk of an automobile.

In FIG. 4(a), there is no keyhole in the doors and trunk of the car. Instead, the sensor lock 10 is installed in the door on the driver's side. The door handle 41 has the sensor unit A of the sensor lock 10. The sensor unit A is installed on the inside surface of the door handle 41 at the position where the index finger is normally placed when a person pulls the door knob towards himself, FIG. 4(b). The matching circuit B, the control circuit C, and latching solenoid D, all of the type shown in FIG. 1, are installed inside the door.

The trunk lid 42 has a door handle (not shown) for opening and closing the trunk. A sensor A is installed on the back side of this handle also. The trunk lid 42 is so constructed that it can be opened by pulling the trunk handle towards the person who is opening the trunk. At the time when the doors and trunk are locked, the pin 22 (see FIG. 1) of the sensor lock 10 is inside the hole 23 on the door handle 41 and the trunk handle, restricting the movement of these parts. The door handle and the trunk lid handle are thus immobilized and their locking mechanisms cannot be unlocked, and the door and trunk remain closed. When a person with a registered fingerprint presses the sensor 100 of the door or the trunk with the appropriate finger, the linkage between the pin 22 and the hole 23 of that sensor get disengaged, releasing the restriction on the movement of the handle. So, if the registered person pulls the handle, it moves and the door or trunk gets unlocked, making it possible for it be opened.

Figure 5:
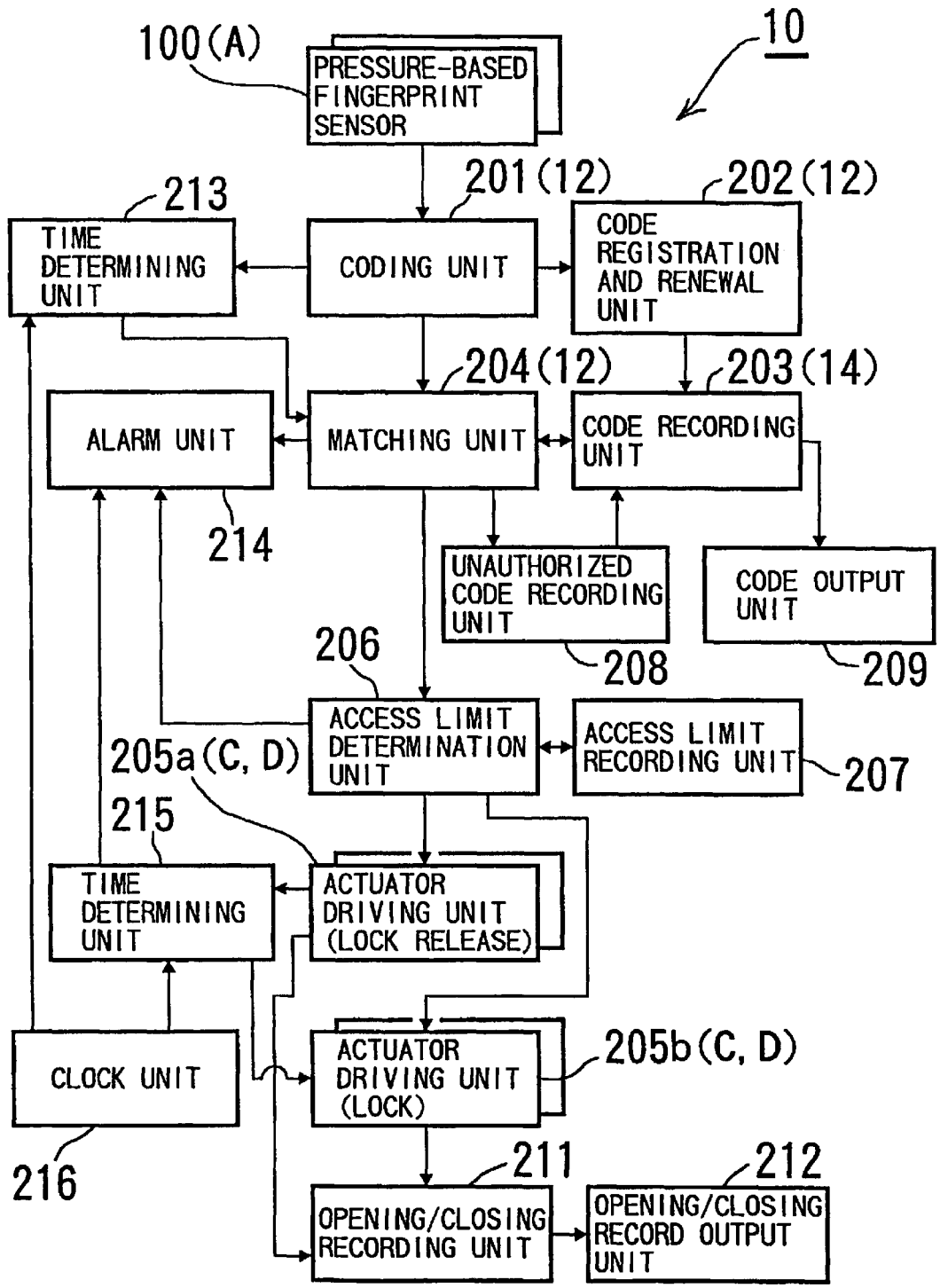
FIG. 5 depicts a functional block diagram of Example 1.

FIG. 5 is a functional block diagram of the sensor lock 10 used in Example 1. The sensor lock 10 has a sensor 100 (sensor unit A), a coding unit 201 connected to the sensor 100, a registration and renewal unit 202 connected to the coding unit, and a code record unit 203 that is connected to the registration and renewal unit 202.

The coding unit 201 performs some of the function of the DSP 12 of FIG. 1. It prepares a fingerprint code from the fingerprint pattern detected by the sensor 100. The code registration and renewal unit 202 also performs some of the function of DSP 12 of FIG. 1. It receives the fingerprint code form the coding unit 201 and stores (renews) it in the record unit 203. The code record unit 203 corresponds to the EEPROM 14 of FIG. 1 and it maintains the fingerprint codes stored by the code registration and renewal unit 202 as the registered fingerprint codes. The sensor lock 10 is equipped also with a matching unit 204 which is connected to the coding unit 201, the access limit determination unit 206 which is connected to the matching unit 204, the actuator driving units 205a and 205b and the access limit record unit 207, all of which are connected to the access limit determination unit 206, the time judging unit 213 which is connected to the coding unit 201 and the matching unit 204, an alarm unit 214 which is connected to the matching unit 204 and the access limit determination unit 206, and a clock 216 which is connected to the time judging unit 213.

Here, the time judging unit 213 maintains the current time data, on the basis of the clock signals supplied by the clock 216. The unit 213 receives a signal from the coding unit 201 when a fingerprint code has been prepared by coding unit 201, and provides the time of arrival of the code to the matching unit 204.

The clock 216 is a clock generating circuit that provides clock signals to the time judging unit 213. The matching unit 204 performs some of the function of the DSP 12 of FIG. 1. Upon receiving the fingerprint code from the coding unit 201, the matching unit 204 reads out the registered fingerprint codes from the code recording unit 203 to determine whether there is any match between the offered fingerprint code and a registered fingerprint code. Here, if the matching unit 204 determines that there is a match, it outputs specific information about the matched fingerprint code (specific information about the owner of the fingerprint), a signal for unlocking the door or trunk (a "Yes" signal) and the arrival time of the code obtained from the time judging unit 213, to the access limit determination unit 206. On the other hand, when there is no match for the offered fingerprint code, the matching unit 204 sends out specific information about the code (code-specific information) and a signal to prevent the unlocking of the door or trunk (a "No" signal), to both the access limit determination unit 206 and the alarm unit 214.

The access limit record unit 207 is, preferably, a semiconductor memory device. It maintains the access control data about the door and trunk derived from the specific information about the fingerprint code. Here, the access control data are data specifying access control specific to the owner of each registered fingerprint code. For example, it can be data about the time interval during which an enrolled person can use the car (permitted time period data).

The access limit determination unit 206 can consist of a digital processor (DSP, CPU, etc.) or electronic circuit. When it receives the code-specific information, a "Yes" signal and arrival time of the code, all from the matching unit 204, the access limit determination unit 206 reads out the access control data corresponding to the code-specific information received, from the access limit record unit 207 and determines whether to provide access through the door or trunk, on the basis of the access control data. The access control unit 206 also determines whether the arrival time of the fingerprint code is within the permitted time period, if the access control data includes data on the permitted time period.

The access limit determination unit 206 sends out a "No" signal and the code arrival time to the actuator unit 205b and the alarm unit 214 if it judges that access is to be denied (for instance when the code arrival time is outside the permitted time interval). On the other hand, if it judges that access can be permitted (if the code arrival time is within the permitted time interval, for instance) it outputs the code-specific information, a "Yes" signal and the code arrival time to the actuator unit 205a.

With the help of the above-described access limit determination unit 206, the unlocking of the door or trunk (the use of the car) can be controlled in relation to specific information about the fingerprint owner, even when there is a match of the fingerprint code. This feature is very useful when one car is to be shared by a number of persons and the permitted time interval for use of the car is strictly regulated, even though only an authorized person can use a car. When there is no access control data corresponding to the code-specific information in the access limit record unit 207, the access limit determination unit 206 provides the code-specific information about the code that came from the matching unit 204, a "Yes" signal, and the code arrival time to the actuator unit 205a. Otherwise it sends a "No" signal that came from the matching unit 204 and the code arrival time to the actuator driving unit 205b and a "No" signal to the alarm unit 214.

The actuator units 205a and 205b correspond to the control circuit C and latching solenoid D of FIG. 1. The actuator unit 205a, upon receiving the code specific information and a "Yes" signal from the access limit determination unit 206, removes the restriction on the movement of the door handle 41 or the trunk handle (unlocks the door or trunk), making it possible to open the door or the trunk manually. On the other hand, the actuator driving unit 205b, upon receiving a "No" signal from the access limit determination unit 206, restricts the movement of the door handle 41 or the trunk handle (locks them). Then the door or trunk can be locked.

The alarm unit 214 is comprised of, for instance, a buzzer, LED, display panel, etc. Upon receiving a "No" signal from the matching unit 204 or the access limit determination unit 206, it outputs an alarm sound from the buzzer, turns on the LED, or displays a warning message on the display panel (warning display). The warning display unit can be set up so that it displays warnings when there is not enough power available to operate the sensor lock, there is insufficient memory capacity in the code record unit 203, the sensor 100 is not properly pressed, when there is some problem in the sensor lock 10 itself, etc.

In addition to these, the sensor lock 10 is provided with an unauthorized code writing unit 208 which is connected to the matching unit 204 and code record unit 203, and a code output unit 209 which is connected to the code record unit 203. The unauthorized code writing unit 208 consists of, for instance, a memory controller. This writing unit 208 receives the offered fingerprint code from the matching unit 204 when the latter sends out a "No" signal to the access limit determination unit 206, and writes it in a specific memory area of the code record unit 203.

The code output unit 209 consists of a display device and a printer. When externally instructed, it outputs the fingerprint codes recorded in the specific area of the code recording unit 203. The unauthorized code writing unit 208 and the output unit 209 enable the recording and storing of fingerprint codes, other than those of owners of registered fingerprints, who press the sensor 100, and outputting these when needed.

Therefore, using the fingerprint code outputted by the code output unit 209, the owner of the unauthorized fingerprint can be identified. In other words, a person who tries to open the door or trunk of the car without authorization can be identified. This can become a deterrent for unauthorized users. The fingerprint codes recorded in the specific area of the code record unit 203 are erased after a certain time period or after they are output.

The sensor lock 10 is provided with a time judging unit 215 which is connected to the actuator driving units 206a and 205b, the alarm unit 214, and the clock unit 216. This time judging unit 215 can be made up of, for instance, a timer, etc. When the actuator 205a unlocks the door or trunk, the time judging unit 215 receives the corresponding signal and the code arrival time from the actuator unit 205a and starts counting the time interval using the signals received from the clock unit 216. After counting a certain time interval, the time judging unit 215 sends out a "No" signal to the alarm unit 214 and the time data (the code arrival time plus the counted time) and a "No" signal to actuator 205b.

On receiving these signals, the alarm unit 214 displays the warning described above and the actuator driving unit 205b locks the door or trunk. In this manner, the door or trunk gets automatically locked after the lapse of a certain amount of time after it is unlocked.

The sensor lock 10 is provided also with an opening/closing record unit 211 which is connected to the actuator driving units 205a and 205b and opening/closing record output unit 212 connected to the record unit 211. This record unit 211 receives locking and unlocking data, the code arrival time and code-specific information from the actuator driving units 205a and 205b whenever they operate. Thus, whether the door or trunk was locked or unlocked, the time of the locking or unlocking, and information about the person (code-specific information) who does the locking or unlocking are stored in the opening/closing record unit 211.

The opening/closing record output unit 212 outputs its contents in response to an external command. This feature makes it possible to find out information about the use of the sensor lock and the use of the car.

In Example 1, only persons whose fingerprints have been registered can unlock the door or trunk of the car. Therefore, inability to access the car or trunk due to loss of the key, forgetting the key inside the car, the key being with someone else, theft of the key, etc. can be eliminated. Access to the car or trunk by a person who has stolen the key or made a counterfeit, etc. can also be prevented.

The sensor unit A is far smaller than optical fingerprint sensors and therefore can be installed on the back surface of the door handle, where it is not readily visible. Thus, the certain psychological resistance against unlocking a door through offering a fingerprint for matching can be reduced.

In this Example 1, sensor units A are provided separately for the door and trunk. But, the system can be set up so that the sensor unit A is provided only on the door handle 41 and the trunk may be locked and unlocked simultaneously with the door.

In Example 1 discussed above, no key hole was provided in the door or trunk. However, there can be key holes on the outside of the door and trunk lid and the sensor lock 10 can prevent the rotation of the key inserted in the key hole when it is locked. The rotation of the key which has been inserted in the keyhole is permitted only in unlocked state and the lock which works by means of the door or a trunk locking mechanism is opened accordingly.

EXAMPLE 2

Figure 6A:
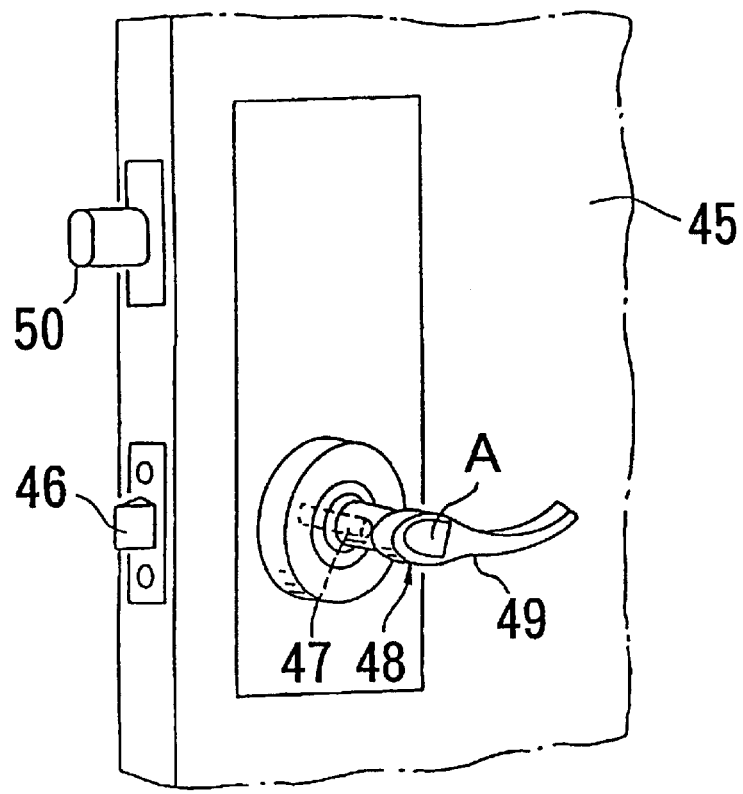
FIG. 6 depicts a diagram that explains Example 2 of an application of the present invention.
Figure 6B:
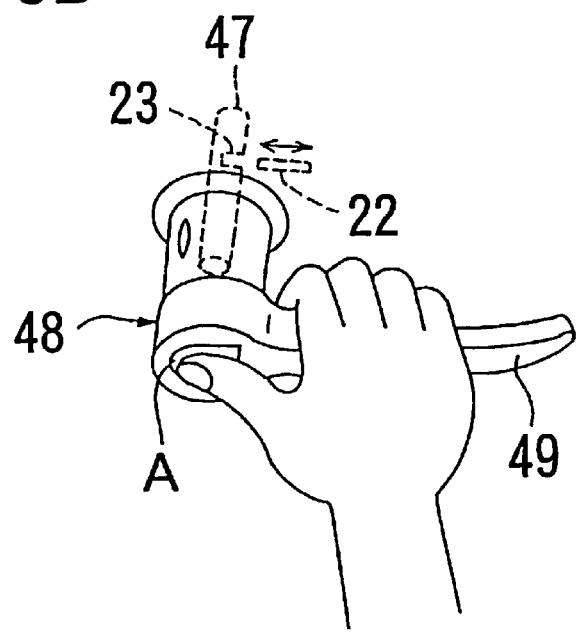

FIG. 6 illustrates Example 2 of Application Mode 1. FIG. 6(*a*) is a case where the concerned object E of FIG. 1 is for example a door of a building, or a gate. It shows the outside view of an entrance door 45 on which the sensor lock 10 has been installed. In FIG. 6(*a*), the door 45 is provided with a latch bolt 46 and a rotary shaft 47 that moves the latch bolt 46 inside the door 45, and a lock equipped with a dead bolt 50. The lock is basically the same as a conventional lock. In other words, the outer knob 48 is fixed co-axially on the rotary shaft 47 and this outer knob 48 has a lever 49 that extends along a direction generally perpendicular to the shaft 47.

The lever 49 is held in a more or less horizontal initial position by a spring kept in the lock, unless an external force is applied. The latch bolt 46 sticks out of the door 45 when the lever 49 is in the initial position. On the other hand, when the lever 49 turns in the clockwise or anti-clockwise direction, the latch bolt 46 withdraws into the door 45 in step with the rotation of the rotary shaft 47 caused by the turning of the outer knob 48.

A sensor A of the type shown in FIG. 1 is installed at the base of the lever 49. The sensor A is positioned in a such a manner that when a person holds the lever 49 and extends the thumb, the inner side of the thumb comes into contact with the sensor (see FIG. 6(*b*)). So, when the door 45 is to be unlocked, the sensor unit A is naturally pressed by the thumb. A matching circuit B, control circuit C, and latching solenoid D of the type shown in FIG. 1 are installed inside the lock. When the door 45 is locked, the pin 22 of the latching solenoid D is engaged with a hole 23 made on the rotary shaft 47, making the lever 48 immobile at its initial position. This makes the latching bolt 46 inoperable by the rotary shaft 47 and, like the dead bolt 50, fixed in place to lock the door.

When the sensor A is pressed with the appropriate finger, when the door 45 is in the locked condition, the matching circuit B outputs a "Yes" signal and the control circuit C disengages the pin 22 from the hole 23. This in turn permits the turning of the lever 49, withdrawing the latch bolt 46 into the door and unlocking the door 45. In this case, if the dead bolt 50 is sticking out of the door 45, this also is withdrawn into the door like the latch bolt 46. The door can now be opened by pulling the lever 49 outward (or inward).

For locking the door 45 from outside, the sensor A can be pressed by a finger other than one having a registered fingerprint which, in this case, is any finger other than the thumb of the right hand. In this example, the locking by the dead bolt 50 is possible only from the inner side of the door 45.

The sensor lock of Example 2 can be made very small, because the pressure-based fingerprint sensor 100 is used for detection of only the fingerprint. Thus, the sensor unit can be attached to the lever 49 of the outer knob 48 so that it is grasped in a natural way.

In this Example 2 also, the system can be set up so that if there is no match of the fingerprint, the detected unauthorized fingerprint code can be stored for some time and unauthorized attempts to open the door can be deterred.

In this example, the latching hole 23 is on the rotary shaft 47 and the pin 22 enters this hole to restrict the movement. Instead, the hole 23 can be made on the latch bolt 46 so that the pin 22 is engaged in it when the door 45 is locked. In that case, the latch bolt 46 will be extended from the door 45 when it is engaged.

EXAMPLE 3

Figure 7A:
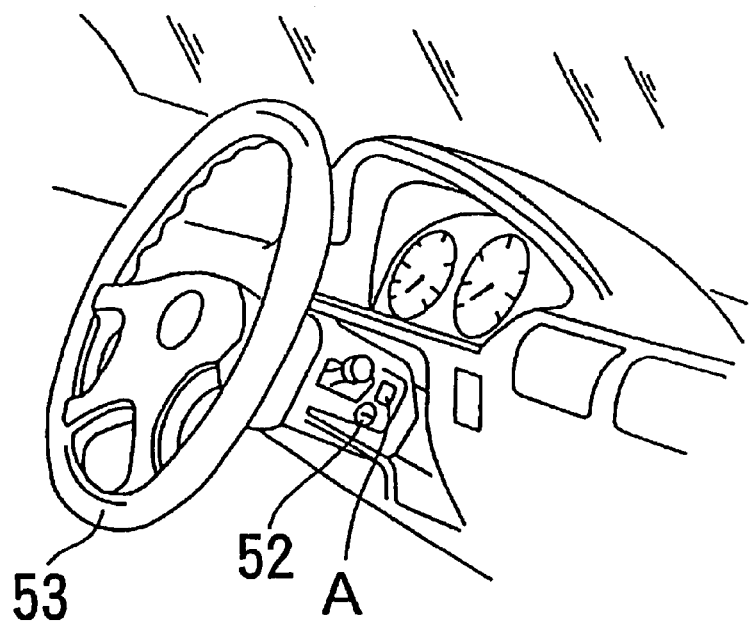
FIG. 7 depicts a diagram that explains Example 3 of an application of the present invention.
Figure 7B:
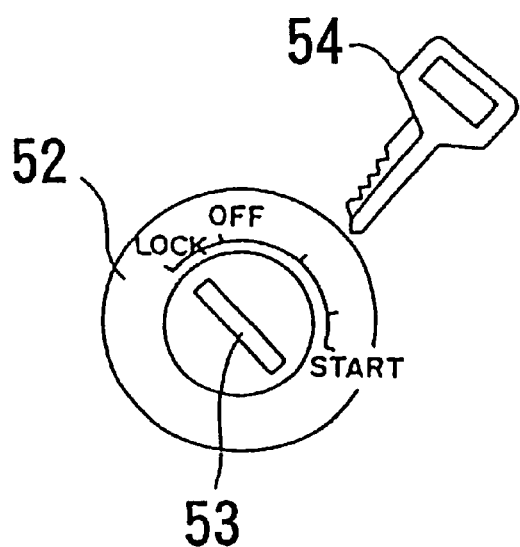

FIG. 7 explains Example 3 of Application Mode 1 of the invention. This is a case where a sensor lock 10 of the type shown in FIG. 1 is used to lock a steering wheel of a car. FIG. 7(*a*) shows the parts around the steering wheel and FIG. 7(*b*) the ignition switch 52.

In FIG. 7(*a*), the ignition switch 52 which may be operated by the key 54 of the car, is shown installed on the right side of the steering shaft cover. When the key 54 is inserted in the ignition switch 52 and turned counter-clockwise to the "Lock" position (FIG. 7(*b*)), the steering wheel 53 is locked. The structure of the steering wheel lock is not much different from conventional locks of this type.

A sensor unit A of the type shown in FIG. 1 is installed near the ignition switch 52, and the matching circuit B, control circuit C and latching solenoid D are installed inside the steering shaft cover. The pin 22 of the latching solenoid D restricts turning of the key 54 in the ignition switch 52 when the steering wheel is locked (when the slot of the key hole of 53 is in aligned with the "Lock" position).

When the steering wheel is thus locked, if the key 54 is inserted in the ignition switch 52 and a person with a registered fingerprint presses the sensor unit A with an appropriate finger, the pin 22 of the latch solenoid D releases ignition switch 52. This permits key 54 to be turned in the clock-wise direction which releases the steering wheel.

According to example 3, the steering wheel cannot be released with the key 54 alone. This prevents unauthorized unlocking of the steering wheel using a stolen or counterfeit key, thereby preventing car theft.

Moreover, unless the steering wheel lock is unlocked, the key 54 cannot turn the ignition switch to the "Start" position, which means that the starter motor of the car cannot be operated and the engine cannot be started. Therefore, the above-described sensor lock 10 functions as the starter switch of the car also. Here, the system can be set up so that one more round of fingerprint matching is required before the key 54 can turn the ignition switch 52 from the "Off" position to the "Start" position.

Figure 8:
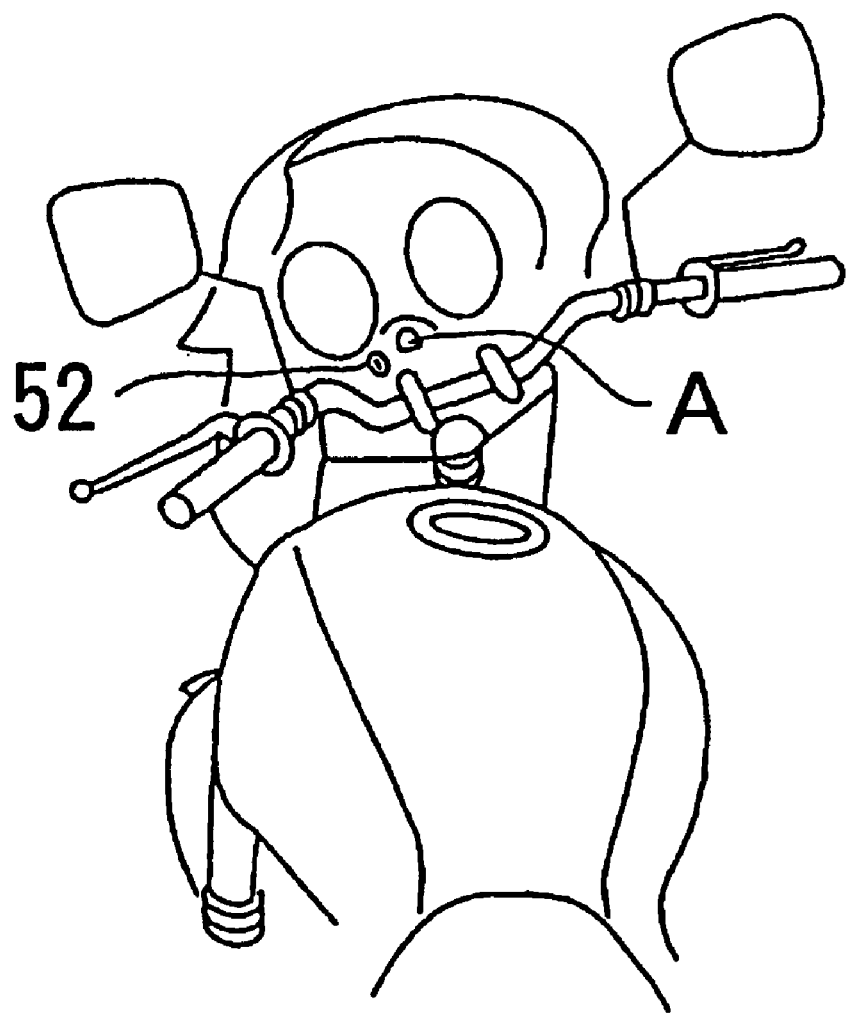
FIG. 8 depicts another diagram that explains Example 3 of an application of the present invention.

In this Example 3, we have explained a case where the present invention is used to lock the steering wheel of a car. But the same invention embodiment can be used for locking the handle of a motorcycle, a motorbike, a ship, an aircraft, etc. FIG. 8 depicts a part of a motorbike provided with a handle lock of the type described above. Because the sensor lock 10 is small, it can be installed near the ignition switch 52 of the motorbike and it has little affect on the layout of other devices.

In this example 3, we have shown the set up where a steering wheel or handle lock itself is operated with a key, as in conventional locks. But the handle or steering wheel 53 can be locked or unlocked without using a key 54 if the pin 22 directly restricts rotary movement of the steering shaft and the sensor lock 10 locks or unlocks the steering wheel directly without a key 45, which may be preferable. Such an arrangement is useful, for instance, when the key 54 is lost, and the car is to be moved after unlocking the steering wheel.

EXAMPLE 4

Figure 9A:
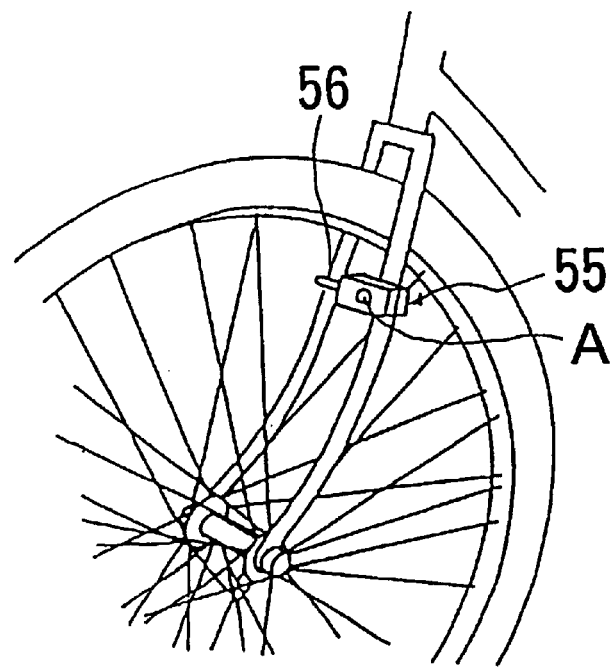
FIG. 9 depicts a diagram that explains Example 4 of an application of the present invention.
Figure 9B:
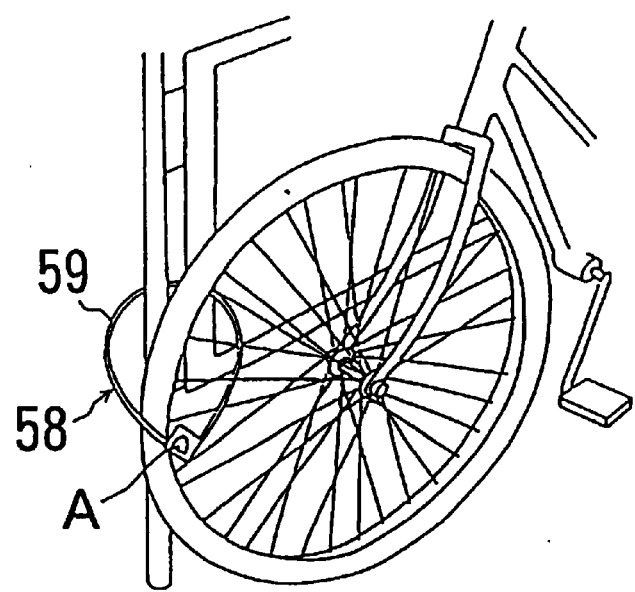

Example 4 is a case where a sensor lock 10 of the type shown in FIG. 4 is used in a bicycle lock. FIG. 9(*a*) and FIG. 9(*b*) show locks 55 and 58 where sensor locks are used.

FIG. 9(*a*) shows a case where the lock 55 is attached to the front fork of the bicycle. This lock 55 has more or less the same structure as a conventional bicycle lock. Inside the lock 55 there is a spring that pushes on the lock bar 56. When the bicycle is unlocked, this spring is in the compressed state because the lock bar 56 is pushed into the lock 55. When it is locked, the pressure on the spring is released and the lock bar 56 is pushed out of the lock 55. The lock 55 is installed on the front fork in a such a manner that the lock bar 56 will be between the spokes of the wheel when it is pushed out of the lock and the bicycle is locked by restricting the rotation of the wheel.

The sensor lock 10 (only the sensor unit A is shown here) is inside the lock, and it functions like a conventional key to keep the lock bar 56 inside the lock. When the bicycle is unlocked, the pin 22 of the latching solenoid D is engaged with a hole 23 in the lock bar 56 to keep it inside the lock 55. When the sensor unit A, which is installed on the outer surface of the lock 55, is pressed with a matching finger, the pin 22 gets disengaged from the hole 23 and the lock bar is pushed out of the lock by the spring. In this manner, the lock 55 locks and unlocks the bicycle.

FIG. 9(*b*) shows a "chain key" type lock 58 for a bicycle. One end of the chain 59 has a projection and the other end has a hole, and the lock is engaged when the projection is coupled with the hole. The sensor lock 10 of FIG. 1 (only the sensor unit A is shown here) locks these two parts together.

At the time of locking, the pin 22 of the latching solenoid D gets engaged in the hole 23 (not shown) which are set up in such a way that the projection and the hole at the two ends of the chain would be coupled together, locking the chain. This makes the lock 58 form a continuous ring. As the wheel and an object like an electrical pole, guard rail, pier, fence post, etc. are typically included inside this ring, the bicycle is locked.

On the other hand, when the sensor unit A installed on the outside of the lock 58 is pressed by a matching finger, the pin 22 disengages from the hole 23 unlocks the lock 58. Then, by pulling the two ends of the chain 59 apart, the projection comes out of the hole and the lock 58 assumes the form of a straight chain.

In Example 4, since the sensor lock 10 is small in size, it can be attached to the bicycle lock. Also, because the sensor lock 10 is insensitive to the various environmental conditions mentioned above compared to conventional fingerprint sensors, it can reliably lock and unlock the bicycle locks 55 and 58 on bicycles which are normally kept outdoors. This is an advantage that is not available with conventional fingerprint sensors of the prior art.

In Example 4, a conventional key is not needed for locking and unlocking the bicycle locks 55 or 58. Thus, the problem of locking or unlocking the bicycle without the key which may be lost, misplaced or stolen can be eliminated.

EXAMPLE 5

Example 5 is a case where a sensor lock 10 of the type shown in FIG. 1 is used in a cash drawer of a cash register. Conventionally, an ordinary key alone, or a key and a secret code number or ID number of a user of the register, is used for locking and unlocking the cash drawer of the register. In this case, however, there is a risk of the cash drawer being opened by an unauthorized person if the key and/or the ID number of a user are stolen.

Figure 10A:
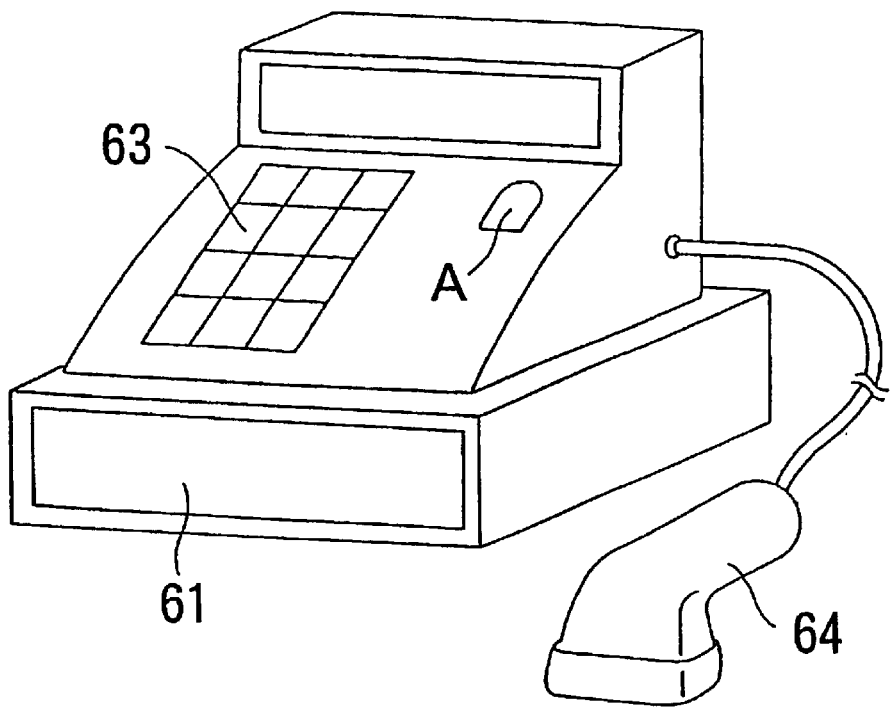
FIG. 10 depicts a diagram that explains Example 5 of an application of the present invention.
Figure 10B:
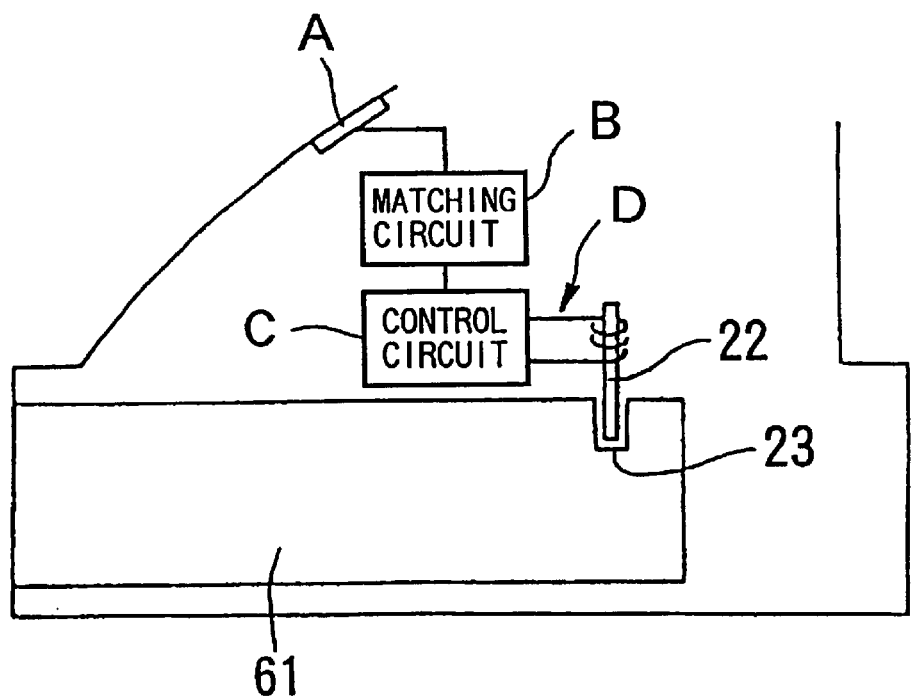

FIG. 10 shows a register in which a sensor lock 10 is used. At the lower part of the register there is a drawer type cash box 61 in which the cash is kept (as shown in FIG. 10(*a*)). This cash drawer 61 is normally kept locked. It is set up so that when it is unlocked the drawer sticks out half way.

The sensor lock 10 is used as a key to open this cash drawer 61. The sensor unit A is installed on the front surface of the register as shown in FIG. 10(*b*), and the matching circuit B, control circuit C and latching solenoid D are installed inside the register. When the cash box 61 is in the locked condition, the pin 22 of the latching solenoid D is engaged with a hole 23 in the cash drawer 61, preventing the drawer from springing open. Now, if the sensor unit A is pressed by a matching finger, the pin 22 disengages from the hole 23, permitting the drawer 61 to spring open. To lock the cash drawer 61, it is first pushed into the cash register, and the sensor unit A is pressed with a non-registered finger.

In the cash register used in this example, whenever the cash drawer 61 is opened using the sensor lock 10, the fingerprint data and the time are recorded, for instance, in the RAM of the matching circuit B or in a memory device (such as a hard disk, magnetic disk, etc.) installed in the register, and becomes a part of the "history of unlocking data" of the cash box 61. The fingerprint data stored in this manner can be the fingerprint pattern sensed by the sensor unit A or the fingerprint code obtained by the matching circuit B.

In Example 5, since a sensor lock 10 is used for locking and unlocking the cash drawer 61, unauthorized opening of the cash box does not occur, such as can happen with conventional cash registers when the key, code number of the register, or ID number of a user is stolen.

Moreover, every time the cash drawer 61 is opened using the sensor lock 10, the history of unlocking data is recorded. So, the time and identity of the person who opened the drawer are recorded accurately. Unlike a code or ID number, a fingerprint cannot be stolen or forged. Thus, the cash drawer 61 cannot be opened by an impersonator. Therefore, the data recording the history of unlocking of the cash drawer contains only data about authorized opening of the cash drawer. It furthermore acts as a deterrent to a person with a registered fingerprint stealing cash from the cash drawer.

In the cash register shown in FIG. 9, the cash drawer 61 does not have a conventional lock. It can, however, have a lock like in a conventional cash register, and it can be set up so that the sensor lock 10 restricts the rotation of the key in the lock when the cash drawer is locked and permits the key inserted in the lock to rotate and unlock the cash drawer 61 only when there is a match of the fingerprint codes.

In the above example, additional conditions for unlocking can also be imposed to allow opening of the drawer, such as inputting a suitable code number through the input keys 63, providing a bar code (encoding the ID of an authorized user) which is read by a bar code reader 64, etc.

EXAMPLE 6

Figure 11A:
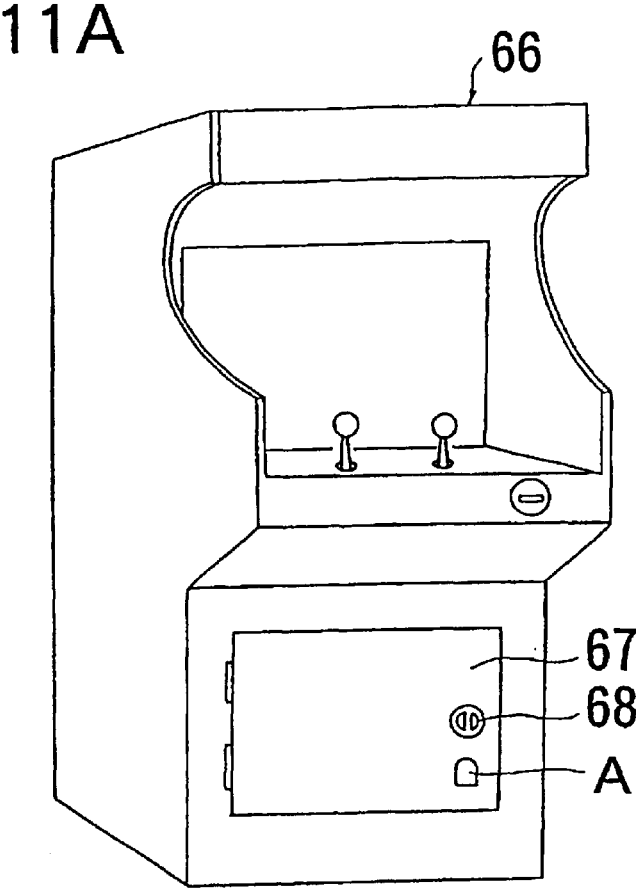
FIG. 11 depicts a diagram that explains Example 6 of an application of the present invention.
Figure 11B:
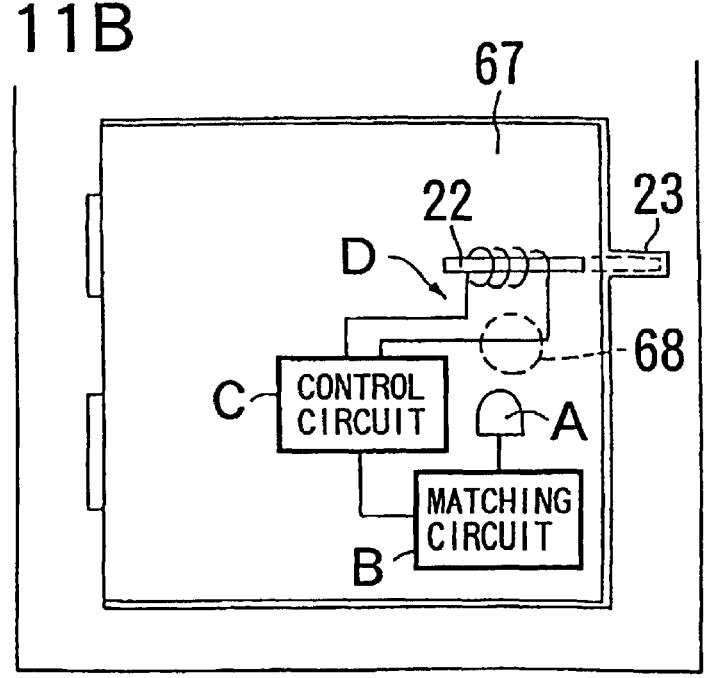

We shall now explain Example 6 where the sensor lock 10 of the type shown in FIG. 1 is used in an enclosure 66 of a game machine. FIG. 11(*a*) shows an enclosure 66 of a game machine, in which the sensor lock 10 is used. Inside this enclosure 66 are housed the base board of a video game, a cash box for storing the money charged for playing the game, etc. A door 67 is provided at the front bottom of the enclosure 66. The person who maintains the game machine collects the game charges, changes the base board, carries out maintenance, etc. through this door 67.

The door 67 has a sensor lock 10 to prevent theft of cash and the base board. The sensor unit A is installed on the outer surface of the door 67 as shown in FIG. 11(*b*) and the matching circuit B, control circuit C, and latching solenoid D are installed in the door 67. The pin 22 of the latching solenoid D engages the hole 23 in the enclosure 66, locking the door 67. On the other hand, when the sensor unit A is pressed with the appropriate finger, the pin 22 disengages the hole 23, unlocking the door 67. Therefore, the door 67 can be opened by pulling the handle 68.

When the sensor unit A is pressed, the fingerprint data and the time are recorded on the hard disk (not shown) kept in the enclosure 66, as unlocking history data. A number of enclosures 66 are connected to a PC (computer) through a communication cable as shown in FIG. 12 and the unlocking history data recorded in the hard disk are transferred to the PC where they are subject to unitary control.

In the case of Example 6, the door 67 of the enclosure 66 cannot be opened unless a finger with a registered fingerprint is used. Therefore, the stealing of cash or the game board from the enclosure by using a stolen key or a counterfeit key is prevented.

Traditionally, the cash is collected from the enclosures 66 and the game machines are maintained by employees who turn in statements on perhaps a daily basis. This method of maintaining and servicing the machines creates the possibility of theft by and employee turning in a false statement. In Example 6, however, because the unlocking history data of each container 66 are pooled and maintained accurately by the PC, false declarations are readily detected and the theft of cash from the cash box, etc. can be discovered and prevented.

EXAMPLE 7

Example 7 is a case where a sensor lock 10 of the type shown in FIG. 1 is used in a coin locker. Conventionally, a lock with an ordinary key is used for locking coin lockers. Therefore, if the user of the locker loses the key, he or she has to report the loss to the manager of the locker facility, and the locker has to be unlocked with a master key.

Figure 13:
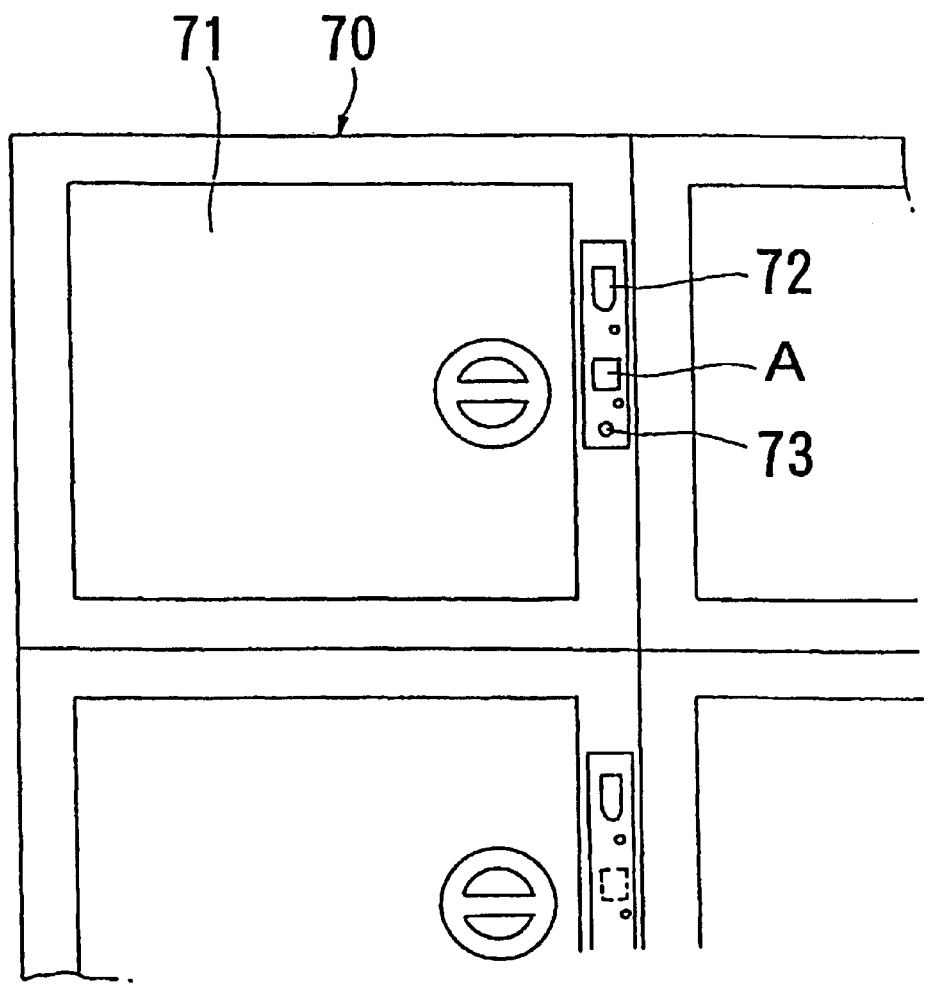
FIG. 13 depicts a diagram that explains Example 7 of an application of the present invention.

FIG. 13 shows a coin locker 70 where sensor lock 10 is used. The sensor lock 10 (only the sensor unit A is shown in the Figure) is installed on the outer frame of the coin locker 70. This sensor lock locks and unlocks, i.e., opens and closes, the door 71 through the same mechanism as explained in Example 6 (see FIG. 11(*b*)).

The coin locker 70 can be operated by inserting a coin into the slot 72. While the locker is in use, a display device like the LED 73 is on, indicating that it is in use. A certain time limit is assigned for the use of the locker by a person with a registered fingerprint. After this time limit, the LED 73 of the coin locker 70 blinks, for instance, indicating that the permitted time limit has expired.

Let us suppose that the user of locker 70 has forgotten the location of his coin locker. The user may press the sensor unit A of any one of the coin lockers. If it happens to be his coin locker, the LED 73 would blink at a fast rate (for instance) indicating that it is the user's locker.

In this example, a conventional key is not required for unlocking the coin locker 70. Thus, any inconvenience arising from the loss of the key can be eliminated. Occasionally, there are instances of coin lockers being used for crimes. Arms, fake passports, even dead bodies, etc. have in fact been found in coin lockers, where the permitted period of use had expired. The coin locker 70, however, requires fingerprint registration as a pre-condition for its use. Thus, it can prevent the use of coin lockers for crime or even reduce crimes of the type described above.

EXAMPLE 8

Example 8 is a case where the sensor lock 10 of the type shown in FIG. 1 is used for cash transaction devices such as an automatic teller machine (ATM), cash dispensers, automatic money changers, etc. Such cash transaction devices have a built-in cash box where the cash received from the customer, or to be given to the customer, is stored. They further have a door for paying in or dispensing the cash and this door is conventionally locked with a lock and key. This arrangement has the risk of cash theft by unauthorized persons opening the door using stolen or counterfeit keys.

Figure 14:
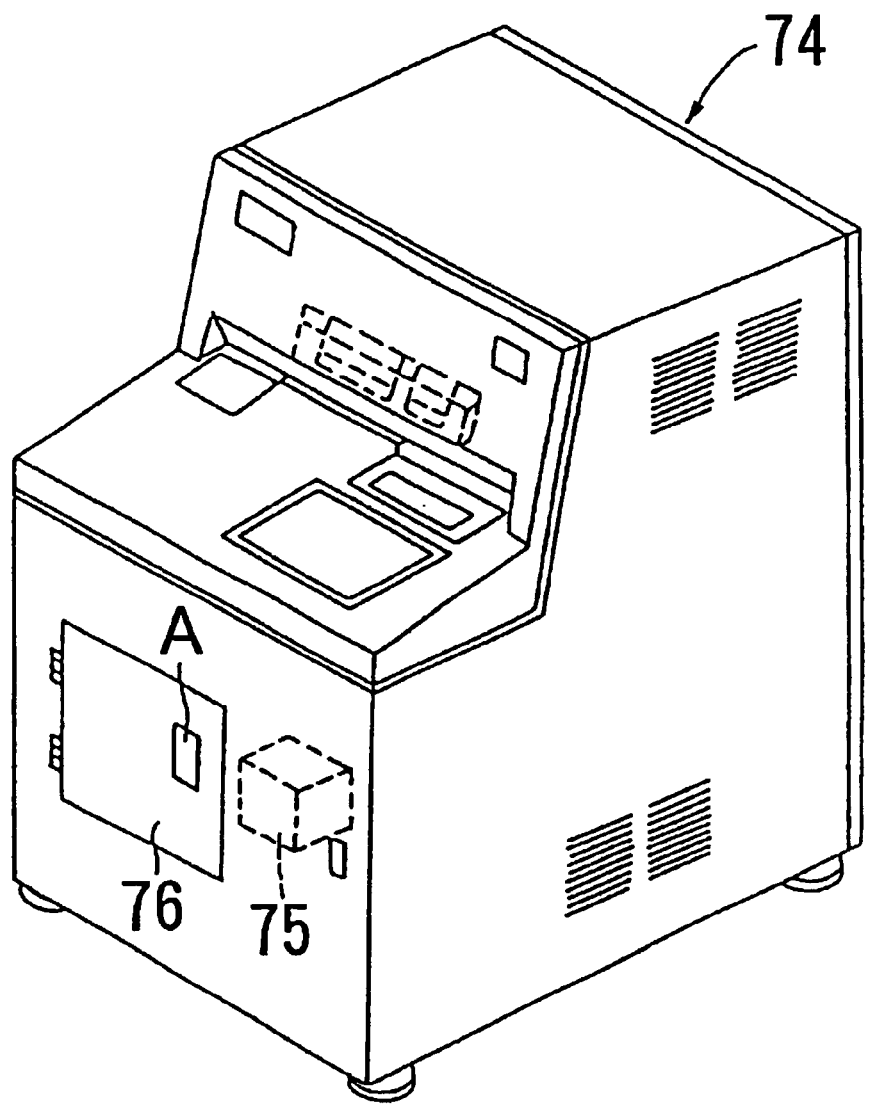
FIG. 14 depicts a diagram that explains Example 8 of an application of the present invention.

FIG. 14 shows the ATM 74 which is a cash transaction device of Example 8. The cash box 75 is built into the ATM 74. The door 76 is installed on the front of the ATM 74 for providing access to the cash box 75. This door has a sensor lock 10 of the type shown in FIG. 1 which locks and unlocks the door 76 through the same mechanism, as explained in Example 6. As in Example 6, whenever the sensor unit A is pressed with a finger, the unlocking history is recorded on a hard disk, etc. (not shown).

In Example 8, because a sensor lock 10 is used for locking and unlocking the door 76, any inconvenience caused by the theft of the key, etc. is avoided. Also, stealing of cash by persons with registered fingerprints can be detected and deterred because the door unlocking history data are recorded. Unlike with the use of secret code numbers, an unauthorized person cannot impersonate an authorized user.

Figure 15:
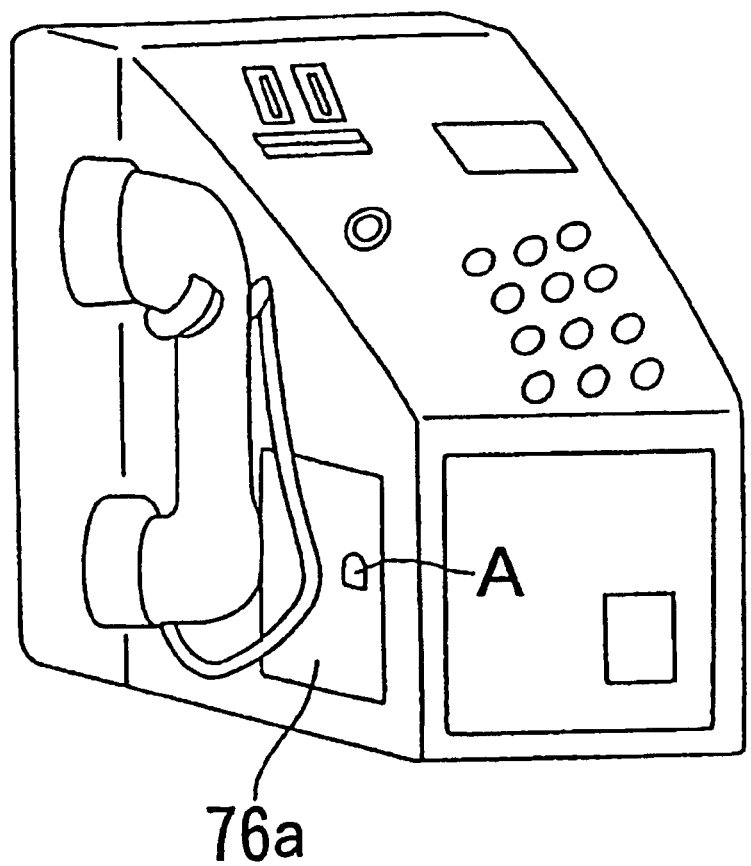
FIG. 15 depicts another diagram that explains Example 8 of an application of the present invention.

The sensor lock 10 of the type shown in FIG. 14 may also be used on the cash collection door 76*a* of a public telephone (as shown in FIG. 15).

EXAMPLE 9

Figure 16:
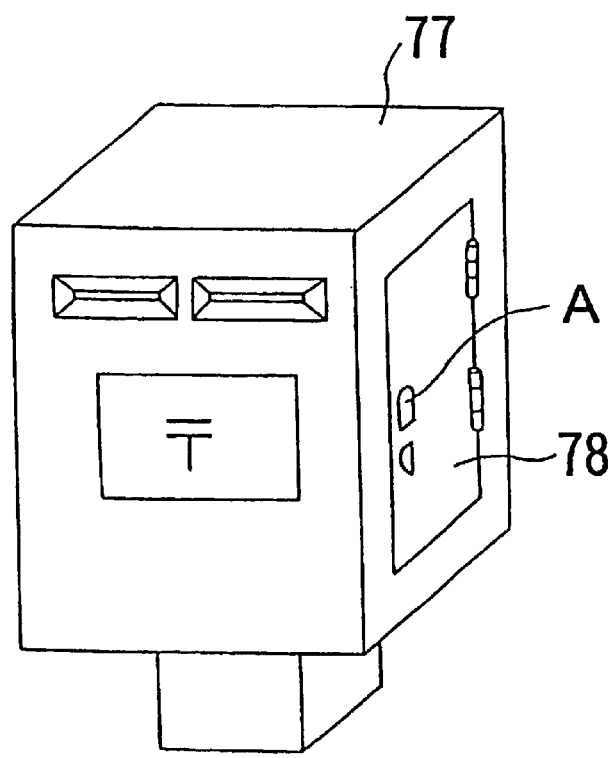
FIG. 16 depicts a diagram that explains Example 9 of an application of the present invention.

Example 9 teaches the use of a sensor lock 10 of the type shown in FIG. 1 in a post office or letter drop box. FIG. 16 shows the drop box (pillar box) 77 of Example 9. The drop box has a door 78 for removing the deposited mail. The door 78 has a sensor lock 10 (only the sensor unit A is shown) having the same structure as in Example 6, for locking and unlocking the door 78.

Here, as in Example 9, a pressure-based fingerprint sensor 100 is used in the sensor unit A. Therefore, even if the sensor lock 10 is used on the door of the drop box which is usually located outdoors, the detection accuracy of the fingerprint pattern is not adversely affected by environmental conditions mentioned above as experienced by ordinary fingerprint sensors of the prior art.

Figure 17:
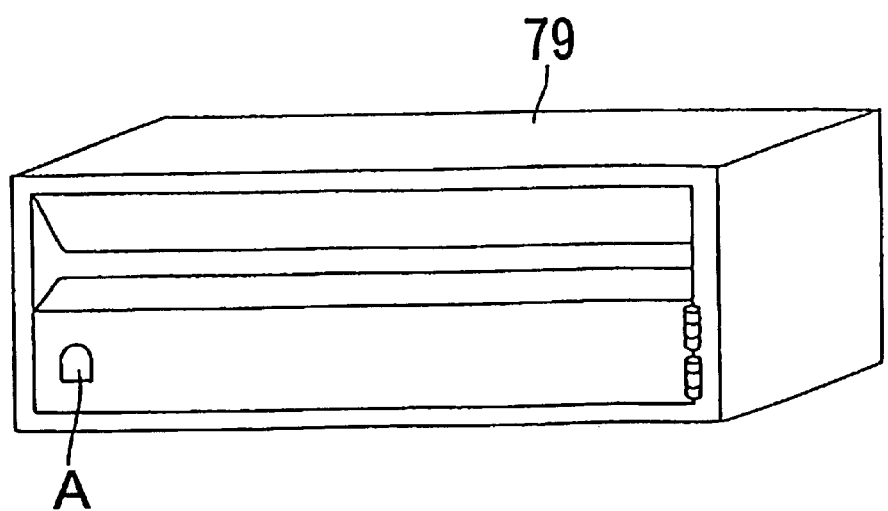
FIG. 17 depicts another diagram that explains Example 9 of an application of the present invention.

The sensor lock 10 may be installed on a domestic letter box 79 as shown in FIG. 17. Mail is closely related to an individual's privacy. In recent years, with the increased use of credit cards, information about the use of credit cards, stock transaction records, etc. are also being sent through the mail, and the importance of mail has increased. Previously, individual letter boxes that can be opened by input of secret code numbers had been suggested. But in that case, there is the risk of the mail being stolen by others, or the information contained in the mail becoming known to others who come to know the code number. Particularly in the letter boxes of apartments, the secret code numbers are often not changed when there is a change of the tenant, and the letter boxes could be opened by the previous tenant. But if a sensor lock 10 used, this type of inconvenience in the use of letter boxes and other private temporary mail storage containers can be eliminated.

EXAMPLE 10

Figure 18:
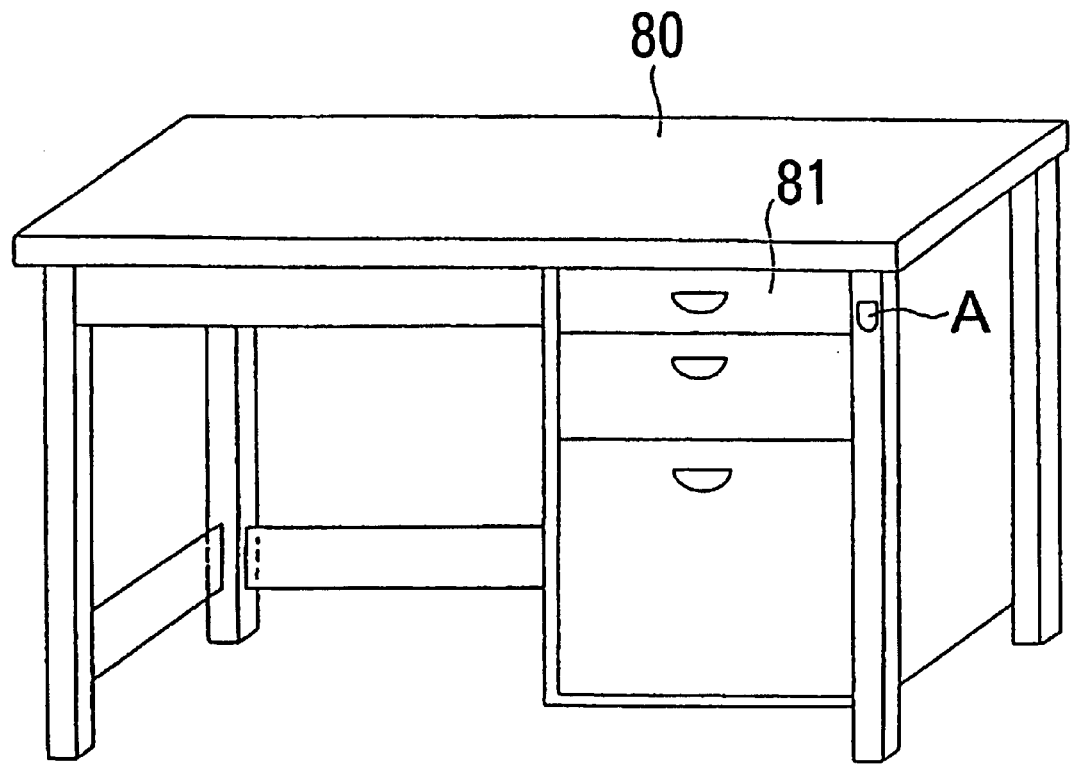
FIG. 18 depicts a diagram that explains Example 10 of an application of the present invention.

Example 10 is the case where a sensor lock 10 of the type shown in FIG. 1 is used for drawers of desks, credenzas, filing cabinets, etc. FIG. 18 shows an office desk 80 in which a sensor lock 10 is used. This office desk 80 has the sensor lock 10 (only the sensor unit A is shown) having about the same structure as the one used in Example 5 (see FIG. 10(b)) installed in it for locking the drawer 81.

In Example 10, an ordinary key is not used to lock the drawer 81. Therefore, any inconvenience caused by a loss of the key does not arise. Also, in offices where a number of identical looking desks are used, there is often confusion about which key belongs to which desk. Such confusion also does not arise when the system of Example 10 is used. The sensor lock 10 can also be used in lockers installed in offices. In that case also, since a number of similar lockers are used, the same advantages can be realized.

Figure 19:
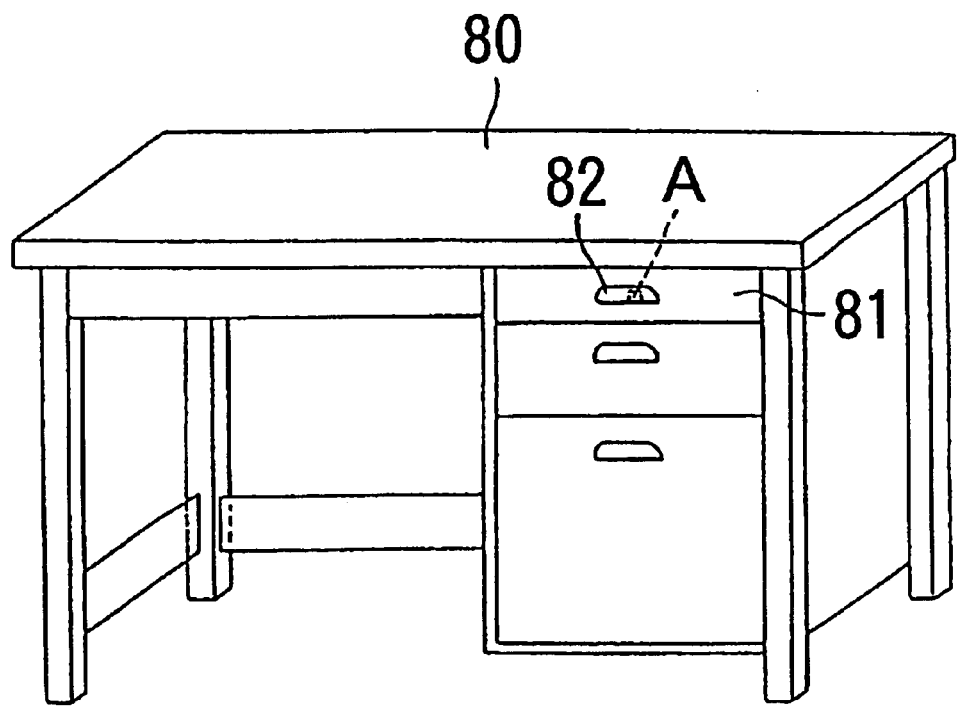
FIG. 19 depicts another diagram that explains Example 10 of an application of the present invention.

The sensor unit A can be installed on the back surface of the handle 82 of the drawer 81 (as shown in FIG. 19), which has the same effect as the sensor unit A installed on the back side of the door handle 41 in Example 1.

EXAMPLE 11

Figure 20:
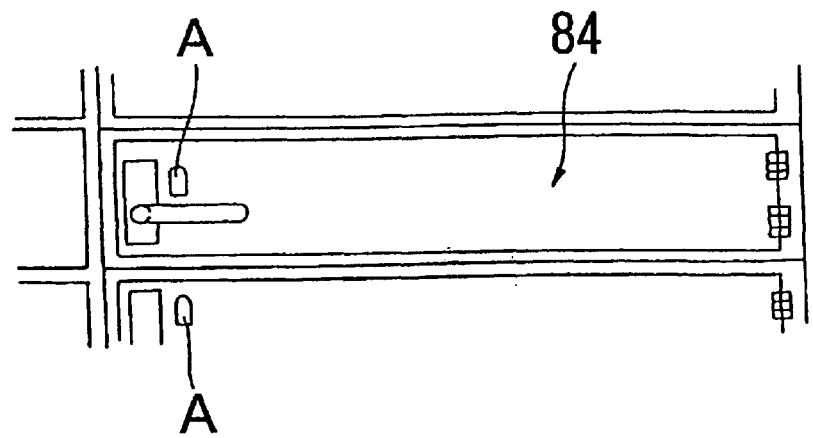
FIG. 20 depicts a diagram that explains Example 11 of an application of the present invention.

Example 11 is the case where the sensor lock 10 of the type shown in FIG. 1 is applied in a bank locker (safe deposit box). FIG. 20 shows the bank locker 84 of Example 11. Here, the bank locker has a sensor lock 10 (only the sensor unit A is shown) with the same structure as in Example 2 (see FIG. 6(b)). In bank locker 84, whenever the sensor unit A is pressed, data on history of unlocking is recorded as in Example 6.

In Example 11 also there is the advantage of not having to use an ordinary key, as in the other examples. The bank locker 84 can be opened only by the person whose fingerprint has been registered. Thus, upon opening the locker, there is no need to verify the identify of the person, by checking the seal, etc. This makes it unnecessary for the bank worker, etc. to be present at the opening of the locker 84, and completely automatic 24 hour operation of the bank locker is possible. Also, since the unlocking history data are recorded, one can always know accurately when the locker 84 was opened and by whom.

EXAMPLE 12

Figure 21:
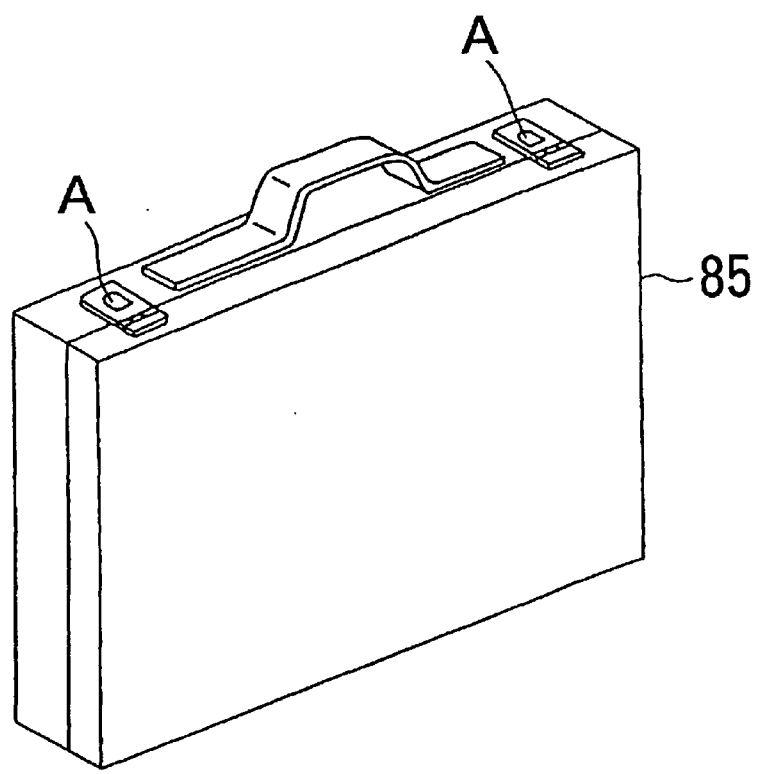
FIG. 21 depicts a diagram that explains Example 12 of an application of the present invention.
Figure 22:
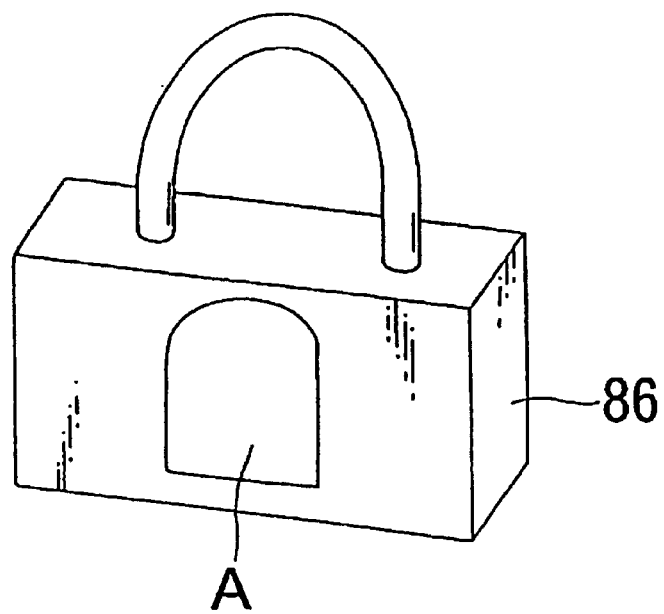
FIG. 22 depicts another diagram that explains Example 12 of an application of the present invention.

Example 12 deals with a case where the sensor lock 10 of the type shown in FIG. 1 is used in luggage, such as a suit case, attache case, handbag, travel bag, etc. FIG. 21 shows an attache case having a sensor lock 10 (only the sensor unit A is shown). As the sensor lock 10 is small in size, it can be used for the attache case 85.

Figure 23:
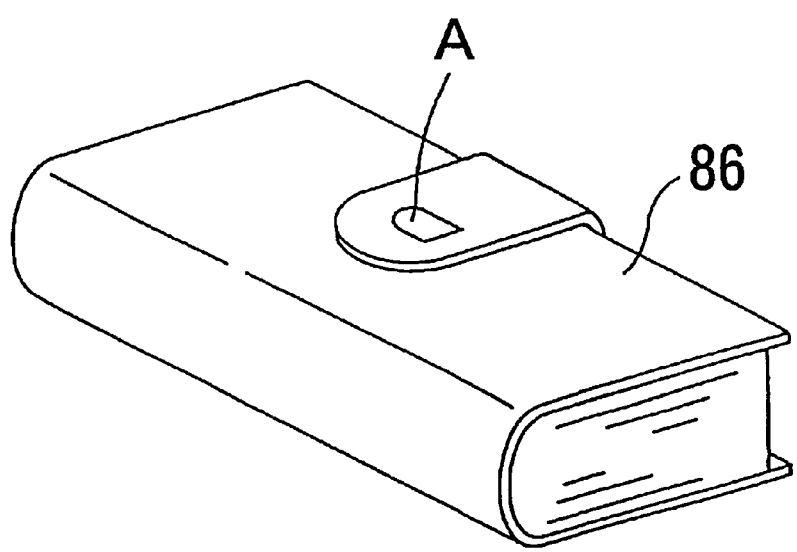
FIG. 23 depicts another diagram that explains Example 12 of an application of the present invention.

Also, because of its small size it can be used in padlocks and even in various types of notebooks 86, like diaries, notebooks, memo pads, registers, account books, etc. as shown in FIG. 23. In notebooks such as diaries that will be used for a long period of time, the status of the fingerprint that will be used to unlock the notebook must be updated. For example, if the owner of the registered fingerprint is a growing child, the registered fingerprint may be updated periodically and the information may be used as a part of the record of the child's growth. Otherwise, the risk is that the changing fingerprint characteristic of the growing child will unintentionally lead to his inability to open the diary.

EXAMPLE 13

Figure 24:
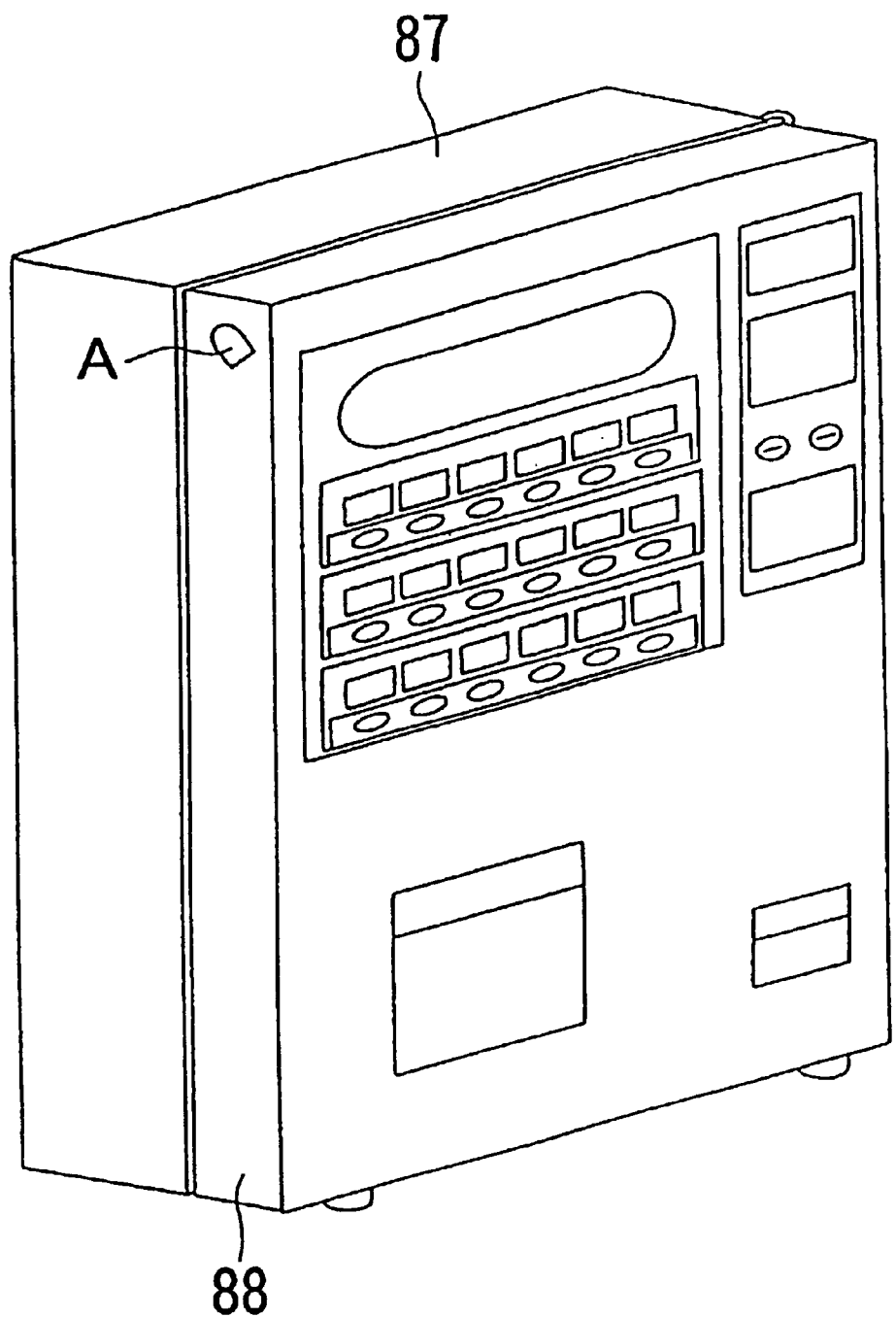
FIG. 24 depicts a diagram that explains Example 13 of an application of the present invention.

Example 13 is the case in which a sensor lock 10 of the type shown in FIG. 1 is used in an automatic vending machine. FIG. 24 shows an automatic vending machine 87 which has the sensor lock 10 (only the sensor unit A is shown). The vending machine 87 has an openable front 88 for stocking the vended goods and the small change, etc. The sensor lock 10 having about the same structure as in Example 6 is used for locking and unlocking this openable front 88. The use of this sensor lock as previously explained detects, deters, and thus helps prevent problems like theft of goods or cash from the machine that can occur when a conventional lock and key are used. In FIG. 24, the sensor unit A is shown mounted on the side of the dispenser 88. It can of course be mounted on the front or any other convenient location instead.

EXAMPLE 14

Figure 25:
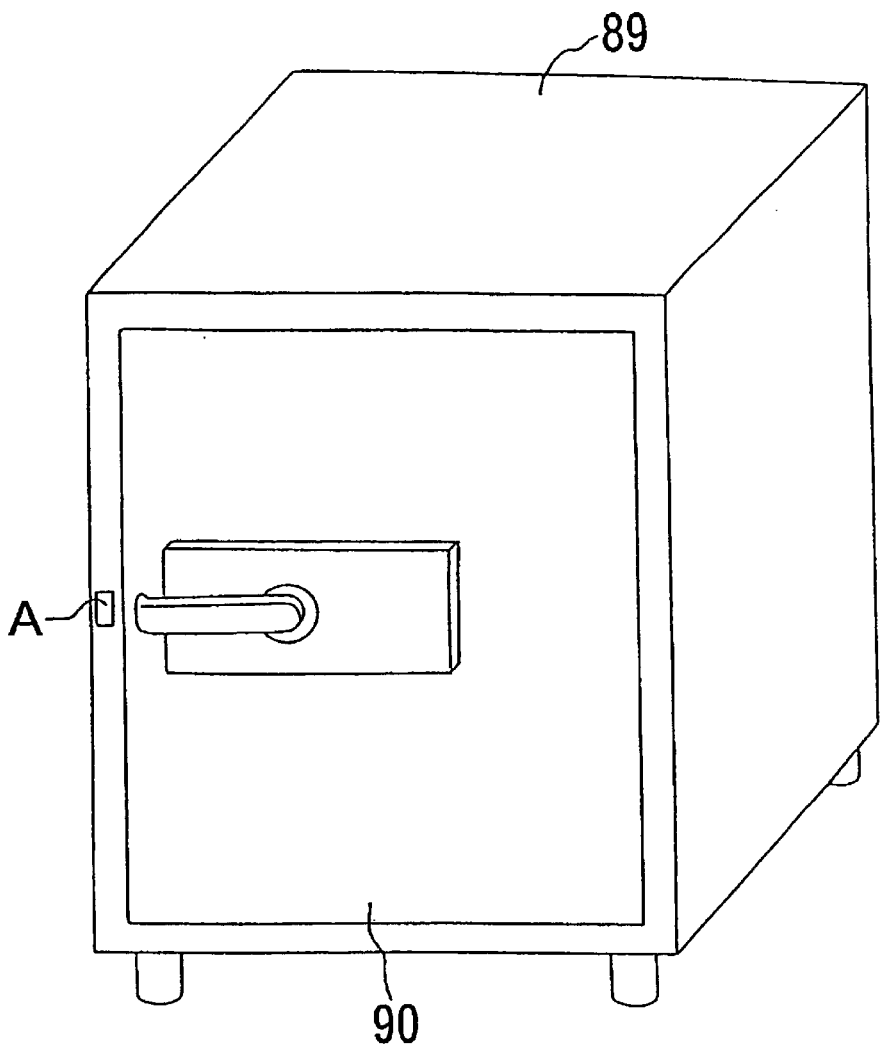
FIG. 25 depicts a diagram that explains Example 14 of an application of the present invention.

Example 14 is the case where the sensor lock 10 of the type shown in FIG. 1 is used in a strong box (safe). FIG. 25 depicts the safe 89 which has the sensor lock 10 (only the sensor unit A is shown). Locking and unlocking of the door 90 of the safe 89 is done through the sensor lock 10 installed on the frame of the door of the safe 89. This sensor lock has about the same structure as in Example 6.

The sensor lock 10 is small in size. Therefore, it can be installed in this manner on the frame of the door. Also, because there is no need for running power cables for the sensor lock 10 from the door frame to the door, any failure due to a failed power cable is avoided.

A record of the registered fingerprint codes is kept in the EEPROM 14 (see FIG. 1) of the matching circuit B of the sensor lock 10. The matching circuit B outputs the "Yes" signal in this case only when all the registered fingerprint codes are matched within a certain time interval. Because more than one fingerprint code has to be detected, and all the registered fingerprints have to match within a certain time period for opening the safe, theft by less than all of the persons who have registered fingerprints can be prevented. The security level of the safe is thus greater than with prior art arrangements.

EXAMPLE 15

Figure 26:
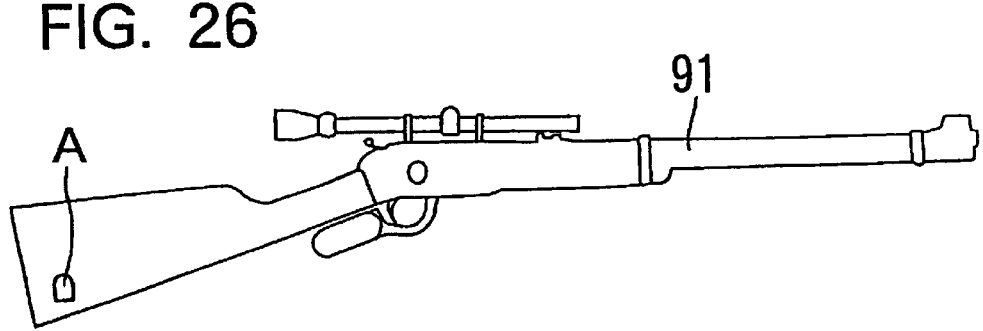
FIG. 26 depicts a diagram that explains Example 15 of an application of the present invention.

Example 15 is the case where the sensor lock 10 is used on firearms, such as a pistol, rifle, revolver, etc. FIG. 26 shows a gun 91 in which the sensor lock 10 (only the sensor unit A is shown) is installed, for locking and unlocking the safety catch of the gun. Because the sensor lock 10 is small in size, it can be installed even on a gun. This permits the use of the gun only by the owner of the registered fingerprint. Therefore, the stealing and misuse of the gun 91 and violation of any governmental firearms act can be prevented.

EXAMPLE 16

Figure 27:
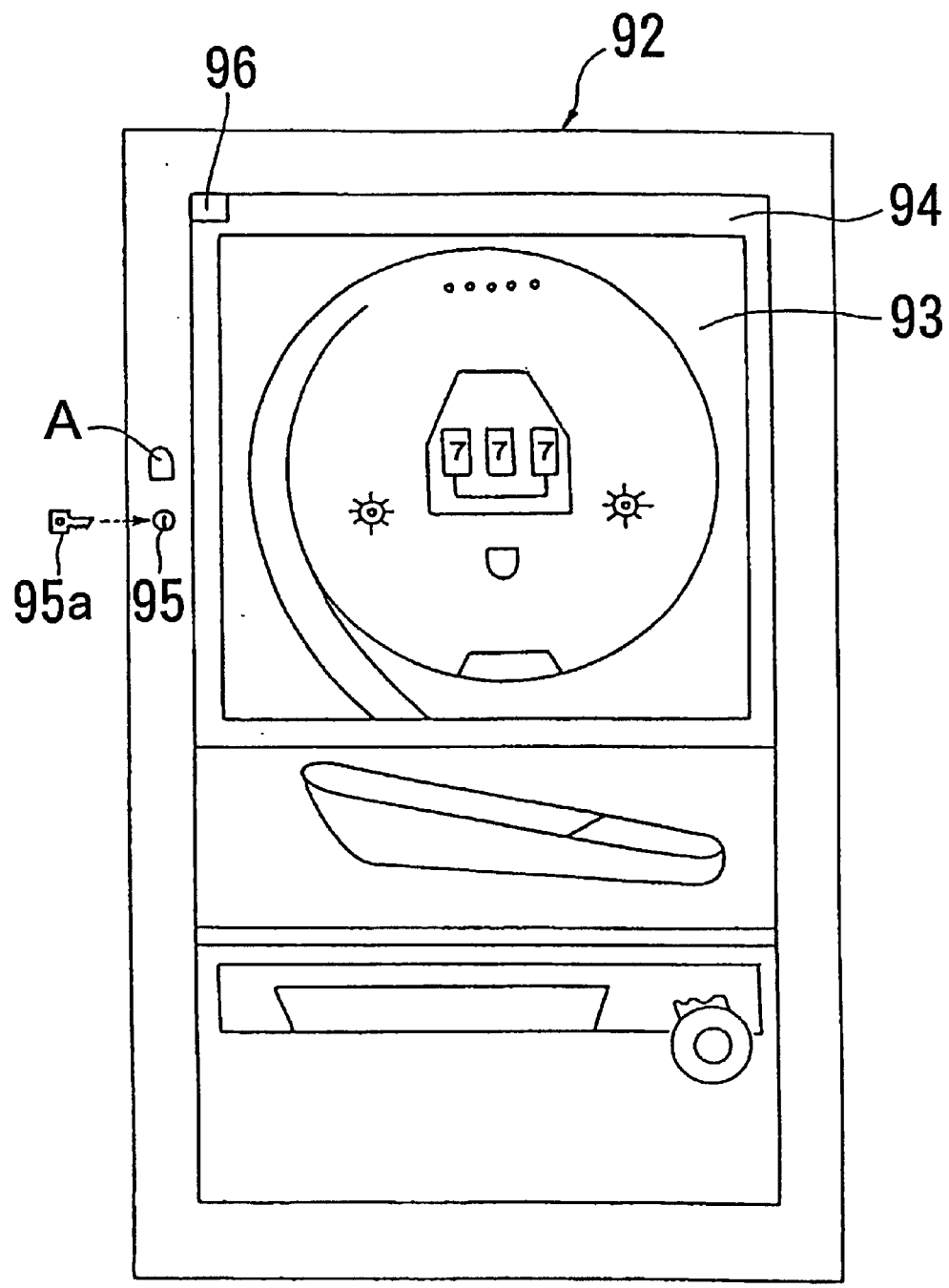
FIG. 27 depicts a diagram that explains Example 16 of an application of the present invention.

Example 16 is a case where a sensor lock 10 of the type shown in FIG. 1 is used in a pin ball machine. FIG. 27 shows a pin ball machine 92 in which a sensor lock 10 is used. The pin ball play area 93 of the machine 92 is covered with a glass door 94, which permits the player to see the play area 93, at the same time preventing the balls from jumping out of the area. The glass door 94 is kept locked using a lock installed on the outer frame of the pin ball table 92 when it is in use, to prevent the player from tampering with the game.

The lock of the door 94 is embedded in the outer frame of the pin ball machine 92. The lock has a key hole 95 for inserting the key 95a. When the key 95a is inserted in the hole 95 and turned, the lock is released. The sensor lock 10 of the type shown in FIG. 1 is installed within this outer frame, and the sensor unit A is installed near the key hole 95.

The pin 22 of the latching solenoid D of the sensor lock 10 engages a certain coupling part (not shown) installed in the lock when the door 94 is locked, preventing the rotation of the key 95a when it is inserted in the key hole. The pin 22 disengages and the restriction on the rotation of the key 95a is removed only when the sensor unit A is pressed by the appropriate finger. Thus, a person with a registered fingerprint may turn the key 95a to unlock the lock and pull the handle 96 to open the door.

As in Example 6, whenever the sensor unit A is pressed, the unlocking data are recorded. When there is a number of pin ball machines 92, the unlocking data of all the machines are maintained by a host computer (not shown).

In Example 16, a person with a registered fingerprint alone can open the door 94 using his finger and the key 95a. Therefore, unauthorized opening of the door 94, using a stolen or counterfeit key, for improper mechanical adjustment of its inner workings or for unauthorized setting of the ROM inside the pin ball machine 92, etc. can be prevented.

Also, because the unlocking data are recorded every time the sensor unit A is pressed, the record of when and by whom the door 94 was opened can be examined in the event of any suspicious activity. This prevents unauthorized actions by employees of the pin ball game Centre. The feature of easy identification of the person who opens the door 94 is a special feature not available with the prior art devices.

In Example 16, the latching solenoid D of the sensor lock 10 controls the rotation of the key 95a inserted in the key hole 95. But instead, it can be set up so that the latching solenoid D directly opens or locks the door, in which case the conventional lock and key become unnecessary.

The above-described locking system for the door 94 can be used for all types of pin ball processing equipment used in pin ball game centers, such as the ball dispensing machine, ball counting machine, for the supply route of the balls, etc.

Figure 28:
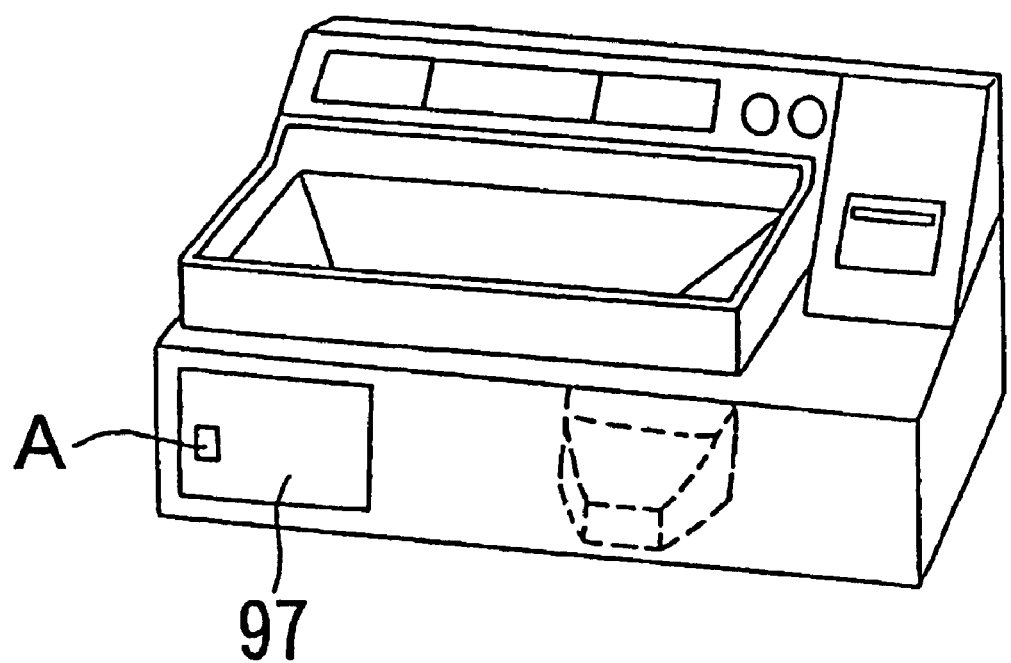
FIG. 28 depicts a diagram that explains Example 16 of an application of the present invention.

FIG. 28 shows a pin ball counting machine that uses the sensor lock 10. An electronic circuit that counts the pin balls, and the return route of the pin balls, is installed inside this counting machine. The door 97 is to be opened for maintaining this counting machine. This door has a sensor lock 10 for locking it and can be opened only by the owner of a registered fingerprint. Whenever the door 97 is thus opened, a record of who opened the door, and when, is made. This arrangement can prevent unauthorized opening of the door 97, by stealing the key for instance, for tampering with the electronic controls in the counting machine (changing the set number of pin balls, for instance), stealing pin balls from the pin ball recovery route, etc.

Supply and recovery routes for pin balls are provided at pin ball centers. Such routes are normally placed in containers, housings, inside walls, etc., and sensor locks 10 can be used for locking the access doors of such containers. This arrangement can prevent the theft of pin balls from these pin ball supply/recovery routes.

In the Examples 7 to 14 described earlier, the sensor lock 10 can also be used as described in Example 16, that is, using sensor lock 10 to lock and unlock a conventional lock.

[Application Mode 2]

FIG. 29 is a diagram of the sensor lock 10a used in Application Mode 2 of the present invention. Because it has many features in common with the sensor lock 10 used in Application Mode 1, we shall explain here only the features that are different from the sensor lock 10.

Some of the constituent elements of the sensor lock 10a used in Application Mode 2 are housed in a single container which acts as the controller for the pin 22 of the latching solenoid D, as shown in FIG. 29. The controller in FIG. 29 can, for instance, be in the form of a card K in which the sensor unit A and the matching circuit B are embedded. The control circuit C and the latching solenoid D are attached to the concerned object E which is to be locked or unlocked. Thus, the matching circuit B is physically separated from the control circuit C. The matching circuit B has a data transmission unit 24 and the control circuit C has a data receiving unit 25. "Yes" and "No" signals are transmitted between these two units.

Here, any mode of data transmission can be employed between the transmission unit 24 and the receiving unit 25. In other words, these units may be physically connected through cables, or the transmission can be through conventional non-contact data transmission methods like optical, wireless, magnetic coupling, static electricity based systems, etc. In other words, the card K can be of any type. It can be a non-contact type card in which optical or magnetic coupling is used, a card that can be read by a card reader, or a PC compatible contact type card with a PCM/CIA card interface.

Figure 30A:
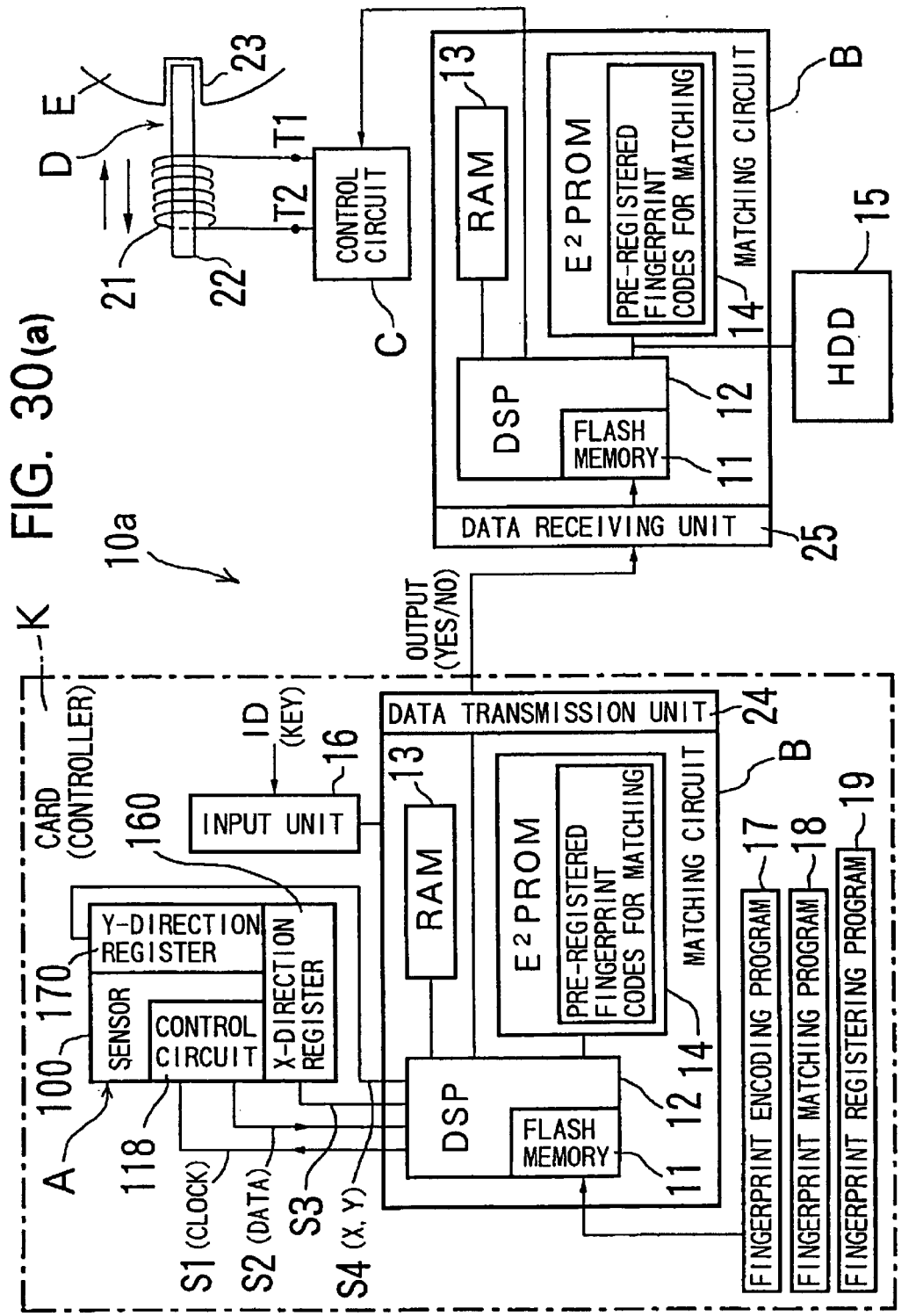

There can be a matching circuit on the data receiving side of the controller also, as shown in FIG. 30. In that case, it can be set up so that the data transmission side, i.e., the card K, carries out only the preparation of the fingerprint codes while the processing of fingerprint code registration and matching are done on the data receiving side. In this case, the EEPROM 14 of the card K need not be present. The system can also be set up in a way that the card K carries out only the fingerprint code preparation and matching processes and not the fingerprint registration. In other words, the flash memory 11 does not have the fingerprint code registration program.

The system can also be set up in such a way that the card K (controller) carries out the fingerprint code creation and fingerprint code registration, and the matching is done on the data receiving side. In that case, the EEPROM 14 and HDD 15 need not be present on the data receiving side. If the data receiving side alone stores the registered fingerprint codes and the matching is done by the card K (controller), the registered fingerprint codes can be transmitted from the data receiving side to the data transmitting side. In that case, the data transmission unit 24 should also have the ability to receive data and the data receiving unit 25 should have the ability to transmit data. The sensor unit A can be on the card K (controller) or otherwise.

The sensor unit A installed on the card K (controller) can have a structure where the pressure sheet 102 (see FIG. 2(*a*)) of the sensor 100 is always exposed. The card K can also of course have a cover to protect at least the surface of the pressure sheet 102 of the sensor. This cover can be a lid that can be rotated in relation to the surface of pressure sheet 102 or it can be of a type that is installed parallel to the pressure sheet 102 and slides over it to cover it. This cover for the sensor unit A is applicable for all the examples of the Application Mode 2 described below.

Figure 32:
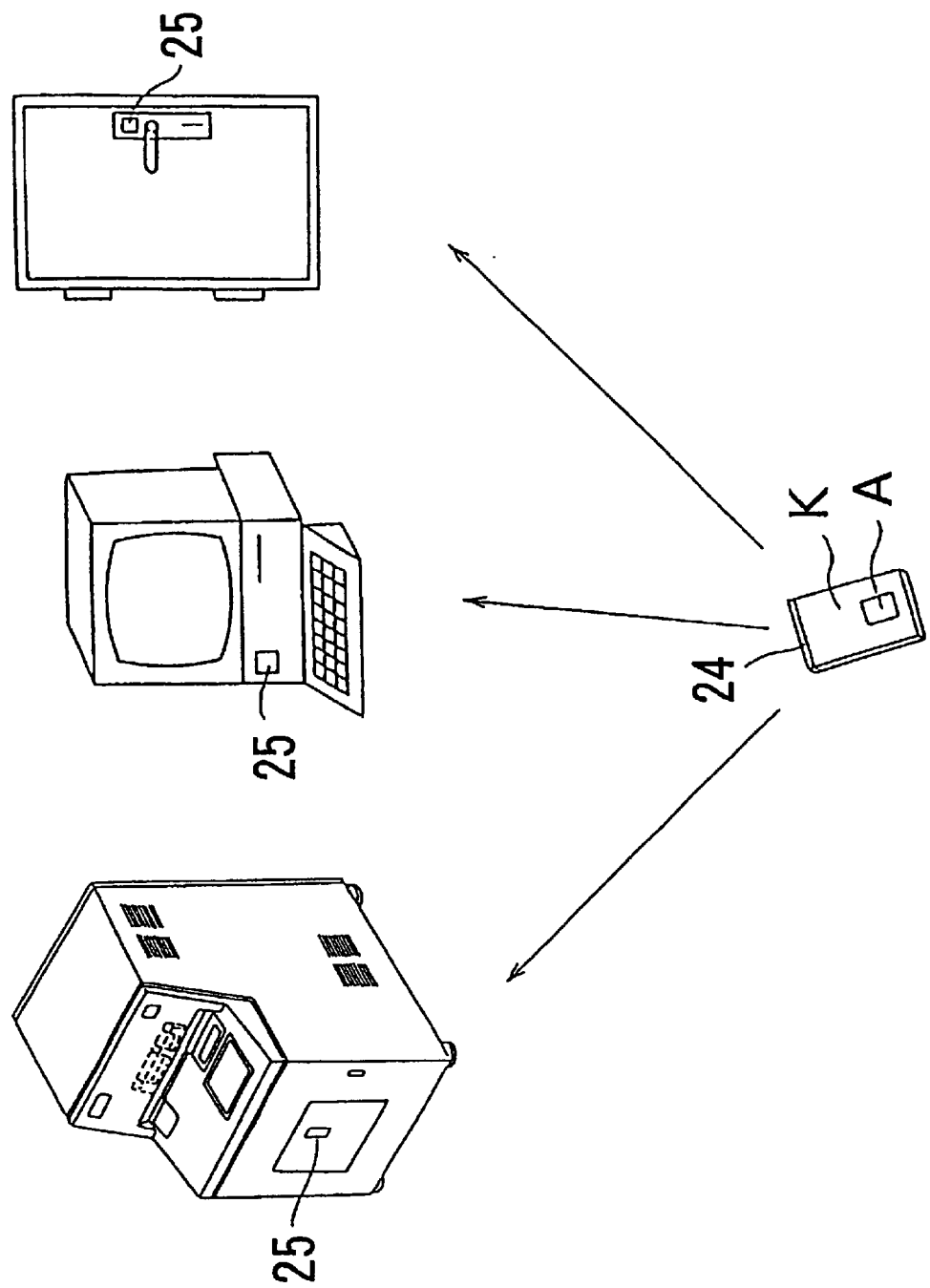
FIG. 32 depicts another example for applying the present invention to a different set of specific devices.

In this Application Mode 2, the number of constituent elements of the system attached to the concerned object E can be reduced. Thus, if the concerned object E is small and it is difficult to attach the sensor lock 10 to it, the sensor lock 10*a* can still be applied. Moreover, even if the card K is lost or stolen, it cannot be used by any person other than the owner of the registered fingerprint. Thus, it does not have the inconveniences associated with conventional keys. Another advantage is that it is possible to lock and unlock more than one concerned object E using one card K (see FIGS. 31 and 32). This means that a separate card K does not need to be prepared for each concerned object E.

The sensor lock 10*a* may be used in place of the sensor lock 10 in all the examples of the Application Mode 1.

EXAMPLE 17

Figure 33:
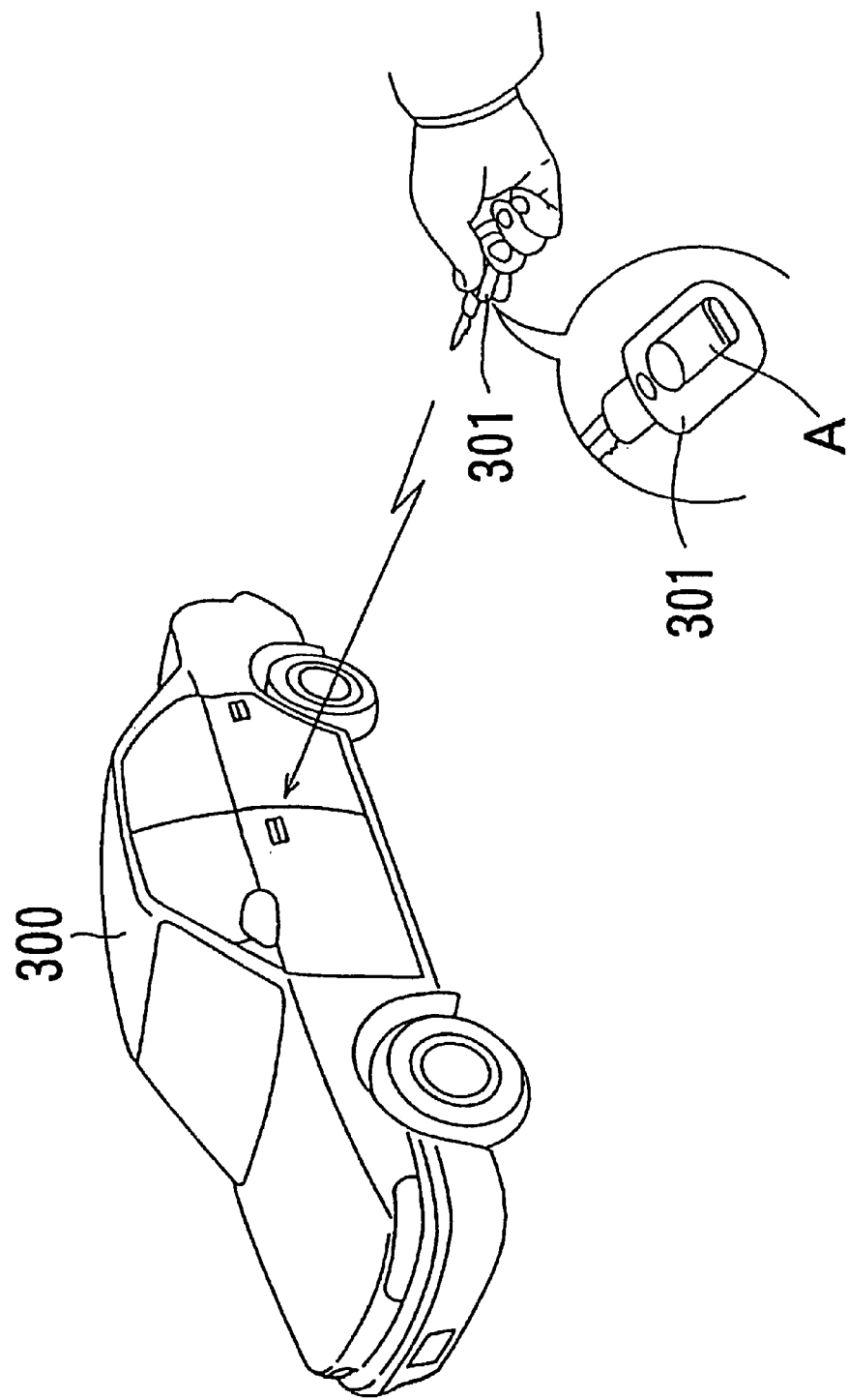
FIG. 33 depicts a diagram that explains Example 17 of an application of the present invention.

An example of the Application Mode 2 is given below. In this Example 17, a sensor lock 10*a* of the Application Mode 2 is used as a key of a car. In FIG. 33, the door lock of the car 300 is unlocked by an unlocking code generated by the key 301 (which is the controller). The key 301 has the components of the card K shown in FIG. 29 (only the sensor unit A is shown in FIG. 33), and a conversion circuit (not shown) which converts the "Yes" signal received from the matching circuit into the unlocking code.

Because of this arrangement, when the sensor unit A is pressed by the appropriate finger, the unlocking code is transmitted by the key 301 and received by a receiving unit installed on the car 300, unlocking the door lock of the car. In this Example 17, the elements of the card K and the addition of a conversion circuit to the key 310 are improvements over the prior art. Alternatively, a sensor lock 10*a* with the structure shown in FIG. 29 may be used in the car 300.

In Example 17, because of the structure of card K used and the conversion circuit that is added to it to form the key 301, only a registered fingerprint owner can unlock the door lock. So, unauthorized opening of the lock by the use of lost keys or stolen keys can be prevented. The unlocking code of the door lock is provided to the user by the manufacturer of the car. Thus, by slightly modifying the key 301, the types of inconveniences like unauthorized opening of the door lock described above can be eliminated. This locking system can be used for locking the trunk of the car 300 also.

EXAMPLE 18

Example 18 is a case where a sensor lock 10*a* of the type shown in FIG. 29 is used in a door, as shown in FIG. 34(*a*). The data receiving unit 25 is installed on the outer surface of the door. The setup on the door side is the same as in Example 2 (FIG. 6). Thus, we shall omit the explanation of this setup here. As shown in FIG. 34(*b*), the card K can be used by inserting it into the connector 303 installed on the outer surface of the door.

EXAMPLE 19

Figure 35:
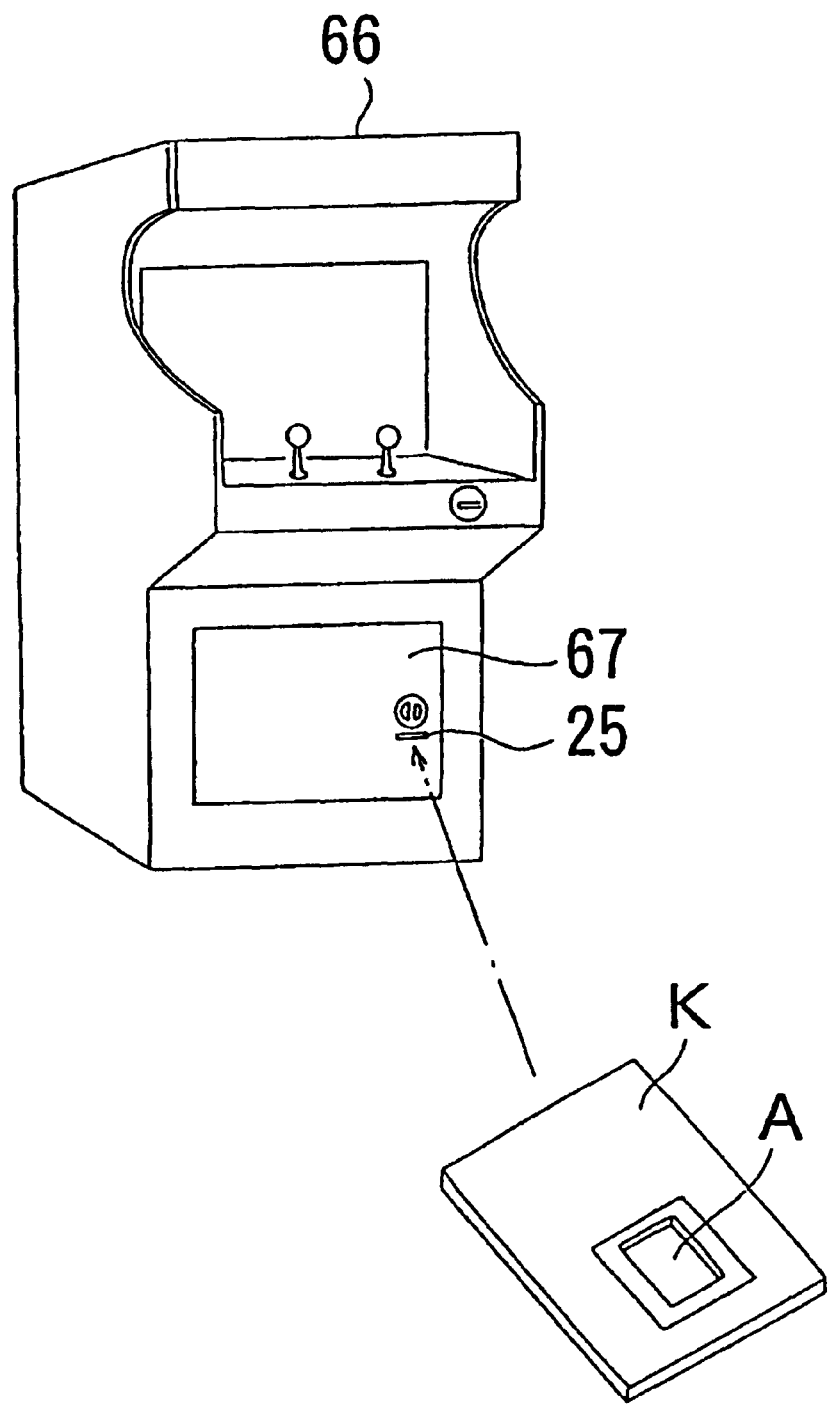
FIG. 35 depicts a diagram that explains Example 19 of an application of the present invention.

Example 19 is a case where a sensor lock 10*a* of the type shown in FIG. 29 is used for an enclosure 66 of a game machine (FIG. 35). We shall omit the explanation of Example 19 here because the setup is the same as in Example 6 (FIG. 11) except for the elements of the sensor lock 10*a*. However, as shown in FIG. 31, the system can be set up so that one card K can be used to open the doors 67 of more than one enclosure 66.

Here, however, if the locks installed on the door 67 of each enclosure 66 is to be opened with a different unlocking signal, then the card K is to be so designed that it can output all these unlocking signals so that all the doors 67 can be individually opened.

EXAMPLE 20

Figure 36A:
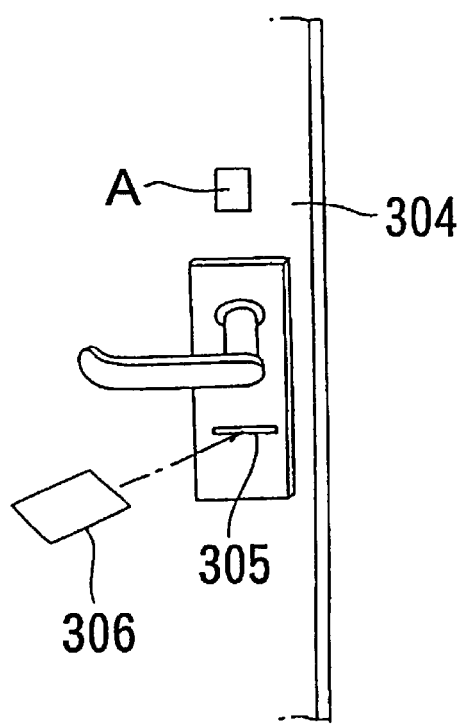
FIG. 36 depicts a diagram that explains Example 20 of an application of the present invention.
Figure 36B:
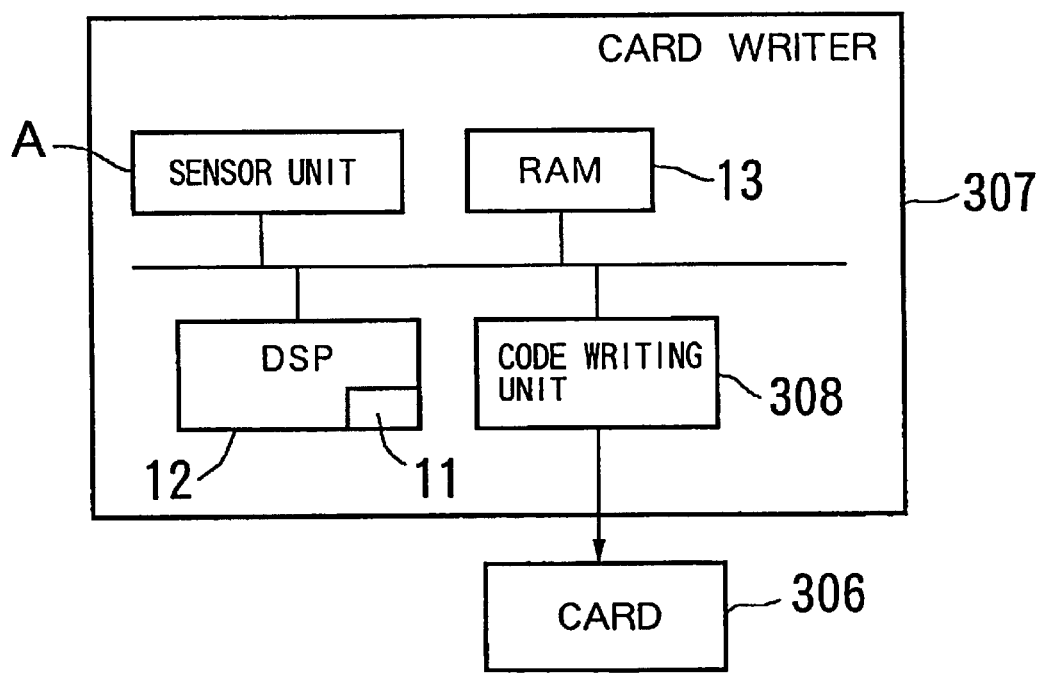

Example 20 is a case where a sensor lock 10 of the type shown in FIG. 1 is used in the doors of rooms of a lodging facility, like a hotel or an inn. FIG. 36(*a*) shows the appearance of the outside of a door 304 which is the entrance to a room. The door 304 has the sensor lock 10 (only the sensor unit A is shown here) which has the same structure as in Example 2. Besides this, the door 304 has a slot 305 in which the card 306, with the recorded fingerprint code of the customer, is to be inserted. A card reader (not shown) is installed in the slot 305 for reading the fingerprint code from the inserted card 306.

The fingerprint code read out by the card reader is maintained for a certain duration as a registered fingerprint code in the EEPROM 14 (see FIG. 1) of the matching circuit B. Therefore, if the customer presses the sensor unit A using the same finger as of the registered fingerprint code during this period, the door 304 will be unlocked and can be opened. After that, when a certain amount of time has elapsed, the door 304 is locked automatically and the fingerprint code is erased from the EEPROM 14. In that case, the customer has to again insert the card 306 in the slot 305 and press the sensor unit A for entering the room.

The card 306 is, for instance, a disposable card made of paper, with magnetic stripes provided on one side to record the fingerprint code. The recording of the fingerprint code on the card 306 can be done by a card writer 307 placed at the front desk of the lodging facility. The card writer 307 can consist of, for example, a sensor unit A of the type shown in FIG. 1, a DSP 12 that executes the fingerprint print code preparation program and the fingerprint code registering program, and code writing unit 308 that writes the code on the magnetic stripes of the card 306, as shown in FIG. 36(*b*).

When the sensor unit A of the card writer 307 is pressed by a finger, the fingerprint pattern is detected by the sensor unit A, and the DSP 12 prepares the fingerprint code using this fingerprint pattern. This fingerprint code is then written on the card 306 by the card writing unit 308. At the time of checking in, the customer receives the card 306 on which his or her fingerprint code is recorded. This card is used to unlock the door of the room through the sensor lock 10.

In Example 20, the door 304 is unlocked using the disposable card 306 and the sensor lock 10. Thus, the front desk of the hotel, etc. need not concern itself with the whereabouts of the key of each room. Also, since the card 306 can be used only by the person whose fingerprint is registered, the door 304 can never be unlocked using a stolen or lost card. In addition to this, even if the customer loses the card, the reissue of the card is very easy.

In this example, the fingerprint data are not handed over to the owner of the lodging facility. Thus, the psychological resistance of the guest against the use of fingerprints for opening the door can be overcome. The card 306 can also be a punched card.

Figure 37:
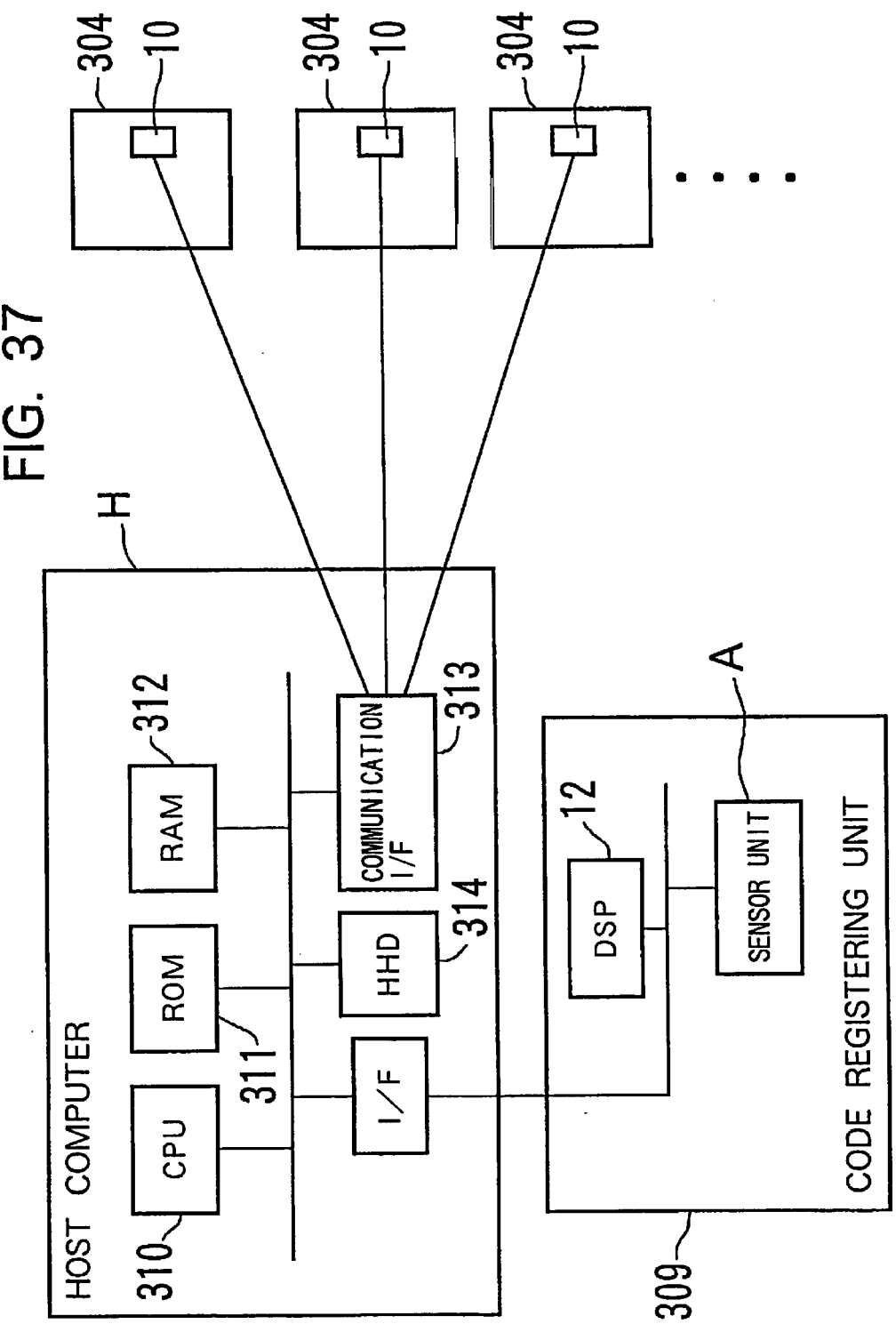
FIG. 37 depicts a diagram that explains Example 21 of an application of the present invention.

The sensor lock 10 in the door 304 of each hotel room can be connected to a host computer H via communication lines and the fingerprint code of the customer can be registered on the hard disk 314 of the host computer H through a code registering unit 309, as shown in FIG. 37.

In this case, the customer registers the fingerprint, at the time of check-in, on the hard disk 314 of the computer H through the code registering unit 309 placed at the front desk. Then, to unlock his room he just presses the sensor unit A on the door.

EXAMPLE 21

We shall now explain Example 21. When the concerned object E which is to be locked or unlocked using the above-described sensor lock 10 or 10*a* belongs to the person with a registered fingerprint, in principle the fingerprint code registered in the matching circuit B need not be changed. On the other hand, if the authorized user of the concerned object E changes quite frequently, requiring the registered fingerprint code to be changed frequently, (such as with the letter box or door of a rented apartment or house, a car door, the cash drawer of a cash register, the door of a hotel room, etc.) the registered fingerprint code in the matching device B has to be erased and a new fingerprint code registered. If the sensor lock 10 or 10*a* has a feature that can easily register a new fingerprint code, there is the risk of an unauthorized person registering his or her fingerprint code and unlocking the concerned object E.

Figure 38:
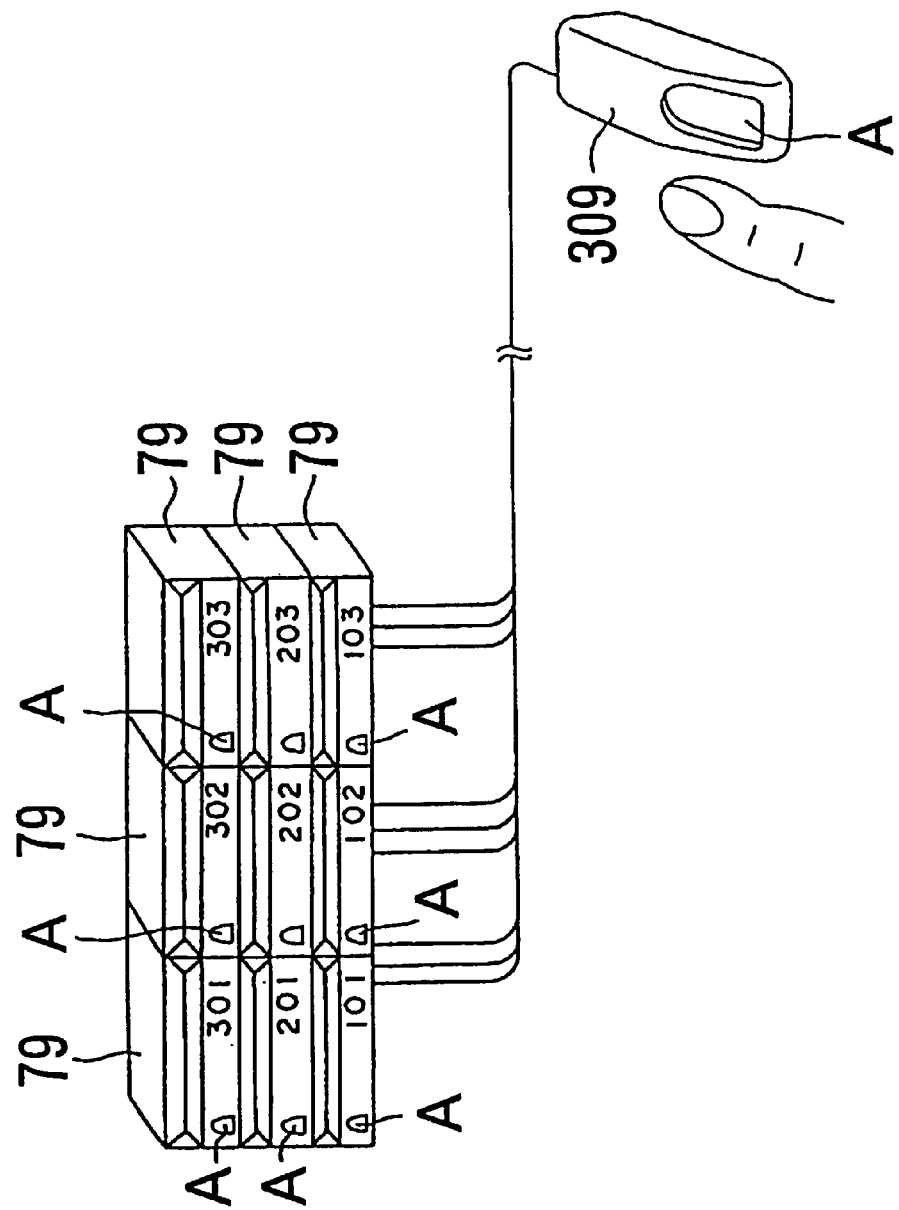
FIG. 38 depicts a diagram that explains Example 22 of an application of the present invention.

FIG. 38 shows a row of letter boxes 79, each using a sensor lock 10, in an apartment house. Here, the flash memory 11 (see FIG. 1) of the sensor lock 10 (only the sensor units A are shown) does not have the fingerprint code registering program 19. Thus, the DSP 12 cannot register and store the fingerprint codes prepared by it in the EEPROM 14.

For storing the registered fingerprint code in each EEPROM 14, a code registering device 309 shown in FIG. 37 should be connected to the individual sensor lock 10. The fingerprint code created by pressing the sensor unit A of the code registering device 309 is then registered in the EEPROM 14 of the sensor lock 10. When a new fingerprint code is registered in the EEPROM 14, it overwrites the existing fingerprint code.

Thus, the system is set up so that registering a new fingerprint is possible only by using the special fingerprint code registering device 309. Because of this arrangement, a new fingerprint code cannot be registered by pressing the sensor unit A of the sensor lock 10 of a letter box. Unauthorized registration of new fingerprints can be prevented if the code registering device 309 is kept with the manager and it is used only in the presence of the manager. Also, since the old fingerprint code is automatically erased when a new fingerprint code is registered, there is no possibility of the previous tenant being able to open a letter box.

Figure 39:
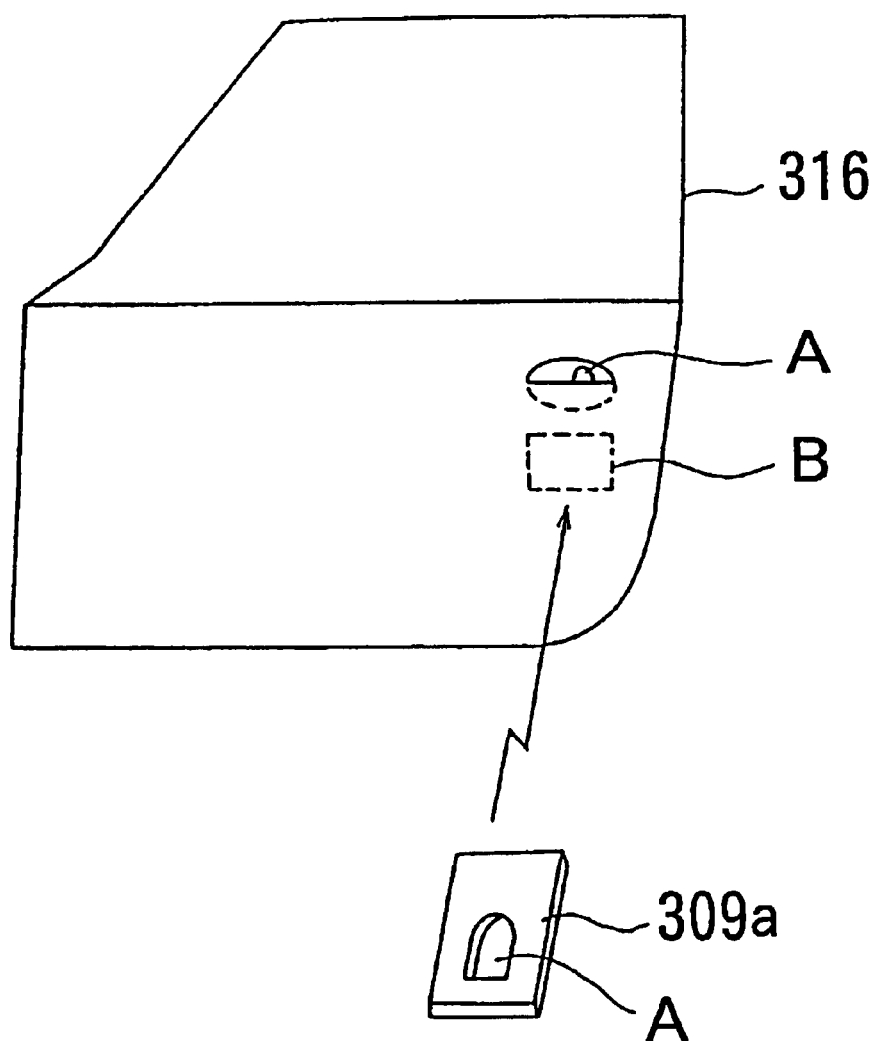
FIG. 39 depicts a diagram that explains Example 23 of an application of the present invention.

FIG. 39 shows the door 316 of a car in which a sensor lock 10 is used. Here also, the DSP 12 of the sensor lock 10 does not register the fingerprint codes made by it in the EEPROM 14. Instead, the fingerprint code is registered by a code registering device 309*a*. The code registering device 309*a* is a non-contact type card machine in which radio waves or other electromagnetic waves are used for data transmission. Its internal structure is about the same as the code registering device 309 mentioned earlier. Each code registering device 309*a* is exclusive for a car. So it can register fingerprint codes for the sensor lock 10 only of the car to which it belongs.

When the sensor unit A of the code registering device 309*a* is pressed, the fingerprint code is transferred from the data transmission unit (not shown) of the code registering device 309*a* to the data receiving unit (also not shown) of the matching circuit B. However, the code registration device 309*a* exchanges a secret code with the sensor lock 10 to verify each other before transferring the fingerprint code. When the two units fail to verify, the code registering device 309*a* does not transmit a fingerprint code. When the data receiving unit of the matching circuit B receives the fingerprint code, it is stored in the EEPROM 14 and becomes a registered fingerprint code. When a new fingerprint code is registered in the EEPROM 14, the previously registered fingerprint code is erased.

When the above-described sensor lock 10 and the code registering device 309*a* are used, the registration of the fingerprint code for the sensor lock 10 is done only by the corresponding code registering unit 309*a*. Thus, as long as others are not permitted to use the code registration unit 309*a*, there is no possibility of the registered fingerprint code being overwritten without authorization. Also, since the sensor lock 10 by itself cannot register fingerprint codes, any inconvenience or security risk arising from unauthorized registration of fingerprint codes does not arise.

EXAMPLE 22

Figure 40A:
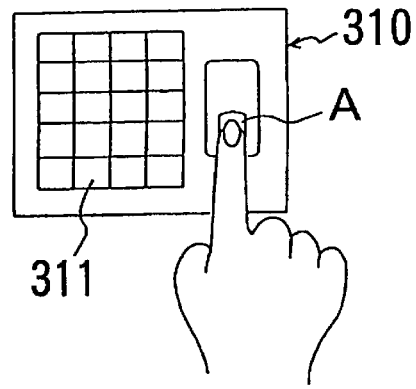
FIG. 40 depicts a diagram that explains Example 24 of an application of the present invention.
Figure 40B:
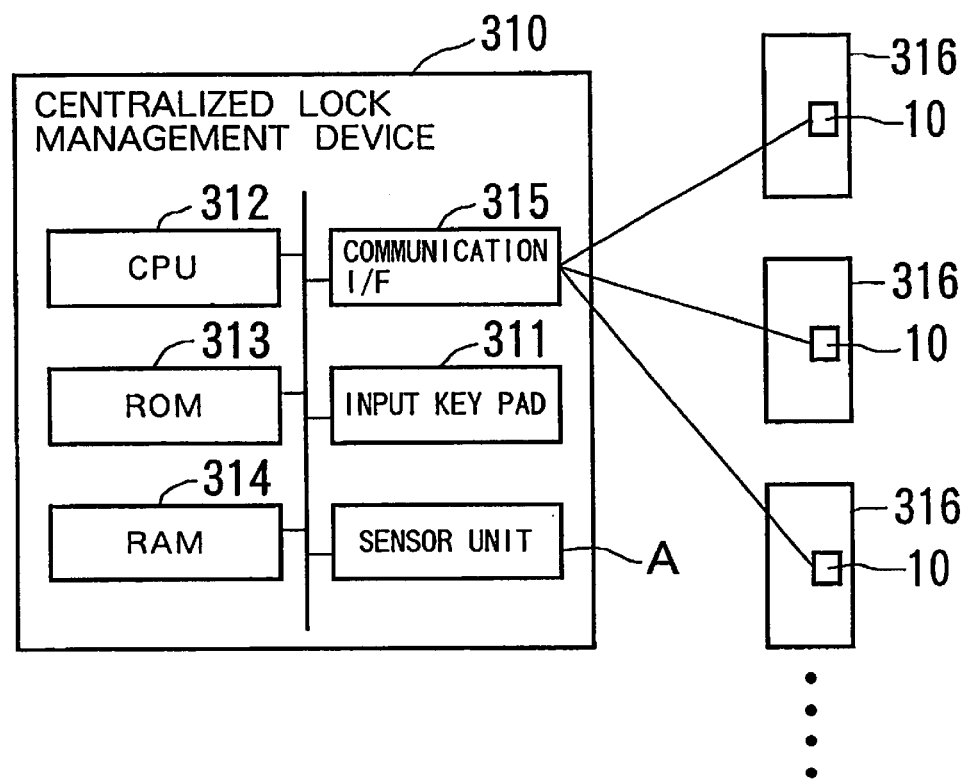

Example 22 is a case where the sensor lock 10 is used in a centralized locking system in an apartment house (block of flats). FIG. 40(*a*) shows the external appearance of the centralized locking control device 310. In this Figure, the centralized locking control unit 310 has a sensor unit A and an inputting key pad 311. Such a control unit 310 can be installed, for instance, at the entrance of an apartment house. FIG. 40(*b*) shows the system configuration of this centralized locking control system.

In FIG. 40(*b*), the locking control system 310 is shown to be connected through communication lines to the sensor locks 10 installed on the entrance doors 316 of each apartment. These sensor locks 10 on the doors of the apartments have about the same structure as in Example 2. When a resident of an apartment inputs a code number (the room number of the resident, for instance) through the input key pad 311 to the centralized locking control system 310, the CPU 312 carries out the processes described below by executing stored software programs maintained in the ROM 313.

In short, the CPU 312 uses the code number inputted to open the communication line between with the sensor lock 10 installed on the entrance door 316 of the apartment corresponding to the code number. If the sensor unit A is then pressed with a finger other than the one having the registered fingerprint, the CPU 312 prepares the fingerprint code and sends it to the sensor lock 10 through the communication line. When the fingerprint code reaches the sensor lock 10, the matching circuit B of the sensor lock 10 carries out the matching. In this case, the entrance door 316 is locked because the fingerprint code does not match with a registered code. On the other hand, if the fingerprint codes match, the lock of the entrance door 316 is unlocked.

Because of the arrangement described above, if the resident of the apartment remembers that he forgot to lock his entrance door 316, after reaching the entrance of the building, he can lock his door 316 while he is standing at the entrance of the building. He can also unlock the entrance door 316 of his room from that location, if he so desires.

EXAMPLE 23

Example 23 is a case where a sensor lock 10 of the type shown in FIG. 1 is placed on the entrance door of a room with restricted entry, such as a room in which important or classified documents are stored, secret meetings are held, etc. FIG. 41 is the system diagram of the entrance door 323 of this Example 23. In this Figure the CPU 317 executes the stored software programs maintained in ROM 319, by loading them into the RAM 318. The hard disk 320 maintains a photographic data base 320a, an ID code database 320b and a fingerprint code database 320c, of persons who are authorized to enter the room.

FIG. 42 is the flow chart of the software for operating the system shown in FIG. 41. This program starts when an ID document, a company ID card issued to an employee for instance, of a person who is authorized to enter is input into an image reader. The image reader 322 reads out image data from the photograph on the ID card (Step S101).

In the next step, the CPU 317 compares the photographic image data acquired in Step S101 with the photographic image data stored in the database 320a (Step S102) and determines whether there is a match (Step S103). If there is a match (S103; Yes), the program moves on to Step S104. Otherwise (S103; No) the program moves to Step S112.

If it proceeds to Step S104, the CPU 317 reads out the current time from the clock 317a and determines whether it is in the time period of 9 AM to 5 PM. If it is within this time zone (S104; Yes), the program moves to Step S113. Otherwise (S104; No) the program moves to S105. If the program moves to Step S105, the CPU 317 demands the input of an ID code from the person through the input unit 321, and obtains the ID code.

In the next step, the CPU 317 compares the ID code obtained in S105 with the ID codes stored in the ID code database 320b (Step S105) to determine whether there is a match (Step S106). If there is a match (S106; Yes), the program moves to S104. Otherwise (S106; No) the program proceeds to Step S112.

In Step S108, the CPU 317 obtains the current time from the clock 317a and determines whether it is in the time zone 5 PM to 10 PM. If the answer is "Yes" (S108; Yes), the program proceeds to Step S113. Otherwise (S108; No) it moves to Step S109. In Step S109, the CPU demands from the person the input of a fingerprint through the sensor unit A. The fingerprint code is then prepared from the fingerprint pattern sensed by the sensor unit A.

In the next step, the CPU 317 compares the fingerprint code obtained in Step S109 with the fingerprint codes in the fingerprint code database 320c (Step S110) to determine whether there is a match (Step S111). If there is a match (S111; Yes), the program moves to S113. Otherwise (S111; No) the program proceeds to Step S112.

When the program moves to Step S112, the system concludes that there was no match in the photographic data, ID code or fingerprint code and gives out an error display (alarm display) on a display unit (not shown) to complete the program. In this case, the lock of the entrance door 323 does not get unlocked.

On the other hand, if the program advances to S113, a "Yes" signal is sent to the control circuit C and, pin 22 of the latching solenoid D gets disengaged, unlocking the door 323.

With the system operating as explained above, the inlet door 323 gets unlocked to permit authorized persons to enter the room if the time that entry is sought (the time at which the image reader starts reading the image) is within normal working hours (9:00 AM to 5:00 PM) and the photographic data on the ID card matches the registered photographic data. Relatively mild entry conditions are imposed during working hours because other security personnel at the entry point can also check the identity of the person seeking entry.

On the other hand, if the time that entry is sought is during 5:00 to 10:00 PM, when the majority of the employees will be off duty and not at the facility, the conditions of entry are made stricter. Entry is permitted only when both the photographic data and the ID code match.

The most stringent conditions of entry are imposed during the time period of 10:00 PM to 9:00 AM of the following day, when almost no employee is in the facility. Entry is permitted only when the photographic data, the ID code and the fingerprint code, all match. In this manner, the level of security can be changed by varying the entry conditions depending on the time that entry is sought.

[Application Mode 3]

Figure 43:
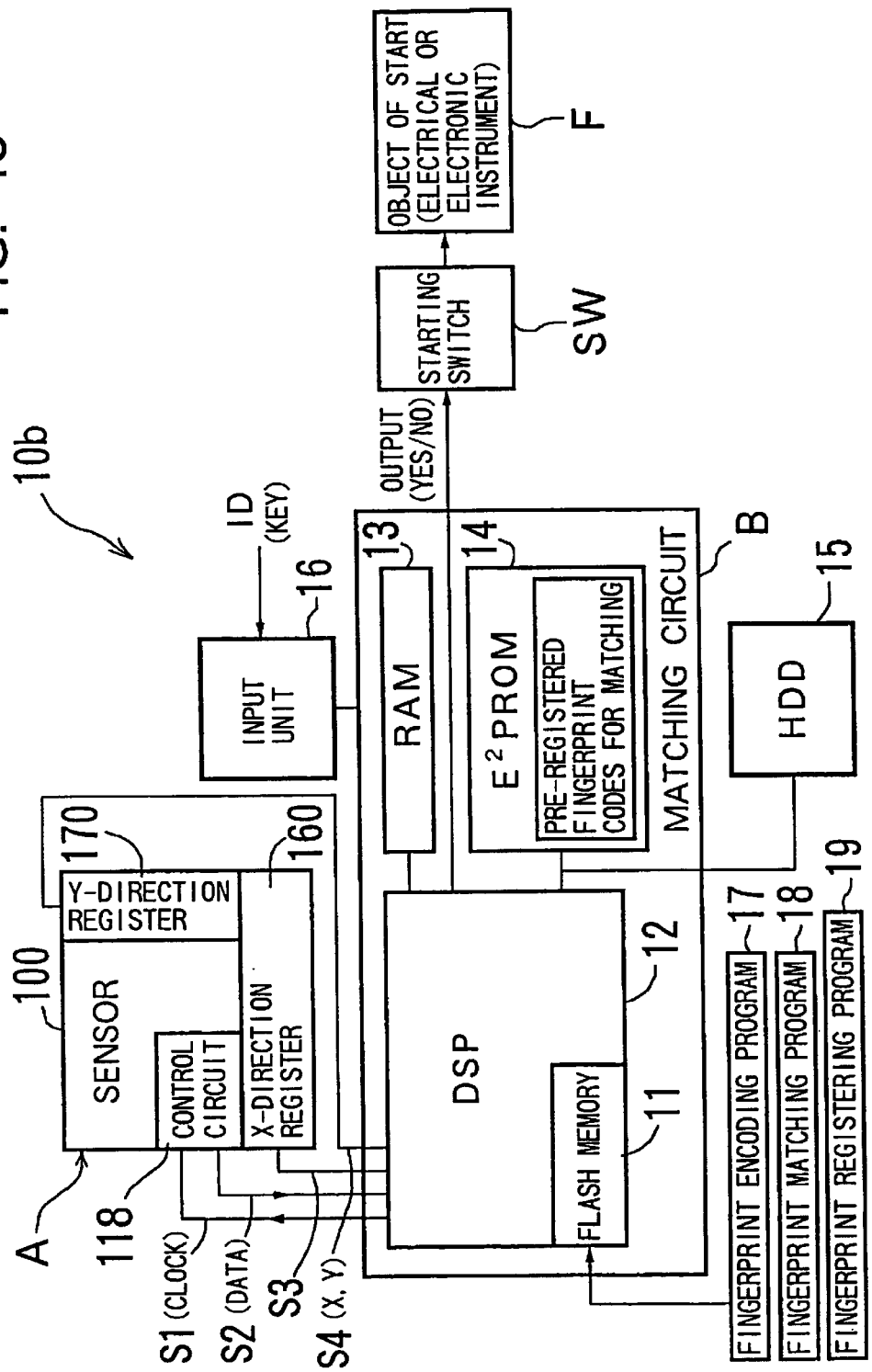
FIG. 43 depicts a schematic diagram of a switch in which a pressure-based fingerprint sensor is used in Application Mode 3 of the present invention.

Application Mode 3 concerns newly invented switches in which the pressure-based fingerprint sensor is used. FIG. 43 shows the structure of switch 10b used in this application mode. The sensor unit A and matching circuit B of the switch 10b are basically the same as those used in Application Mode 1. However, the starter switch SW is connected to the matching circuit B and the object F to be started (which can be an electrical or electronic device) is connected to the starter switch SW. The starter switch SW is turned on when a "Yes" signal is received from the matching circuit B, starting the object F. Here, F can be a motor, an actuator (including solenoids), or electrical products (such as electrical or electronic devices).

When switch 10b of this application mode is used, only a person with a registered fingerprint can start the concerned object F. Therefore, unlike with switches that require a conventional key, any inconvenience like not being able to start the concerned object F because of loss or theft of the key does not arise. In the above-described switch 10b, the sensor unit A and the matching circuit B can be housed in a card K (controller) as in Application Mode 2. Variations of the controller (card K) explained for Application Mode 2 are all applicable as explained above for the configuration of the card K in this Application Mode 3.

EXAMPLE 24

Figure 44:
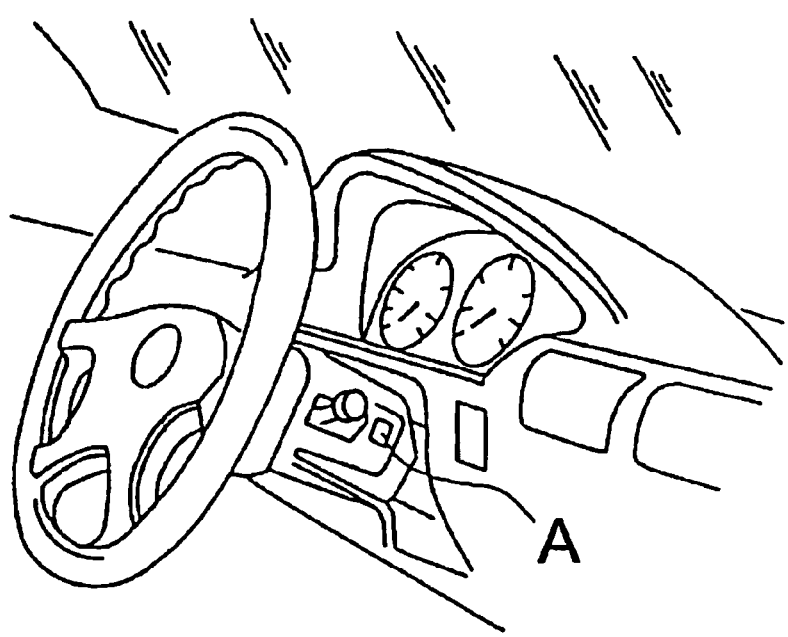
FIG. 44 depicts a diagram that explains Example 26 of an application of the present invention.

We shall now give some examples of using the Application Mode 3. Example 24 is a case where a switch 10b of the type shown in FIG. 43 is used for starting a car engine. As shown in FIG. 44, a switch 10b (only the sensor unit A is shown here) is installed, instead of the ignition switch, on the right hand side of the steering shaft cover.

If the sensor unit A is pressed with an appropriate finger of a person with a registered fingerprint, the matching circuit B outputs a "Yes" signal. This signal turns on the power source switch (not shown) which makes it possible to supply power to the electrically powered accessories (radio, cassette player, door mirror, power window, etc.) of the car.

The actuator that shifts the driver's seat backward or forward and another actuator that changes the inclination of the back of this seat are installed in the driver's seat of the car. The central rear view mirror and the side mirrors are also equipped with actuators that change their angles. An actuator for changing the position of the steering wheel is also provided.

When the power switch is turned on upon receiving the "Yes" signal, the processor unit (not shown) that controls the operation of the actuators, becomes operational and drives these actuators on the basis of the positioning data (the angle of the seat back, the forward-backward position of the seat, the position of the steering wheel, and angles of the rear view mirror and side mirrors) of the fingerprint registered person pre-recorded in the memory unit (not shown). Thus, when the sensor unit A is pressed by an appropriate finger, the optimum driving position and settings for other electrically operated accessories for the fingerprint registered person is automatically created.

After this, a "Yes" signal is given to the starter switch SW. Upon receiving this "Yes" signal, the starter switch SW starts the power supply from the battery to the starter motor (corresponding to the electrical and electronic devices) of the engine while at the same time firing the spark plugs at certain time intervals. This starts the motor, starting the engine.

In Example 24, a conventional ignition switch which uses a key is not provided. Instead, the switch 10*b* controls the power supply to the starter motor. Therefore, the inconvenience of not being able to start the car because of loss or theft of the key does not arise.

When the system decides that there is a match in the fingerprint code, the optimum driving position is created before power is supplied to the starter motor. Driving position resetting systems have been known for some time, but in conventional systems the driver had to operate a switch manually for resetting the optimum driving position. Sometimes the driver remembers after starting the car that he had forgotten to press this switch, and presses the switch after the car has started. In that case, the position of the driver's seat, angles of the mirrors, etc. would change while the car is running, posing some risk to the driver. In some other systems, pressing any manual controls would be ineffective in creating any adjustment as operation was disabled when the ignition was on to prevent any unsafe condition. In Example 24, the suitable driving position is set before the engine is started. So, it does not have the problems associated with the conventional prior art systems.

The switch 10*b* can be used for stopping the engine also. For example, the system can be so set up that when the sensor unit A is pressed with a finger other than the appropriate one, the power switch turns off power supply to the spark plugs, which stops the engine.

The starting and stopping of the engine using the switch 10*b* is not limited to cars. For example, it may be used in motorized bicycles, motorcycles, large sized vehicles, ships, aircraft, diesel vehicles, etc. The setting of the optimum driving position and adjustment of other electrical accessories can be applied in large sized vehicles, ships, aircraft, etc., also.

EXAMPLE 25

Figure 45:
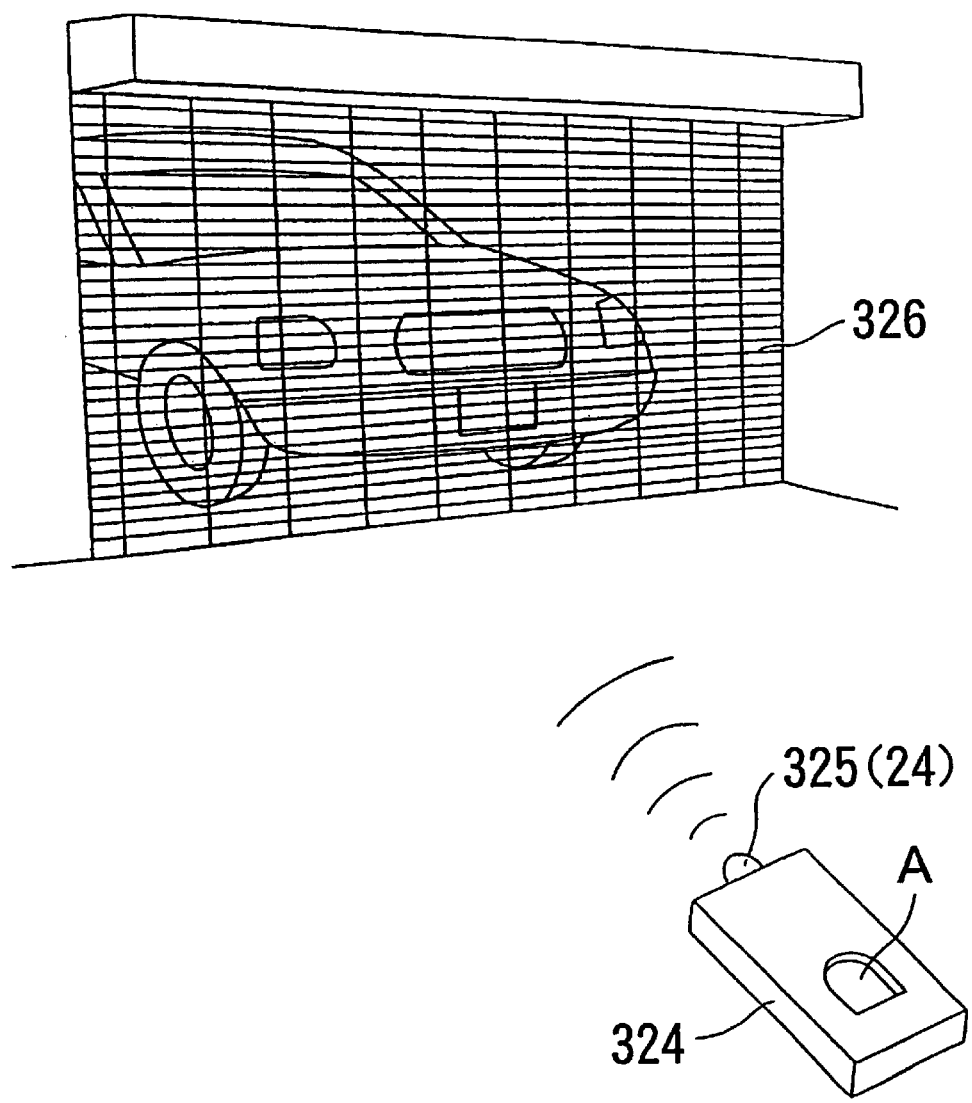
FIG. 45 depicts a diagram that explains Example 27 of an application of the present invention.

Example 25 is a case where a switch 10*b* of the type shown in FIG. 43 is used to operate a garage door controlled by remote controller 324. As shown in FIG. 45, the remote controller 324 has the same structure as the card K of FIG. 29. When the sensor unit A of this remote controller 324 is suitably pressed, the LED 325, which acts as the data transmission unit 24, outputs a "Yes" signal. This "Yes" signal is received by a photo-sensor unit (not shown) installed on the side of the shutter 326, and then transmitted to the starter switch SW.

The starter switch SW then turns on the power supply (an electrical or electronic device not shown) that moves the garage door vertically. Here, if the garage door 326 is down at or near its lowest position, it moves up (the garage door opens) and if it is at or near its highest position, it moves down (the garage door closes).

The starter switch SW is so set up that if it receives a "Yes" signal while the garage door is moving, it shuts off the power supply to the actuator, stopping the movement of the garage door.

Conventional remote controlled garage doors can be operated by any one who has the remote control. But in Example 25, only a person whose fingerprint has been registered can operate the garage door. So, unauthorized opening of the garage door using a stolen remote control, trespassing into the garden or garage that is locked out by the garage door and the damaging of property placed there, etc. can be averted.

EXAMPLE 26

Figure 46:
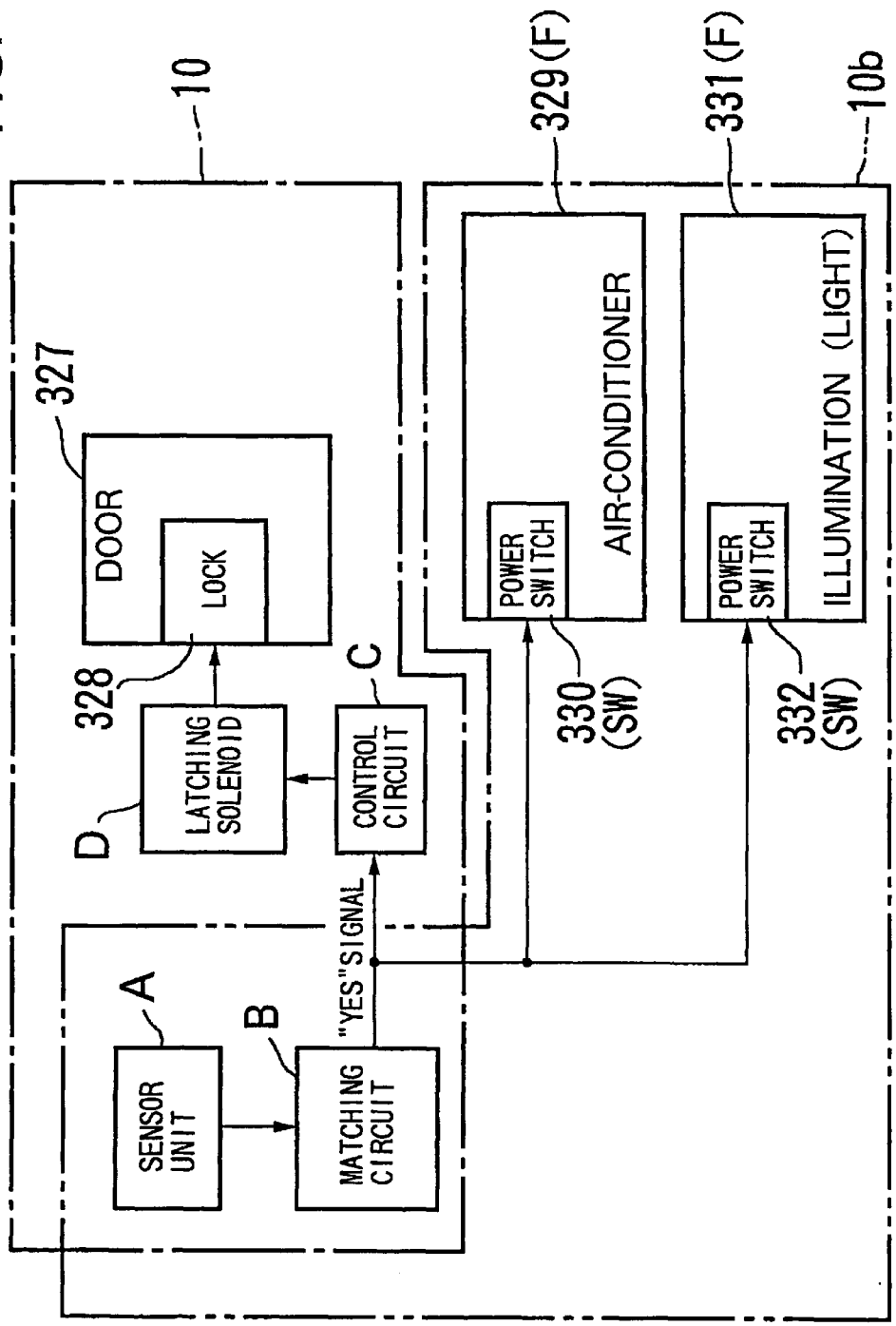
FIG. 46 depicts a diagram that explains Example 28 of an application of the present invention.

Example 26 is a system in which the above-mentioned switch 10*b* and a sensor lock 10 are used in combination. As shown in FIG. 46, the "Yes" signal coming from the matching circuit B is inputted to the control circuit C upon which the latching solenoid D unlocks the lock 328 of the door 327. In this case, the "Yes" signal is inputted to the switch 330 of the air conditioner and the switch 332 of the light 331, turning on the air conditioner and the light. The system is set up so that when the door 327 is locked by the sensor lock 10, the air conditioner 329 and the light 331, etc. inside the room are turned off.

Therefore, when the person with the registered fingerprint comes home and presses the sensor unit A on the door 327 at the entrance, the door is unlocked and simultaneously the light 331 of the room is turned on and the air conditioner 329 also starts operation. Alternatively, the system can be set up so that the operation of the air conditioner, light, etc. inside the room can be controlled remotely, by transmitting a fingerprint code to the switch 10*b* through a public communication system like telephone wires, ISDN, etc.

The examples explained above under these application modes are merely examples of various implementations of the invention. The newly invented locks and switches that use a pressure-based fingerprint sensor have wide applicability on objects for which restricted access is desired.

What is claimed is:

1. A locking device comprising:
   (a) a locking mechanism for locking and unlocking movement of an object;
   (b) a pressure-based fingerprint sensor for detecting a fingerprint pattern comprising at least a portion of a plurality of ridges and a plurality of valleys of a finger in both an x-direction and a y-direction when said finger is pressed against said sensor;
   (c) a semiconductor memory device for storing registered fingerprint data;
   (d) a processor configured to determine by electronic processing whether the fingerprint data created from the fingerprint pattern detected by said fingerprint sensor matches with any of the registered fingerprint data stored in said semiconductor memory device;

(e) a control unit for controlling whether said locking mechanism locks or unlocks movement of said object in response to said fingerprint match determination by said processor; and (f) a key unit separated from said locking mechanism and independently portable with respect to said control unit and said locking mechanism, said portable key unit comprising one of the group consisting of: (1) said sensor, said semiconductor memory device, and said processor but not said control unit, and wherein said portable key unit is in communication with said control unit via unidirectional wireless communication from the portable key unit to the control unit, and (2) said sensor and said semiconductor memory device but not said processor and not said control unit, and wherein said portable key unit is in communication with said processor via unidirectional wireless communication from the portable key unit to said processor.

2. The locking device of claim 1 wherein said portable key unit comprises said sensor, said processor, and said semiconductor memory device but not said control unit, and wherein said portable key unit is in communication with said control unit via unidirectional wireless communication from the portable key unit to the control unit.

3. A locking device comprising:

(a) a locking mechanism for locking and unlocking movement of an object;

(b) a pressure-based fingerprint sensor for detecting a fingerprint pattern comprising at least a portion of a plurality of ridges and a plurality of valleys of a finger in both an x-direction and a y-direction when said finger is pressed against said sensors;

(c) a semiconductor memory device for storing registered fingerprint data;

(d) a processor configured to determine by electronic processing whether the fingerprint data created from the fingerprint pattern detected by said fingerprint sensor matches with any of the registered fingerprint data stored in said semiconductor memory device;

(e) a control unit for controlling whether said locking mechanism locks or unlocks movement of said object in response to said fingerprint match determination by said processor; and (f) a key unit separated from said locking mechanism and independently portable with respect to said control unit and said locking mechanism, said portable key unit comprising said sensor, said semiconductor memory device, and said processor but not said control unit, and wherein said portable key unit is configured to wirelessly communicate with said control unit via magnetic coupling.

4. The locking device of claim 2 wherein said portable key unit is a card.

5. A locking device comprising:

(a) a locking mechanism for locking and unlocking movement of an object;

(b) a pressure-based fingerprint sensor for detecting a fingerprint pattern comprising at least a portion of a plurality of ridges and a plurality of valleys of a finger in both an x-direction and a y-direction when said finger is pressed against said sensor;

(c) a semiconductor memory device for storing registered fingerprint data;

(d) a first processor configured to determine by electronic processing whether the fingerprint data created from the fingerprint pattern detected by said fingerprint sensor matches with any of the registered fingerprint data stored in said semiconductor memory device;

(e) a second processor in communication with said first processor and said semiconductor memory device, said second processor being configured to (1) create fingerprint data from the fingerprint pattern of an authorized person detected by said fingerprint sensor and (2) register said authorized person by storing said created fingerprint data in said semiconductor memory device;

(f) a control unit for controlling whether said locking mechanism locks or unlocks movement of said object in response to said fingerprint match determination by said processor; and (g) a key unit separated from said locking mechanism and independently portable with respect to said control unit and said locking mechanism, said portable key unit comprising either (i) said first processor but not said second processor, wherein said portable key unit is configured to wirelessly communicate with said control unit and said second processor, or (ii) said second processor but not said first processor, wherein said portable key unit is configured to wirelessly communicate with said first processor.

6. A locking device comprising:

(a) a locking mechanism for locking and unlocking movement of an object;

(b) a pressure-based fingerprint sensor for detecting a fingerprint pattern comprising at least a portion of a plurality of ridges and a plurality of valleys of a finger in both an x-direction and a y-direction when said finger is pressed against said sensor;

(c) a semiconductor memory device for storing registered fingerprint data;

(d) a processor configured to create fingerprint data from the detected fingerprint pattern, the created fingerprint data for use in performing a fingerprint match determination between the created fingerprint data and the stored registered fingerprint data, wherein said processor is not configured to perform said fingerprint match determination;

(e) a control unit for controlling whether said locking mechanism locks or unlocks movement of said object in response to a fingerprint match determination; and (f) a key unit separated from said locking mechanism and independently portable with respect to said control unit and said locking mechanism, wherein said portable key unit comprises said sensor and said processor but not said semiconductor memory device and not said control unit, and wherein said portable key unit is configured to communicate data corresponding to said created fingerprint data via wireless communication.

7. A switching device comprising:

(a) a starting switch for starting operation of an object;

(b) a pressure-based fingerprint sensor for detecting a fingerprint pattern comprising at least a portion of a plurality of ridges and a plurality of valleys of a finger in both an x-direction and a y-direction when said finger is pressed against said sensor;

(c) a semiconductor memory device for storing registered fingerprint data;

(d) a processor configured to (1) determine by electronic processing whether the fingerprint data created from the fingerprint pattern detected by said sensor matched with any of the registered fingerprint data stored in said semiconductor memory device and (2) actuate said starting switch in response to said fingerprint match determination being positive; and (e) a key unit separated from and independently portable with respect to said starting switch, said portable key unit comprising one selected from the group consisting of: (1) said sensor, said semiconductor memory device, and said processor, and wherein said portable key unit is configured to communicate with said starting switch via unidirectional wireless communication from said portable key unit to said starting switch, and (2) said sensor and said semiconductor memory device but not said processor, and wherein said portable key unit is configured to communicate with said processor via unidirectional wireless communication from said portable key unit to said processor.

8. A switching device comprising:

(a) a starting switch for starting operation of an object, said starting switch being actuable in response to a positive fingerprint match determination;

(b) a pressure-based fingerprint sensor for detecting a fingerprint pattern comprising at least a portion of a plurality of ridges and a plurality of valleys of a finger in both an x-direction and a y-direction when said finger is pressed against said sensor;

(c) a semiconductor memory device for storing registered fingerprint data;

(d) a processor configured to create fingerprint data from the detected fingerprint pattern, the created fingerprint data for use in performing a fingerprint match determination between the created fingerprint data and the stored registered fingerprint data, wherein said processor is not configured to perform said fingerprint match determination; and (e) a key unit separated from and independently portable with respect to said starting switch, wherein said portable key unit comprises said sensor and said processor but not said semiconductor memory device, and wherein said portable key unit is configured to communicate data corresponding to said created fingerprint data via wireless communication.

9. A switching device comprising:

(a) a starting switch for starting operation of an object;

(b) a pressure-based fingerprint sensor for detecting a fingerprint pattern comprising at least a portion of a plurality of ridges and a plurality of valleys of a finger in both an x-direction and a y-direction when said finger is pressed against said sensor;

(c) a semiconductor memory device for storing registered fingerprint data;

(d) a first processor configured to (1) determine by electronic processing whether the fingerprint data created from the fingerprint pattern detected by said sensor matched with any of the registered fingerprint data stored in said semiconductor memory device and (2) actuate said starting switch in response to said fingerprint match determination being positive;

(e) a second processor in communication with said first processor and said semiconductor memory device, said second processor being configured to (1) create fingerprint data from the fingerprint pattern of an authorized person detected by said fingerprint sensor and (2) register said authorized person by storing said created fingerprint data in said semiconductor memory device; and (f) a key unit separated from said starting switch and independently portable with respect to said starting switch, said portable key unit comprising either (i) said first processor but not said second processor, wherein said portable key unit is configured to wirelessly communicate with said control unit and said second processor, or (ii) said second processor but not said first processor, wherein said portable key unit is configured to wirelessly communicate with said first processor.

10. A switching device comprising:

(a) a starting switch for starting operation of an object;

(b) a pressure-based fingerprint sensor for detecting a fingerprint pattern comprising at least a portion of a plurality of ridges and a plurality of valleys of a finger in both an x-direction and a y-direction when said finger is pressed against said sensor;

(c) a semiconductor memory device for storing registered fingerprint data;

(d) a processor configured to (1) determine by electronic processing whether the fingerprint data created from the fingerprint pattern detected by said sensor matched with any of the registered fingerprint data stored in said semiconductor memory device and (2) actuate said starting switch in response to said fingerprint match determination being positive; and (e) a key unit separated from and independently portable with respect to said starting switch, said portable key unit comprising sensor, said semiconductor memory device, and said processor, and wherein said portable key unit is configured to wirelessly communicate with said starting switch via magnetic coupling.

11. The switching device of claim 7 wherein said portable key unit comprises said sensor, said semiconductor memory device, and said processor, and wherein said portable key unit is configured to communicate with said starting switch via unidirectional wireless communication from said portable key unit to said starting switch.

12. The switching device of claim 11 wherein said portable key unit is a card.

13. The locking device of claim 1 wherein said processor is further configured to store said sensed fingerprint pattern in said semiconductor memory device in response to said fingerprint match determination being negative.

14. The locking device of claim 1 further comprising a clock unit for generating a periodic clock signal and a time determining unit configured to maintain a time value according to said clock signal and identify a tune value when a finger is pressed against said sensor, wherein said semiconductor memory device is further configured to store access control data, said access control data identifying when an authorized person for whom registered fingerprint data is stored is allowed to lock or unlock movement of said object, and wherein said processor is further configured such that said locking or unlocking of said object is further dependent upon said processor positively determining from a comparison between said access control data and said identified time value that said authorized person is allowed to lock or unlock movement of said object.

15. The switching device of claim 7 wherein said processor is further configured to store said sensed fingerprint pattern in said semiconductor memory device in response to said fingerprint match determination being negative.

16. The switching device of claim 7 further comprising a clock unit for generating a periodic clock signal and a time determining unit configured to maintain a time value according to said clock signal and identify a time value when a finger is pressed against said sensor, wherein said semiconductor memory device is further configured to store access control data, said access control data identifying when an authorized person for whom registered fingerprint data is stored is allowed start operation of said object, and wherein said processor is further configured such that said starting operation of said object is further dependent upon said processor positively determining from a comparison between said access control data and said identified time value that said authorized person is allowed to start operation of said object.

17. The locking device of claim 1 wherein said portable key unit comprises said sensor and said semiconductor memory device, but not said processor and not said control unit, and wherein said portable key unit is in communication with said processor via unidirectional wireless communication from said portable key unit to said processor.

18. The switching device of claim 7 wherein said portable key unit comprises said sensor and said semiconductor memory device but not said processor, and wherein said portable key unit is configured to communicate with said processor via unidirectional wireless communication from said portable key unit to said processor.

19. The locking device of claim 5 wherein said portable key unit comprises said first processor but not said second processor, wherein said portable key unit is configured to wirelessly communicate with said control unit and said second processor.

20. The locking device of claim 5 wherein said portable key unit comprises said second processor but not said first processor, wherein said portable key unit is configured to wirelessly communicate with said first processor.

21. The switching device of claim 9 wherein said portable key unit comprises said first processor but not said second processor, wherein said portable key unit is configured to wirelessly communicate with said control unit and said second processor.

22. The switching device of claim 9 wherein said portable key unit comprises said second processor but not said first processor, wherein said portable key unit is configured to wirelessly communicate with said first processor.

23. The locking device of claim 2 wherein said portable key unit is configured to wirelessly communicate with said control unit via infrared communication.

24. A locking device comprising:
(a) a locking mechanism for locking and unlocking movement of an object;
(b) a pressure-based fingerprint sensor for detecting a fingerprint pattern comprising at least a portion of a plurality of ridges and a plurality of valleys of a finger in both an x-direction and a y-direction when said finger is pressed against said sensor;
(c) a semiconductor memory device for storing registered fingerprint data;
(d) a processor configured to determine by electronic processing whether the fingerprint data created from the fingerprint pattern detected by said fingerprint sensor matches with any of the registered fingerprint data stored in said semiconductor memory device;
(e) a control unit for controlling whether said locking mechanism locks or unlocks movement of said object in response to said fingerprint match determination by said processor; and
(f) a key unit separated from said locking mechanism and independently portable with respect to said control unit and said locking mechanism, said portable key unit comprising said sensor, said semiconductor memory device, and said processor but not said control unit, and wherein said portable key unit is in communication with said control unit via wireless communication, and wherein said portable key unit is configured to wirelessly communicate with said control unit via electrostatic coupling.

25. The switching device of claim 21 wherein said portable key unit is configured to wirelessly communicate with said control unit via infrared communication.

26. A switching device comprising:
(a) a starting switch for starting operation of an object;
(b) a pressure-based fingerprint sensor for detecting a fingerprint pattern comprising at least a portion of a plurality of ridges and a plurality of valleys of a finger in both an x-direction and a y-direction when said finger is pressed against said sensor;
(c) a semiconductor memory device for storing registered fingerprint data;
(d) a processor configured to (1) determine by electronic processing whether the fingerprint data created from the fingerprint pattern detected by said sensor matched with any of the registered fingerprint data stored in said semiconductor memory device and (2) actuate said starting switch in response to said fingerprint match determination being positive; and
(e) a key unit separated from and independently portable with respect to said starting switch, said portable key unit comprising sensor, said semiconductor memory device, and said processor, and wherein said portable key unit is configured to communicate with said starting switch via wireless communication, and wherein said portable key unit is configured to wirelessly communicate with said starting switch via electrostatic coupling.

27. A locking device comprising:
(a) a locking mechanism for locking and unlocking movement of an object;
(b) a pressure-based fingerprint sensor for detecting a fingerprint pattern comprising at least a portion of a plurality of ridges and a plurality of valleys of a finger in both an x-direction and a y-direction when said finger is pressed against said sensor;
(c) a semiconductor memory device for storing registered fingerprint data;
(d) a processor configured to determine by electronic processing whether the fingerprint data created from the fingerprint pattern detected by said fingerprint sensor matches with any of the registered fingerprint data stored in said semiconductor memory device, and The wherein the processor is further configured to make a negative fingerprint match determination if said fingerprint data created from the fingerprint pattern detected by said sensor perfectly matches any of said registered fingerprint data;
(e) a control unit for controlling whether said locking mechanism locks or unlocks movement of said object in response to said fingerprint match determination by said processor; and
(f) a key unit separated from said locking mechanism and independently portable with respect to said control unit and said locking mechanism, said portable key unit comprising said sensor, said semiconductor memory device, and said processor but not said control unit, and wherein said portable key unit is in communication with said control unit via wireless communication.

28. A switching device comprising:
(a) a starting switch for starting operation of an object;
(b) a pressure-based fingerprint sensor for detecting a fingerprint pattern comprising at least a portion of a plurality of ridges and a plurality of valleys of a finger in both an x-direction and a y-direction when said finger is pressed against said sensor;
(c) a semiconductor memory device for storing registered fingerprint data;
(d) a processor configured to (1) determine by electronic processing whether the fingerprint data created from the fingerprint pattern detected by said sensor matched with any of the registered fingerprint data stored in said semiconductor memory device and (2) actuate said starting switch in response to said fingerprint match determination being positive, and wherein the processor is further configured to make a negative fingerprint match determination if said fingerprint data created from the fingerprint pattern detected by said sensor perfectly matches any of said registered fingerprint data; and
(e) a key unit separated from and independently portable with respect to said starting switch, said portable key unit comprising said sensor, said semiconductor memory device, and said processor, and wherein said portable key unit is configured to communicate with said starting switch via wireless communication.

29. The locking device of claim 2 wherein the portable key unit comprises a plurality of said processors.

30. The switching device of claim 11 wherein the portable key unit comprises a plurality of said processors.

31. The locking device of claim 5 wherein said portable key unit is a card.

32. The locking device of claim 3 wherein said wireless communication is unidirectional from said portable key unit to said control unit.

33. The locking device of claim 6 wherein said wireless data communication is unidirectional wireless communication from said portable key unit.

34. The switching device of claim 8 wherein said wireless data communication is unidirectional wireless communication from said portable key unit.

35. The switching device of claim 9 wherein said portable key unit is a card.

36. The switching device of claim 10 wherein said wireless communication is unidirectional from said portable key unit to said starting switch.

37. The starting switch of claim 11 wherein said portable key unit is in unidirectional wireless communication with said starting switch via infrared communication.

38. The locking device of claim 17 wherein said portable key unit is in unidirectional wireless communication with said processor via infrared communication.

39. The locking device of claim 17 wherein said portable key unit is in unidirectional wireless communication with said processor via magnetic coupling.

40. The locking device of claim 17 wherein said portable key unit is in unidirectional wireless communication with said processor via electrostatic coupling.

41. The switching device of claim 18 wherein said portable key unit is in unidirectional wireless communication with said processor via infrared communication.

42. The switching device of claim 18 wherein said portable key unit is in unidirectional wireless communication with said processor via magnetic coupling.

43. The switching device of claim 18 wherein said portable key unit is in unidirectional wireless communication with said processor via electrostatic coupling.

44. The locking device of claim 20 wherein said portable key unit is configured to wirelessly communicate with said control unit via infrared communication.

45. The switching device of claim 22 wherein said portable key unit is configured to wirelessly communicate with said control unit via infrared communication.

46. The locking device of claim 24 wherein said wireless communication is unidirectional from said portable key unit to said control unit.

47. The locking device of claim 24 wherein said portable key unit is a card.

48. The locking device of claim 24 wherein the portable key unit comprises a plurality of said processors.

49. The locking device of claim 24 wherein said processor is further configured to store said sensed fingerprint pattern in said semiconductor memory device in response to said fingerprint match determination being negative.

50. The locking device of claim 24 further comprising a clock unit for generating a periodic clock signal and a time determining unit configured to maintain a time value according to said clock signal and identify a time value when a finger is pressed against said sensor, wherein said semiconductor memory device is further configured to store access control fingerprint data is stored is allowed to lock or unlock movement of said object, and wherein said processor is further configured such that said locking or unlocking of said object is further dependent upon said processor positively determining from a comparison between said access control data and said identified time value that said authorized person is allowed to lock or unlock movement of said object.

51. The switching device of claim 26 wherein said wireless communication is unidirectional from said portable key unit to said starting switch.

52. The switching device of claim 26 wherein said portable key unit is a card.

53. The switching device of claim 26 wherein the portable key unit comprises a plurality of said processors.

54. The switching device of claim 26 wherein said processor is further configured to store said sensed fingerprint pattern in said semiconductor memory device in response to said fingerprint match determination being negative.

55. The switching device of claim 26 further comprising a clock unit for generating a periodic clock signal and a time determining unit configured to maintain a time value according to said clock signal and identify a time value when a finger is pressed against said sensor, wherein said semiconductor memory device is further configured to store access control data, said access control data identifying when an authorized person for whom registered fingerprint data is stored is allowed start operation of said object, and wherein said processor is further configured such that said starting operation of said object is further dependent upon said processor positively determining from a comparison between said access control data and said identified time value that said authorized person is allowed to start operation of said object.

56. The locking device of claim 27 wherein said portable key unit is a card.

57. The locking device of claim 27 wherein the portable key unit comprises a plurality of said processors.

58. The locking device of claim 27 wherein said processor is further configured to store said sensed fingerprint pattern in said semiconductor memory device in response to said fingerprint match determination being negative.

59. The locking device of claim 27 further comprising a clock unit for generating a periodic clock signal and a time determining unit configured to maintain a time value according to said clock signal and identify a time value when a finger is pressed against said sensor, wherein said semiconductor memory device is further configured to store access control data, said access control data identifying when an authorized person for whom registered fingerprint data is stored is allowed to lock or unlock movement of said object, and wherein said processor is further configured such that said locking or unlocking of said object is further dependent upon said processor positively determining from a comparison between said access control data and said identified time value that said authorized person is allowed to lock or unlock movement of said object.

60. The switching device of claim 28 wherein said portable key unit is a card.

61. The switching device of claim 28 wherein the portable key unit comprises a plurality of said processors.

62. The switching device of claim 28 wherein said processor is further configured to store said sensed fingerprint pattern in said semiconductor memory device in response to said fingerprint match determination being negative.

63. The switching device of claim 28 further comprising a clock unit for generating a periodic clock signal and a time determining unit configured to maintain a time value according to said clock signal and identify a time value when a finger is pressed against said sensor, wherein said semiconductor memory device is further configured to store access control data, said access control data identifying when an authorized person for whom registered fingerprint data is stored is allowed start operation of said object, and wherein said processor is further configured such that said starting operation of said object is further dependent upon said processor positively determining from a comparison between said access control data and said identified time value that said authorized person is allowed to start operation of said object.

* * * * *